United States Patent
Naylor et al.

(10) Patent No.: US 12,469,374 B1
(45) Date of Patent: Nov. 11, 2025

(54) SYSTEM AND METHOD FOR SECURE PACKAGE DELIVERY, STORAGE, AND PICKUP

(71) Applicant: Hyve Security LLC, Agoura Hills, CA (US)

(72) Inventors: Brennan Naylor, San Francisco, CA (US); David W Baarman, Fennville, MI (US); Melissa Kieling, Agoura Hills, CA (US)

(73) Assignee: Hyve Security LLC, Agoura Hills, CA (US)

( * ) Notice: Subject to any disclaimer, the term of this patent is extended or adjusted under 35 U.S.C. 154(b) by 0 days.

(21) Appl. No.: 18/928,755

(22) Filed: Oct. 28, 2024

Related U.S. Application Data

(60) Provisional application No. 63/661,730, filed on Jun. 19, 2024.

(51) Int. Cl.
*G08B 13/22* (2006.01)
*A47G 29/14* (2006.01)
(Continued)

(52) U.S. Cl.
CPC ........... *G08B 13/22* (2013.01); *A47G 29/141* (2013.01); *A47G 29/30* (2013.01); *G06Q 10/0836* (2013.01); *G06V 10/147* (2022.01); *G07C 9/00309* (2013.01); *H04N 7/183* (2013.01); *H04N 7/188* (2013.01); *H04N 23/56* (2023.01); *H04N 23/661* (2023.01); *A47G 2029/145* (2013.01); *A47G 2200/08* (2013.01); *A47G 2200/103* (2013.01); *A47G 2200/226* (2013.01); *G06V 20/95* (2022.01)

(58) Field of Classification Search
None
See application file for complete search history.

(56) References Cited

U.S. PATENT DOCUMENTS 3,659,154 A * 4/1972 Finn .................... G08B 13/00
340/5.33
3,823,637 A * 7/1974 Scott .................... G09B 7/06
84/477 R
(Continued)

FOREIGN PATENT DOCUMENTS

AU       2012332558 B2     1/2016
EP       3 089 677 B1      4/2020
(Continued)

OTHER PUBLICATIONS

International Search Report and Written Opinion for Application No. PCT/US2025/033751, dated Sep. 4, 2025, 21 pages.

*Primary Examiner* — Carlos Garcia
(74) *Attorney, Agent, or Firm* — Warner Norcross + Judd LLP

(57) ABSTRACT

A package storage device with a monitoring and security system that utilizes motion and sensors to provide secure package delivery and validation. Also having the ability to automate the delivery process with secure communications and encrypted codes to create a hands-free delivery system. This storage device has the capability of capturing photos and metadata to enhance security and forensics. It can be connected to a cloud-based system that enables ease of interface and security connectivity in a mesh format.

28 Claims, 36 Drawing Sheets

(51) Int. Cl.

| | | |
|---|---|---|
| A47G 29/30 | (2006.01) | |
| G06Q 10/0836 | (2023.01) | |
| G06V 10/147 | (2022.01) | |
| G06V 20/00 | (2022.01) | |
| G07C 9/00 | (2020.01) | |
| H04N 7/18 | (2006.01) | |
| H04N 23/56 | (2023.01) | |
| H04N 23/661 | (2023.01) | |

(56) References Cited

U.S. PATENT DOCUMENTS

| | | | | |
|---|---|---|---|---|
| 4,648,056 | A * | 3/1987 | Wakefield | G01G 15/006 |
| | | | | 177/25.14 |
| 5,308,058 | A * | 5/1994 | Mandel | B65H 39/11 |
| | | | | 232/27 |
| 8,321,562 | B2 * | 11/2012 | Kutzik | G16H 20/70 |
| | | | | 709/224 |
| 9,050,086 | B2 | 6/2015 | Belson et al. | |
| 9,179,914 | B2 | 11/2015 | Belson et al. | |
| 9,642,621 | B2 | 5/2017 | Belson et al. | |
| 9,805,582 | B2 * | 10/2017 | Jedwab | G08B 13/19654 |
| 9,873,549 | B2 * | 1/2018 | Heinz | B65D 85/70 |
| 9,997,080 | B1 | 6/2018 | Chambers et al. | |
| 10,039,401 | B1 | 8/2018 | Romanucci | |
| 10,159,825 | B2 | 12/2018 | Belson et al. | |
| 10,328,805 | B1 | 6/2019 | Wyrobek et al. | |
| 10,365,645 | B1 | 7/2019 | Chambers et al. | |
| 10,793,269 | B2 | 10/2020 | Abeles et al. | |
| 10,988,253 | B2 | 4/2021 | Perry et al. | |
| 11,051,988 | B2 | 7/2021 | Belson | |
| 11,066,184 | B2 | 7/2021 | Wyrobek | |
| 11,080,746 | B2 | 8/2021 | Khan et al. | |
| 11,113,976 | B2 | 9/2021 | Chambers et al. | |
| 11,369,222 | B2 * | 6/2022 | Kennett | E05B 47/00 |
| 11,439,395 | B2 | 9/2022 | Belson et al. | |
| 11,807,361 | B2 | 11/2023 | Abeles et al. | |
| 11,958,629 | B2 | 4/2024 | McNish et al. | |
| 12,094,276 | B2 * | 9/2024 | Kashi | G07C 9/32 |
| 2005/0082358 | A1 * | 4/2005 | McKenzie | A47G 29/121 |
| | | | | 232/35 |
| 2006/0093352 | A1 * | 5/2006 | Webster | H04N 23/55 |
| | | | | 257/E31.127 |
| 2009/0141117 | A1 | 6/2009 | Elberbaum | |
| 2014/0091781 | A1 | 4/2014 | Cova et al. | |
| 2015/0235493 | A1 | 8/2015 | Hall et al. | |
| 2015/0305538 | A1 | 10/2015 | Sundaresan | |
| 2015/0339872 | A1 * | 11/2015 | De Puiseau | G06Q 10/083 |
| | | | | 340/5.5 |
| 2016/0033966 | A1 | 2/2016 | Farris et al. | |
| 2017/0055751 | A1 | 3/2017 | Sundarsean | |
| 2017/0091710 | A1 | 3/2017 | Van Dyke | |
| 2017/0124938 | A1 * | 5/2017 | Kim | G09G 3/32 |
| 2017/0286905 | A1 | 10/2017 | Richardson et al. | |
| 2018/0079530 | A1 | 3/2018 | Wyrobek | |
| 2018/0130335 | A1 * | 5/2018 | Jedwab | G08B 25/10 |
| 2019/0038062 | A1 | 2/2019 | Sundaresan | |
| 2019/0081788 | A1 * | 3/2019 | Rose | H04L 9/3226 |
| 2019/0149399 | A1 | 5/2019 | Reed et al. | |
| 2019/0164441 | A1 | 5/2019 | Briggs | G08G 5/55 |
| 2019/0231106 | A1 * | 8/2019 | Kaiserman | F25D 23/10 |
| 2019/0290198 | A1 | 9/2019 | Belson et al. | |
| 2019/0310646 | A1 * | 10/2019 | DeJarnette | G06Q 10/087 |
| 2020/0051015 | A1 * | 2/2020 | Davis | G06Q 10/08 |
| 2020/0275931 | A1 | 9/2020 | Belson et al. | |
| 2020/0302047 | A1 * | 9/2020 | Falk | H04W 12/069 |
| 2020/0397172 | A1 * | 12/2020 | Kennett | G07C 9/00896 |
| 2021/0022536 | A1 | 1/2021 | Anderson et al. | |
| 2021/0077024 | A1 | 3/2021 | Boucher | |
| 2021/0150469 | A1 * | 5/2021 | Miller | G06Q 10/0833 |
| 2021/0171197 | A1 | 6/2021 | Anderson | |
| 2021/0350714 | A1 | 11/2021 | Chambers et al. | |
| 2021/0374199 | A1 * | 12/2021 | Reda | G06F 16/436 |
| 2022/0089293 | A1 | 3/2022 | Wyrobek et al. | |
| 2022/0233010 | A1 | 7/2022 | Sundaresan | |
| 2022/0338658 | A1 | 10/2022 | Soderberg | |
| 2023/0102768 | A1 | 3/2023 | Watson | |
| 2023/0237426 | A1 | 7/2023 | Ton et al. | |
| 2023/0242011 | A1 | 8/2023 | Khattar | |
| 2023/0306355 | A1 | 9/2023 | Mehta et al. | |
| 2023/0410028 | A1 * | 12/2023 | O'Toole | B65G 1/137 |
| 2024/0010336 | A1 | 1/2024 | Wyrobek et al. | |
| 2024/0041458 | A1 | 2/2024 | Belson et al. | |
| 2024/0127012 | A1 * | 4/2024 | Jackson | G06K 7/10128 |
| 2024/0134938 | A1 * | 4/2024 | Zhuang | G06F 18/2431 |
| 2024/0140629 | A1 | 5/2024 | Boomgaard et al. | |
| 2024/0275773 | A1 * | 8/2024 | Gaddam | G06Q 20/12 |
| 2025/0063250 | A1 * | 2/2025 | Duffy | H04N 23/634 |

FOREIGN PATENT DOCUMENTS

| | | |
|---|---|---|
| JP | 6240205 B2 | 11/2017 |
| JP | 6924809 B2 | 8/2021 |
| JP | 2021-142360 A | 9/2021 |
| JP | 2022-002157 A | 1/2022 |
| WO | 2017/044120 A1 | 3/2017 |
| WO | 2021/138420 A1 | 7/2021 |
| WO | 2021/231654 A1 | 11/2021 |
| WO | 2023/146938 A2 | 8/2023 |
| WO | 2023/150287 A1 | 8/2023 |

* cited by examiner

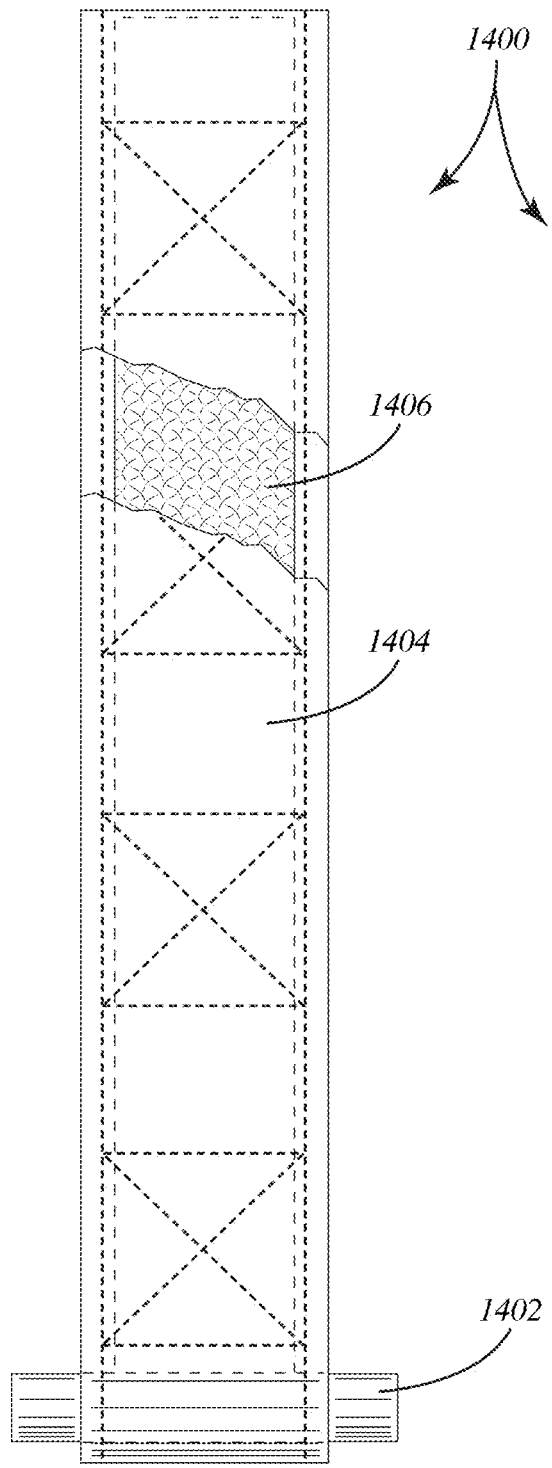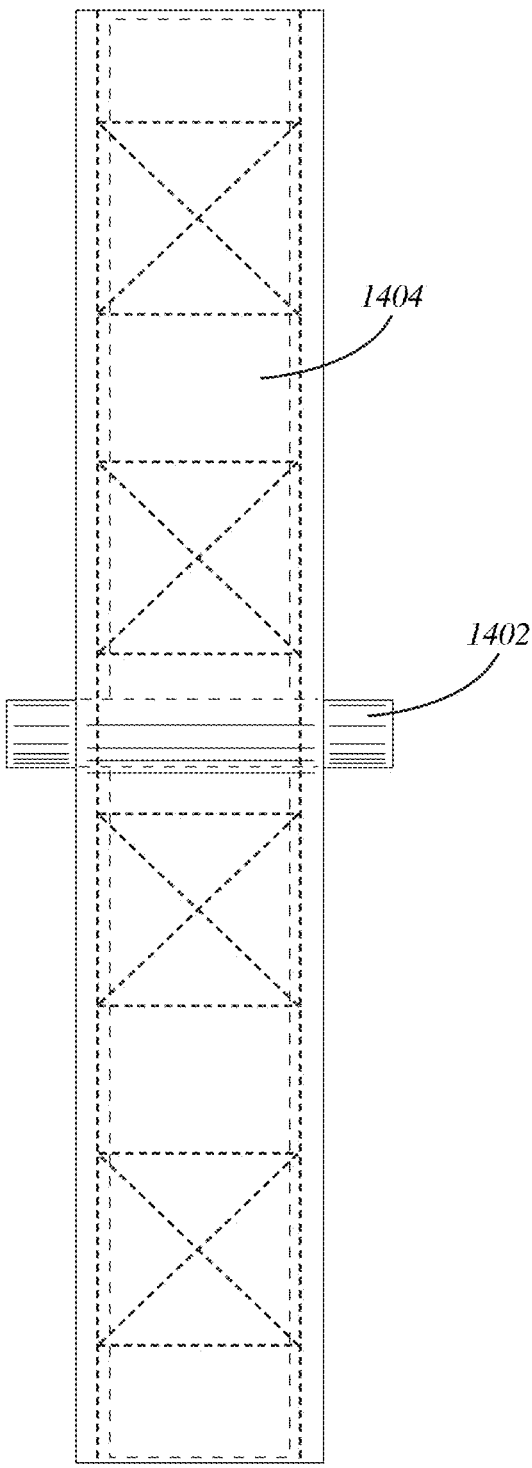
*Fig. 13A*  *Fig. 13B*

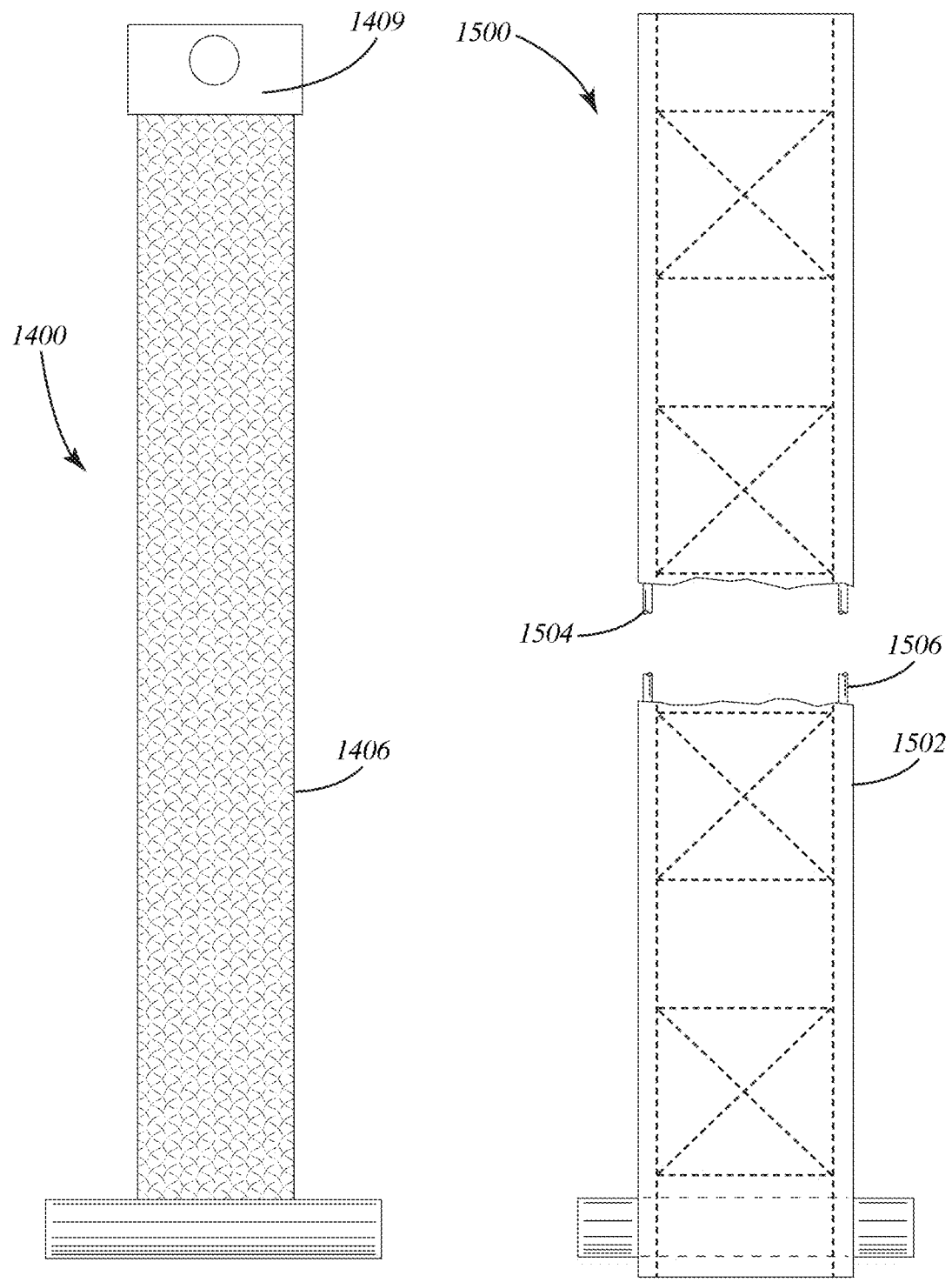
*Fig. 13C*            *Fig. 14*

PROPERTY TYPE: HOUSE EDIT

WHERE SHOULD WE LEAVE YOUR PACKAGE AT THIS ADDRESS ⌄

DO WE NEED A SECURITY CODE, CALL BOX NUMBER OR KEY TO ∧
ACCESS THIS BUILDING?

SECURITY CODE ☑ HYVE DROP BOX ☑ RETURNS ENABLED

| 143456 |

CALL BOX ☑ HIDE CODE

| CALL BOX NUMBER OR NAME |

☐ KEY OR FAB REQUIRED FOR DELIVERY ☑ GARAGE DOOR ENABLED

CAN WE DELIVER TO THIS ADDRESS ON WEEKENDS? ⌄
OPEN ON SATURDAYS AND SUNDAYS

DO YOU HAVE A DOG AT THIS ADDRESS? ⌄

DO WE NEED ADDITIONAL INSTRUCTIONS TO FIND THIS ADDRESS? ⌄

YOUR INSTRUCTIONS HELP US DELIVER YOUR PACKAGES TO YOUR
EXPECTATIONS AND WILL BE USED WHEN POASSIBLE.

| SAVE CHANGES |

SYSTEM AND METHOD FOR SECURE PACKAGE DELIVERY, STORAGE, AND PICKUP

BACKGROUND OF THE INVENTION

Some embodiments of the present disclosure relate to various ways to prevent or limit theft of delivered packages. Traditional solutions for securing delivered packages have included metal drop boxes with bins for placing and dumping packages into a secondary locked storage area, as well as simple locked storage cabinets. These systems typically feature a keypad for secure user access or use cameras to visually detect the presence of an operator. There are also designs that collapse into a doormat for space-saving purposes or use the last four digits of a shipping ID to unlock the storage compartment. However, these solutions have several limitations.

One problem associated with many package storage security systems is the difficulty in securely attaching the storage device to a home. Some systems rely on a doorknob locking mechanism that attaches to a cable connected to the storage device, while others use brackets to suspend the storage device on a door. These attachment methods can be cumbersome and may not provide adequate security.

Additionally, while cameras have been used to determine when a package has been delivered and notify the user, many existing systems lack robust communication and monitoring capabilities. Some systems include WiFi for communications and weight sensors for measuring package weight, but these features alone do not ensure the safe and secure delivery of packages.

Existing systems often do not effectively integrate with third-party systems, provide comprehensive photographic evidence of deliveries, or offer seamless integration with smart home devices. Furthermore, many current solutions lack support for long-range communication technologies.

Moreover, traditional package storage systems do not effectively address the dynamic nature of modern delivery methods, such as drone deliveries. There is a growing need for systems that can seamlessly interact with drones and other automated delivery vehicles, providing secure and automated access to storage compartments.

While various package storage systems exist, they often lack comprehensive security features, easy and secure attachment methods, advanced communication capabilities, and integration with modern delivery technologies. There is a need for improved package storage and security systems that address some or all of these issues, providing a more reliable, secure, and automated solution for package deliveries and pickups.

SUMMARY OF THE INVENTION

The present disclosure provides comprehensive package storage systems that address challenges of secure package deliveries and pickups. The systems generally include a package storage compartment for receiving and picking up packages, equipped with a door that can be selectively actuated to access the compartment, and an electronic lock that secures the compartment, preventing unauthorized access.

In some embodiments, a package storage compartment controller including associated memory can automate or semi-automate the locking, unlocking, and actuation of the package storage compartment door. The electronic lock can be operated by a local user interface or remotely via wireless communication to facilitate secure and efficient handling of package deliveries and pickups.

To enhance security and monitoring, the system may include a package storage compartment camera to capture images of the compartment contents, a proximity camera to capture interactions with the package storage system, or both. These cameras can be controlled by the package storage compartment controller and can operate automatically based on received wireless communication. The cameras can facilitate comprehensive documentation of deliveries, pick-ups, and other interactions with the package storage compartment system, aiding in security and verification. Lighting and camera positioning features can enhance the photography. A digital watermark may include the ID of the system and locked status and other metadata of the box and delivery.

The package storage system can include an accelerometer for triggering an integrated alarm system, home security system, or other suitable associated triggerable system. The package storage compartment controller can be configured to trigger an alarm in response to tampering detected by the accelerometer. This adds an additional layer of security to protect against theft and unauthorized access. In some embodiments, the alarm threshold for the accelerometer can be dynamically changed based on an alert level that can be set by the user or according to historic trends, nearby package storage system alert levels, time of day, other suitable criteria, or a combination thereof.

The package storage system can include an alarm triggering magnet and a mounting location for a third-party home security system wireless transmitter triggerable by the alarm triggering magnet. This configuration allows the package storage system to seamlessly operate with and trigger a variety of different third-party home security systems.

The communication capabilities of the package storage system are robust, capable of supporting various protocols such as cellular, Wi-Fi, Bluetooth, and LoRa and various home automation protocols like Z-Wave and Zigbee. This ensures reliable connectivity and allows remote control and monitoring of the system from a variety of vantages and devices.

For delivery verification, the system can generate a delivery verification record that includes details such as delivery vehicle ID, delivery personnel ID, delivery type, package photograph, and delivery interaction photograph. This process can be enhanced by a load cell that measures the package weight and compares it to the expected weight, ensuring accurate verification.

The system can support storing metadata, including delivery schedules, alert levels, and notification preferences. It also can integrate with home security systems, enhancing the overall security infrastructure.

The package storage compartment may include a package photograph portal, allowing for the capture of images of delivered packages. These images can be wirelessly communicated to the system for verification. The portal can include a lens or other transparent material with a watermark, serial number, or other identifier to facilitate authenticating photographs taken through the portal. Additionally, the housing of the package storage compartment can have alignment structure for assisting delivery personnel in alignment of their mobile device with the portal for suitable image capture, ensuring that the camera lens is properly positioned relative to the portal. Processing sequential images can allow the system to define the package level within the storage, it can show level by delivery it can derive if room is available and trigger other options like MyQ opening the garage door when the storage system if full. For example, by processing sequential images of delivered packages, the system can monitor the fill level of the storage compartment. It can detect whether additional space is available for new deliveries or if the compartment is reaching its capacity. If the system determines that the storage is full, it can trigger automated actions, such as sending an alert to the user or initiating a connected system like a smart garage door opener or smart access control system to open the garage door. This integration allows for expanded storage options, ensuring deliveries continue smoothly even when the initial compartment is full.

The system may also include a package compartment camera that is supported by the package storage system with a clear view of the package storage compartment area and configured to photograph delivered packages for delivery verification records. The system may also include an interaction camera that is mounted on the package storage system with an external view of the general proximity of the package storage system such that the interaction camera can be used to capture photographs of interactions with the system. In some embodiments, a dual camera setup is provided with both package compartment and interaction cameras providing comprehensive documentation of the delivery process. This setup can aid in verifying both the delivery of packages and the source of interactions with the package storage system.

The present disclosure provides a comprehensive package storage system that addresses challenges of secure package deliveries and pickups. In some embodiments, the present disclosure can include a feature for enabling a preauthorized digital signature for secure delivery. This feature allows for the generation and application of a preauthorized digital signature once a package is authenticated and securely stored, serving as proof of delivery for restricted items, such as alcohol and pharmaceuticals, where proof of identity is generally required.

The system can support automated garage door opening for guided drone deliveries, providing a versatile solution for various delivery methods.

Additionally, the disclosure encompasses a package storage mesh security system that includes multiple package storage units and communication hubs. This mesh system can integrate with other home security and automation systems, such as lighting and garage door systems, providing a comprehensive and integrated security solution.

Power management features, such as a power interface and USB backup power, can ensure reliable operation even during power interruptions. The system may also include sensors, as well as suitable heating, cooling, and ventilation systems, to provide a controlled environment for stored packages. Additional sensors like motion may be used to detect movement to wake up the microprocessor saving power and enabling Bluetooth to check for authentication credentials automatically. It should also be noted with a solar panel and battery system hub features and functions can be integrated into the lock mechanism. This can make it a standalone system for monitoring, authentication, and power management.

The package storage system can include various mounting configurations, including knock-down designs for easy assembly and storage. Additionally, the system can include a tether system with added strength and integral assembly tools, ensuring secure attachment and preventing unauthorized removal.

The package storage system may have an additional bag or liner to assist in removal of the packages. The sewn or molded liner has handles to easily place and remove allowing the user to remove all the packages without reaching all the way down into the storage system The systems of the present disclosure provide robust and secure solutions for managing package deliveries and pickups, addressing the limitations of traditional systems, and offering advanced features to meet the needs of modern package delivery and storage methods. Further, the systems of the present disclosure can ensure that package deliveries are secure, verifiable, and efficiently managed, integrating seamlessly with existing security and home automation infrastructures.

BRIEF DESCRIPTION OF THE DRAWINGS

FIGS. 13A-C illustrate one embodiment of a flexible security strap for tethering a package storage compartment.

FIG. 14 illustrates a flexible security strap that facilitates tamper detection.

FIG. 25 illustrates exemplary interface screens for generating a code for a new delivery, providing a delivery summary, and providing order details.

FIG. 27 illustrates an exemplary interface depicting user delivery configuration.

DESCRIPTION OF THE CURRENT EMBODIMENTS

The present disclosure provides multiple embodiments of advanced package storage systems for securely receiving and storing packages for pickup. Various different features and aspects as well as combinations thereof will be discussed throughout the disclosure.

Figure 17:
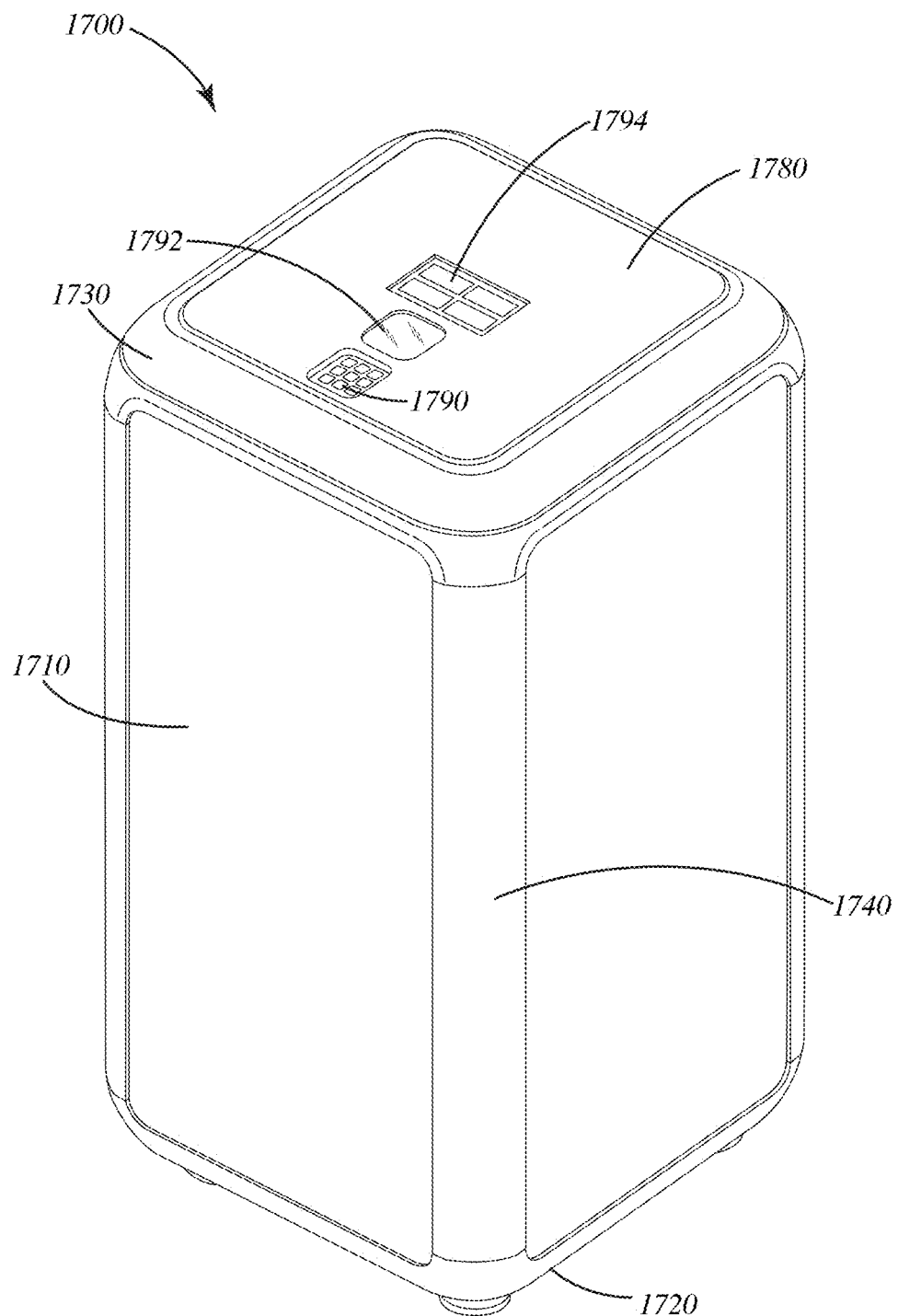
FIG. 17 illustrates a collapsible package storage compartment in a constructed configuration.
Figure 18:
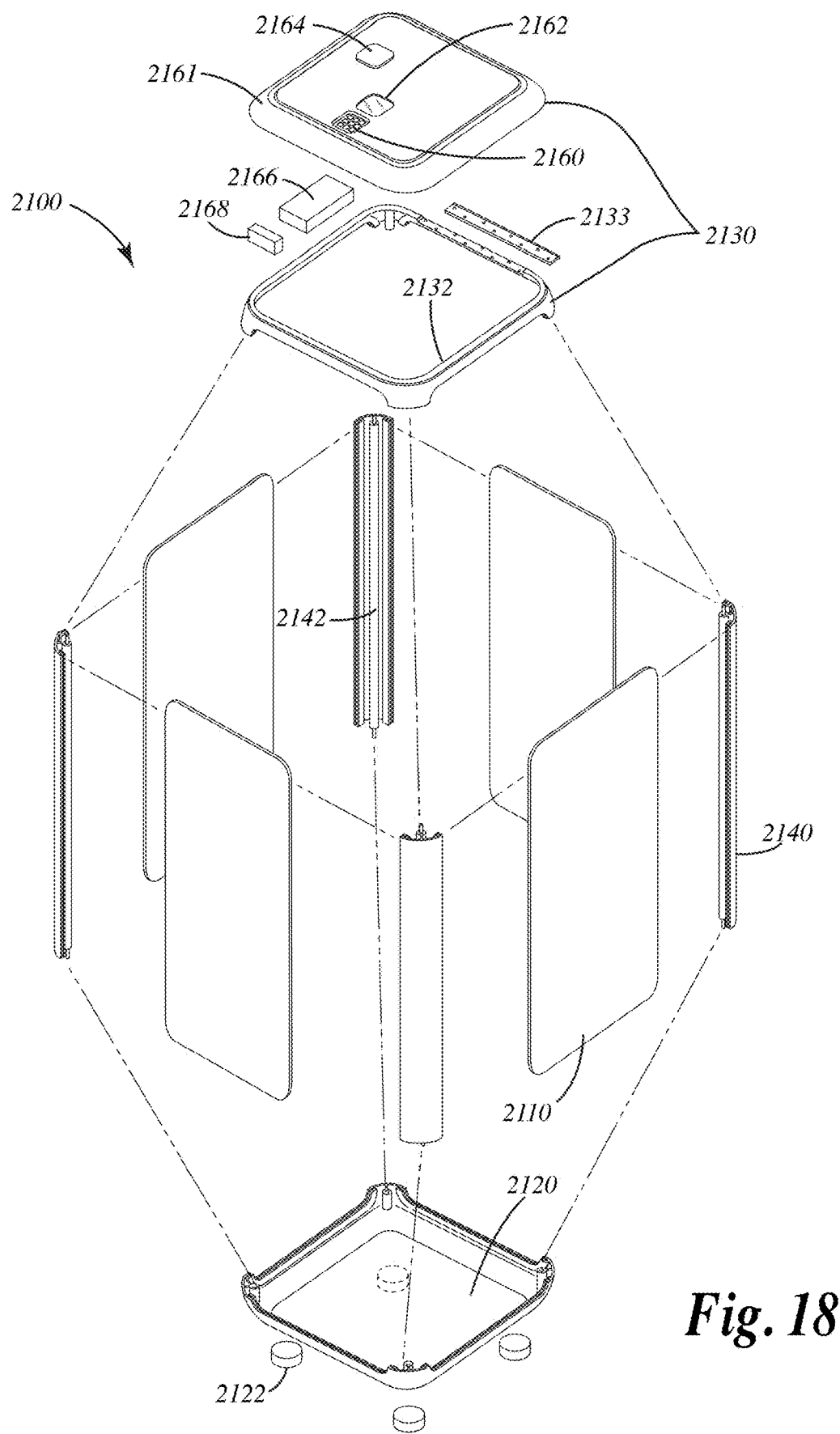
FIG. 18 illustrates an exploded view of a package storage compartment in accordance with the present disclosure.

The core component of the system is a package storage compartment, for example the package storage compartments illustrated in FIGS. 17-18. In general, the package storage compartment includes a delivery area contained by walls, a bottom, and a top. It also includes a package storage compartment door for selectively accessing the package storage compartment, a package storage compartment door actuator configured to actuate the package storage compartment door, an electronic lock configured to selectively lock the package storage compartment door to prevent unauthorized access to the package storage compartment, as well as a local user interface to operate the electronic lock and the package storage compartment door actuator. The package storage compartment can also include a package storage and security management circuit, such as the exemplary circuits depicted in FIGS. 1A and 1B. This circuitry and provide a wide array of package storage compartment functionality, such as automatic operation of the electronic lock and the package storage compartment door actuator. In some embodiments, the circuitry includes communication circuitry configured for wireless communication.

Package Storage and Security Management Circuit

Figure 1A:
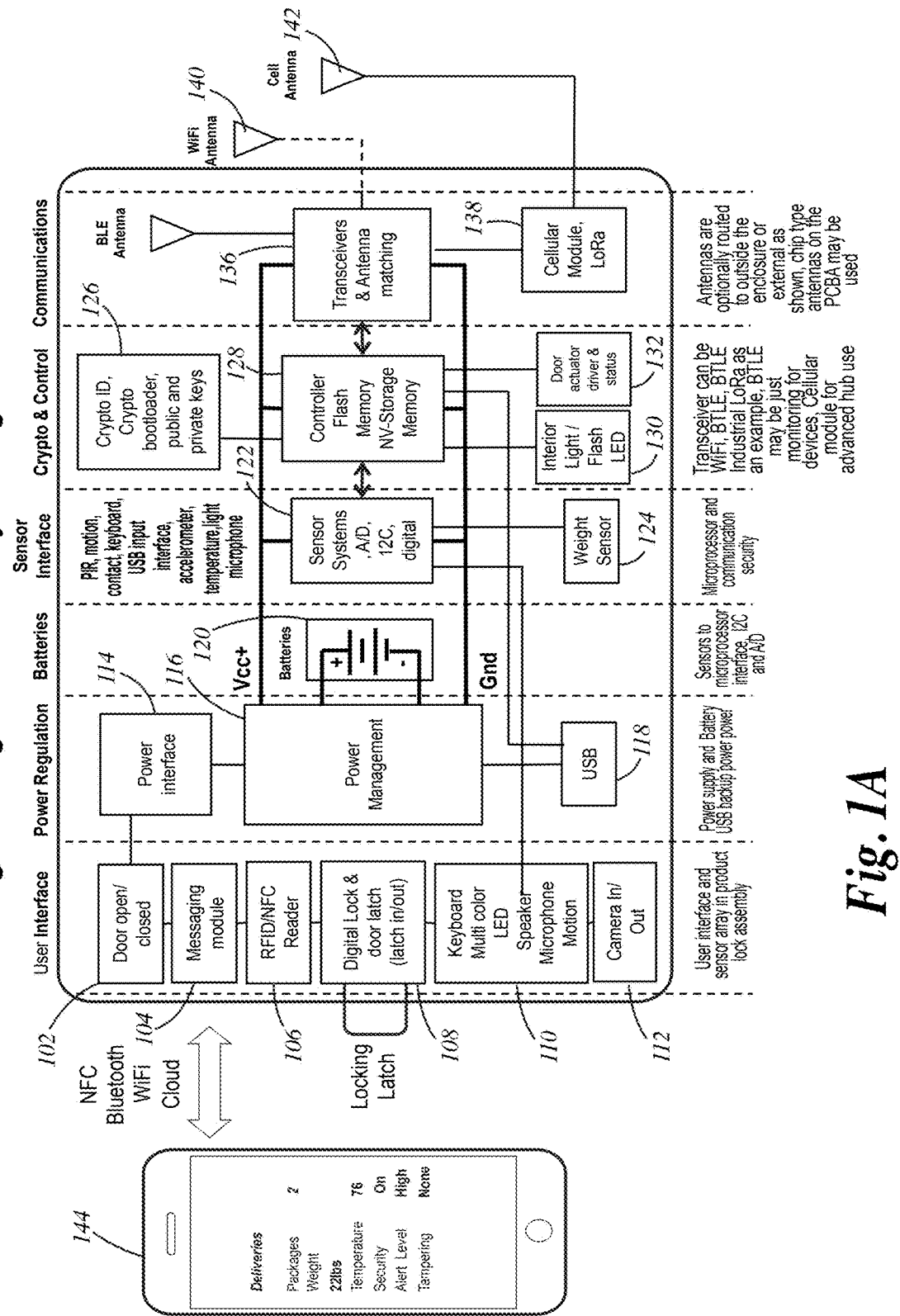
FIG. 1A illustrates a representative block diagram of a package storage and security management circuit in accordance with one embodiment of the present disclosure.
Figure 1B:
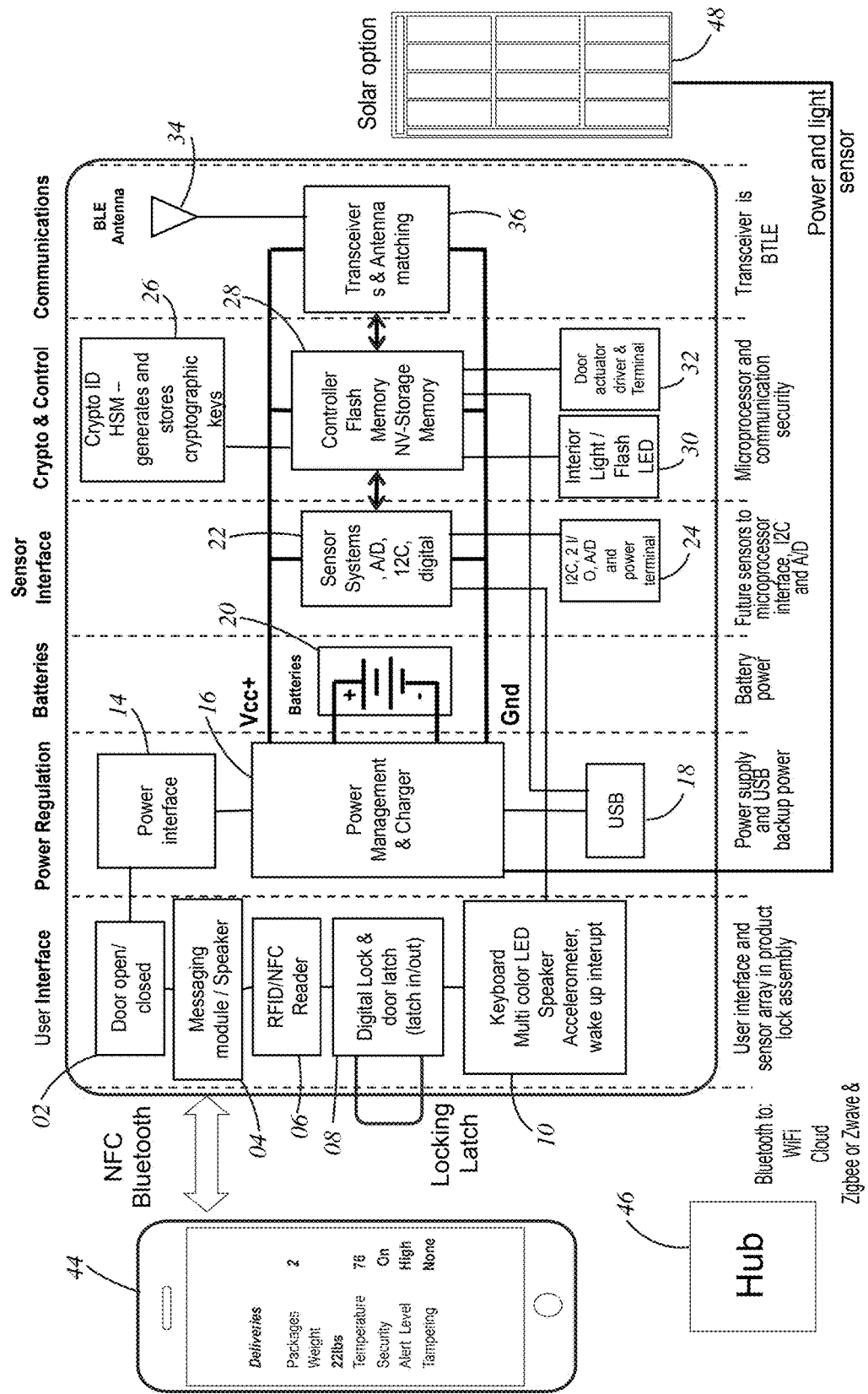
FIG. 1B illustrates a representative block diagram of a package storage and security management circuit and associated communication hub in accordance with one embodiment of the present disclosure.

FIGS. 1A and 1B illustrate embodiments of a package storage and security management circuit. These embodiments include electronics and sensors connected to an electronic lock.

The package storage and security management circuits 100, 50 can include user interface electronics. This circuitry can include an accelerometer, open and closed sensors, an actuator driver for automatically opening and closing the door, an NFC interface, a Bluetooth interface for communicating to a mobile device and a remote hub for WiFi and LoRa access. This can also be incorporated into the lock with a power management system and solar charging.

In the depicted embodiments, the user interface electronics includes a door actuation button 2, 102 for actuating the access door manually.

The user interface electronics can also include an optional messaging unit 4, 104. This unit can be configured to store and forward messages or alarms as the user programs. The messaging unit can hold digitally recorded or downloaded messages for alarms, thank you messages or special instructions. The messaging unit can include a speaker or utilize a speaker elsewhere from the package and security management circuit.

The user interface electronics can also include an RFID/NFC reader 6, 106, an electronic lock and door latch 8, 108, and one or more input/output device(s)/sensors 10, 110. The user interface electronics can also include motion detection, such as via an accelerometer, cameras 112, or another wake up interrupt system. Cameras facing inward and outward of the latch module can be provided that are configured for capturing photographs external to the compartment, e.g., of delivery interactions, as well as photographs internal of packages in the storage compartment area.

The package storage and security management circuits can include power regulation circuitry for providing and regulating power to the other circuitry. This can include a power interface 14, 114, a power management circuit 16, 116, a battery power supply 20, 120, and a connection for USB backup power 18, 118. In some embodiments, the package storage compartment can be battery powered with a voltage protected USB port for backup powering if the batteries are fully depleted.

The package storage and security management circuits can also include on-board sensors 22, 122 and sensor interfaces 24, 124 to sensors located elsewhere in the package storage compartment. The sensor interfaces 24, 124 can provide connections to various sensor systems via analog to digital circuitry, I2C connections, and other analog or digital sensor connections. This section of the circuitry can include various sensors that communicate with the controller 28, 128 e.g., via I2C I/O, or A/D. The circuitry can also be configured to provide power for on board or external sensors as well. In one embodiment, as depicted in FIG. 1A, a weight sensor interface is provided for connecting a weight sensor that is capable of sensing the weight of delivered packages, which can be utilized in various verification algorithms.

The package storage and security management circuits can include a crypto bootloader 26, 126 for over-the-air OTA security and updates. Multiple crypto passcodes for public and private security may be provided. A crypto ID hardware security module (HSM) can generate and store cryptographic keys. This module can provide a high level of physical and logical security for sensitive cryptographic operations. The HSM can create cryptographic keys used for encryption, decryption, digital signatures, and other cryptographic operations. The keys can be generated using secure algorithms and random number generators to ensure they are unpredictable and unique. The HSM can also securely store cryptographic keys within its hardware environment, protecting them from unauthorized access, tampering, and extraction. The keys can be kept in a protected memory area that is inaccessible to external entities. The HSM can also handle key lifecycle management, including key generation, distribution, rotation, archival, and destruction. It can ensure that keys are used only for their intended purposes and comply with security policies and regulations. Ultimately, the HSM provides physical security features such as tamper resistance and tamper evidence to prevent physical attacks. It can also include logical security measures like access controls, authentication, and audit logging to track and control usage of cryptographic keys. The HSM can integrate with various applications and systems, providing secure cryptographic operations as a service. For example, this can include encrypting and decrypting package storage security data about deliveries and pickups and various associated data, generating digital signatures, and verifying identities.

In some embodiments, a system and method are provided for enabling a preauthorized digital signature specifically designed for deliveries requiring secure recipient authentication, such as alcohol, pharmaceutical products, or other restricted items. This feature allows for the generation and application of a preauthorized digital signature once the intended recipient has been successfully verified and the package securely stored in a designated package storage compartment. The authentication process may involve verifying the recipient's identity using digital identification (e.g., government ID, biometric verification) and linking this identity verification to the specific delivery. The preauthorized digital signature is generated by the system after verifying the recipient's identity using digital identification, and it is then provided to the remote device of the delivery personnel as proof that they are authorized to deliver the package to the compartment. Upon meeting all necessary authentication requirements, the preauthorized digital signature is automatically applied as proof of successful delivery and receipt by the verified recipient. This preauthorized digital signature, along with other delivery metadata (such as timestamp, recipient identity verification, and compartment status), provides a secure, verifiable, and traceable record of the delivery process, ensuring that only the intended recipient is authorized to retrieve the package. This system offers a high level of security and control, maintaining a clear chain of custody for restricted items while offering convenience to both the customer and delivery service.

The authentication process can involve verifying the recipient's identity using digital identification (e.g., government ID, biometric verification) and linking this identity verification to the specific delivery. The preauthorized digital signature can be uniquely associated with an individual within the household, ensuring that only that specific individual can retrieve the package. For example, in a household with multiple members, a restricted delivery (e.g., alcohol) can be linked to a preauthorized digital signature specifically belonging to the verified adult recipient. The package storage compartment remains locked until the recipient, using their individualized digital key, successfully accesses the compartment. After verifying the recipient's identity using digital identification, the system generates a preauthorized digital signature which serves as an authorization to deliver the package. The delivery personnel receive this digital signature as proof of authorization to deliver the package, which they can do using suitable credentials to access the compartment for delivery.

This means that only the authorized signer—identified during the delivery preauthorization process—can open the compartment after the restricted item(s) have been delivered, preventing unauthorized users that otherwise would have access, such as minors, from retrieving restricted items. Upon successful verification and retrieval by the authorized recipient, the preauthorized digital signature is automatically applied as proof of delivery and acceptance to the delivery record. This serves as an equivalent to an in-person signature, thereby ensuring a secure chain of custody for deliveries that demand proof of age or identity verification. Once the restricted package has been retrieved from the compartment, the control system can be configured to revert to its previous state where any authorized user can access the compartment using their individual access credentials.

The individualized preauthorized digital signature, along with other delivery metadata (such as timestamp, recipient identity verification, and compartment status), provides a secure, verifiable, and traceable record of the delivery process, ensuring a continuous chain of custody for restricted items while offering convenience to both the customer and delivery service. This system offers a high level of security and control, ensuring that only verified recipients can accept restricted deliveries, thereby preventing unauthorized access even within the same household.

In some embodiments, the preauthorized digital signature system can also support a group-based authorization model, allowing multiple designated individuals to access the package storage compartment while maintaining secure access control for restricted delivery requirements. For instance, if the delivery involves verifying that a restricted item, such as alcohol, is not received by a minor, a preauthorized digital signature list can be established that includes multiple verified individuals, such as both parents within a household. In this scenario, either of the authorized individuals listed on the preauthorized digital signature list may access the container during a restricted mode with their individual credentials (e.g., keypad passcode), allowing the delivery to proceed while ensuring that unauthorized household members, such as minors, cannot retrieve the package. This group-based authorization maintains flexibility for the household while ensuring that the chain of custody for the restricted item is securely recorded, providing a traceable and verifiable record that only authorized persons accessed the package storage compartment with the restricted package.

In some embodiments, the package storage compartment may include a sub-compartment that is specifically designed to provide an additional level of security for restricted items. This sub-compartment is only accessible by a preauthorized digital signature, ensuring that even after the main compartment is opened, access to particularly sensitive items remains restricted to the intended recipient. The sub-compartment can be dynamically assigned depending on which authorized user is expecting a delivery. For example, a household with multiple verified recipients can utilize the sub-compartment feature to ensure that a specific restricted item is only accessible to the intended recipient. In some embodiments, the group-based authorization model may also apply to the sub-compartment, allowing multiple preauthorized individuals to access the restricted items when needed. If an item requiring additional security (e.g., a pharmaceutical prescription or alcohol) is delivered, only the individual with the matching preauthorized digital signature can open the sub-compartment, preventing unauthorized access by other household members. This feature provides adaptable and customizable security, maintaining a clear and verifiable chain of custody for restricted items within a shared household environment.

The package storage and security management circuits 50, 100 can include a controller 28, 128, which can include memory as well as operational control logic for various components, such as lighting 30, 130 (e.g., interior lights and flash LEDs), door actuator drivers and status indicators 32, 132.

The FIG. 1A package storage and security management circuit is configured as a stand-alone system while the FIG. 1B package storage and security management circuit is configured as a paired system that interfaces with a nearby hub. The circuits of the embodiments depicted in FIGS. 1A and 1B each include can include a controller with non-volatile memory, such as flash memory, as well as volatile memory, such as random-access memory (RAM). The flash memory can store the system's firmware and operating software, ensuring that the package storage system operates reliably and efficiently. It can retain system data and configuration settings even when the system is powered off, enabling quick and reliable startup. The flash memory can also be used to store long-term data such as user access logs, delivery history, security configurations, and other information that should persist through power cycles. The non-volatile nature of this memory ensures that data is preserved even during power outages or system reboots.

The FIG. 1A package storage and security management circuit is configured to communicate according to multiple communication protocols to enhance reliability and efficiency in communication. Various transceivers 36, 136, 138 and associated antennas can be provided such as, WiFi antenna 140, BLTE antenna 34, 134, Cellular and LoRa antennas 142. The Bluetooth can be used for monitoring device and the cellular module can be provided for advanced hub use. Antennas can be optionally routed to outside the enclosure or external as shown. The chip type antennas on the PCBA may also be used. Although the package storage and security management circuit may include these various transceivers as shown, various alternative embodiments may include fewer or different combinations of transceivers.

The FIG. 1B package storage and security management circuit can be configured to interface with a hub 46. Instead of the package storage and security management circuit being configured to directly communicate with various devices, it is configured with a more lightweight package of circuitry and communicates directly to a hub, typically located indoors but within Bluetooth range of the package compartment. The hub can then communicate to other devices via WiFi, Cloud, Zigbee, Zwave, LoRa, or other communication protocols.

FIG. 1B also illustrates a solar option. The package storage and security management circuit can include a solar panel 48 that provides power for the circuit as well as light sensor. The light sensor can collect data that can enable a day and night mode for battery life management.

As will be discussed in more detail later, the system may use an actuator, a physical latch or both for opening and locking the compartment.

Entry to the package storage compartment can be accomplished in a variety of different ways. For example, by keypad, RFID, NFC, RF communications and proximity by RF and RSSI signal.

In some embodiments, the package storage and security management circuit 50, 100 can communicate with a mobile device 44, 144. For example, in some embodiments, Bluetooth can be paired to mobile devices and a remote hub for providing WiFi connectivity.

A delivery truck or delivery driver can be identified as proximal to the package storage compartment so that the compartment can unlock and open automatically to facilitate hands-free package delivery. This automation can be enhanced by layered communication, e.g., both LoRa and Bluetooth signal strength, RSSI levels can be utilized to identify proximity of a delivery truck, delivery driver's personal device, or a combination thereof.

A present protocol can be configured to send messages to neighbors, delivery companies and users.

The system also has security messages for triggering alarm systems and levels of triggers based on tampering.

Package Mesh Security System

Figure 2:
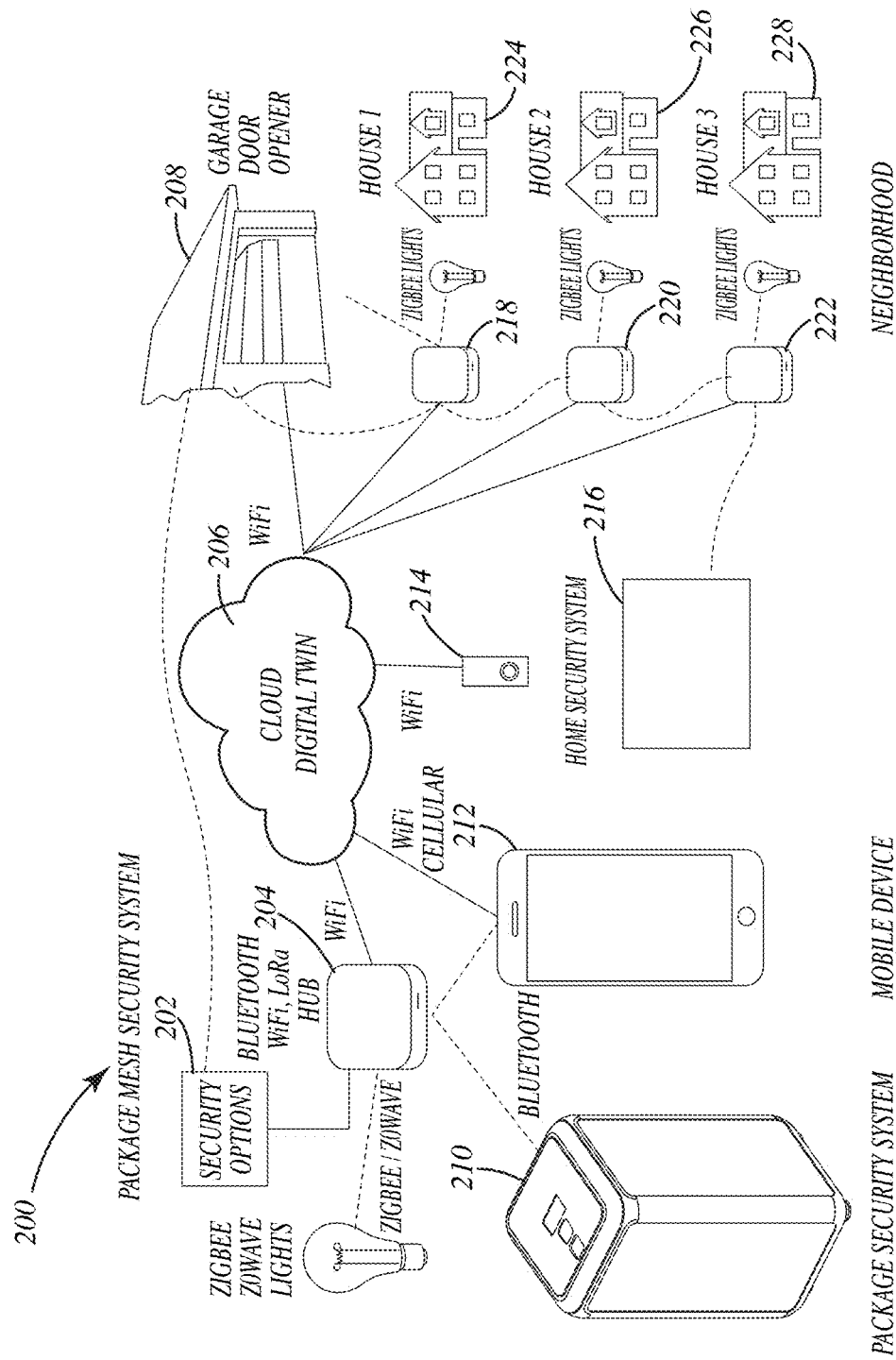
FIG. 2 illustrates a package mesh security system in accordance with one embodiment of the present disclosure.

FIG. 2 illustrates one embodiment of a package mesh security system. It illustrates the connectivity layers using multiple layered communication protocols, such as Bluetooth, LoRa, Zigbee, and WiFi. In this embodiment, there is a neighborhood of houses 224, 226, 228 that each have their own hub 204 and package security system 210. Each of the houses can have third party systems (e.g., home security systems 216, camera security systems 214, lighting systems, garage door systems 208, to name a few examples). Each of these third-party systems can have an application programming interface (API) that allows third party applications to communicate, e.g., to provide instructions or to request information. The hub has LoRa long range RF and Zigbee transceivers along with WiFi and Bluetooth.

The package mesh security system can trigger devices or scenes for home automation events. Proprietary security systems may be triggered via WiFi application specific program interfaces. In the context of home automation, triggering a device or scene generally refers to initiating a pre-defined action or series of actions in response to a specific event or condition. Triggering a device can involve transmitting a signal to a specific device or set of devices to perform a particular function or set of functions. For example, turning on a light, unlocking a door, or operating a security camera. Triggering a scene generally involves initiating a sequence of actions involving multiple devices to create a specific environment or respond to a particular situation. For example, a "Good Night" scene might turn off all lights (including those on the package storage system), while a "Welcome Home" scene might turn on the porch light and alert the user to packages waiting in the package storage system. Put simply, triggering devices or scenes refers to the system's ability to activate other home automation devices or sequences of devices based on certain events, such as the delivery of a package. For instance, when a package is delivered, the system can trigger a notification to the homeowner, turn on a light near the package storage, or activate a security camera to monitor the delivery area.

The package mesh security system can provide a universal security device interface. Hubs within a proximity check in and identify package storage system specific IDs for a sub layer of communications and messages. Bluetooth layers can provide user mobile device and hub interfaces. Further, in some embodiments, the Bluetooth interface can communicate directly to a garage door interface, a home security interface, or other third-party system. Events may be triggered using additional cameras, which can be configured via the WiFi layer or the Zigbee layer.

The package storage mesh security system can be connected to a cloud server. The data from the physical package storage systems and communication hubs can be sent to and stored on this remote server. For each physical package storage system in the network, a corresponding digital twin 206 (i.e., a digital model) can be stored in memory on a cloud server. This digital twin 206 contains all relevant data and status information about its real-world counterpart. This information can include a wide variety of information about the package storage system, such as unique ID, battery status, whether the system is open or closed, whether the system is locked or unlocked, whether the associated garage door is open or closed, whether and what Bluetooth connections are open and closed, status of the security alarm, entry data (e.g., keypad and/or near field communication (NFC)), pairing status (e.g., mobile device(s) paired, security system(s) paired, and garage door system(s) paired), programmed commands or messages, delivery mode, and security mode, to name a few possibilities. The digital twin can also maintain accumulator information, such as battery replacements, number of open/closed cycles, NFC cycles, Bluetooth cycles, alarm cycles, garage door activation cycles. The digital twin can also include information about the associated communication hub, such as a LoRa ID, RSSI value, system status, and broadcast delivery ID.

Third-Party Security System Integration

One aspect of the present disclosure includes integration of a package storage system with a third-party security system. The package storage system can incorporate an alarm-triggering magnet and a mounting location for a third-party home security system wireless transmitter. This configuration allows the package storage system to seamlessly operate with and trigger various third-party security systems, providing an additional layer of protection against theft and unauthorized access. In addition, because a variety of different third-party security system transmitters utilize a movable magnet setup, e.g., where a magnet is mounted to a door frame and the transmitter is installed on the movable door, by integrating a movable magnet in the package storage system, such as depicted in FIG. 32, a package storage system capable of trigger a variety of different security systems can be provided.

Figure 32:
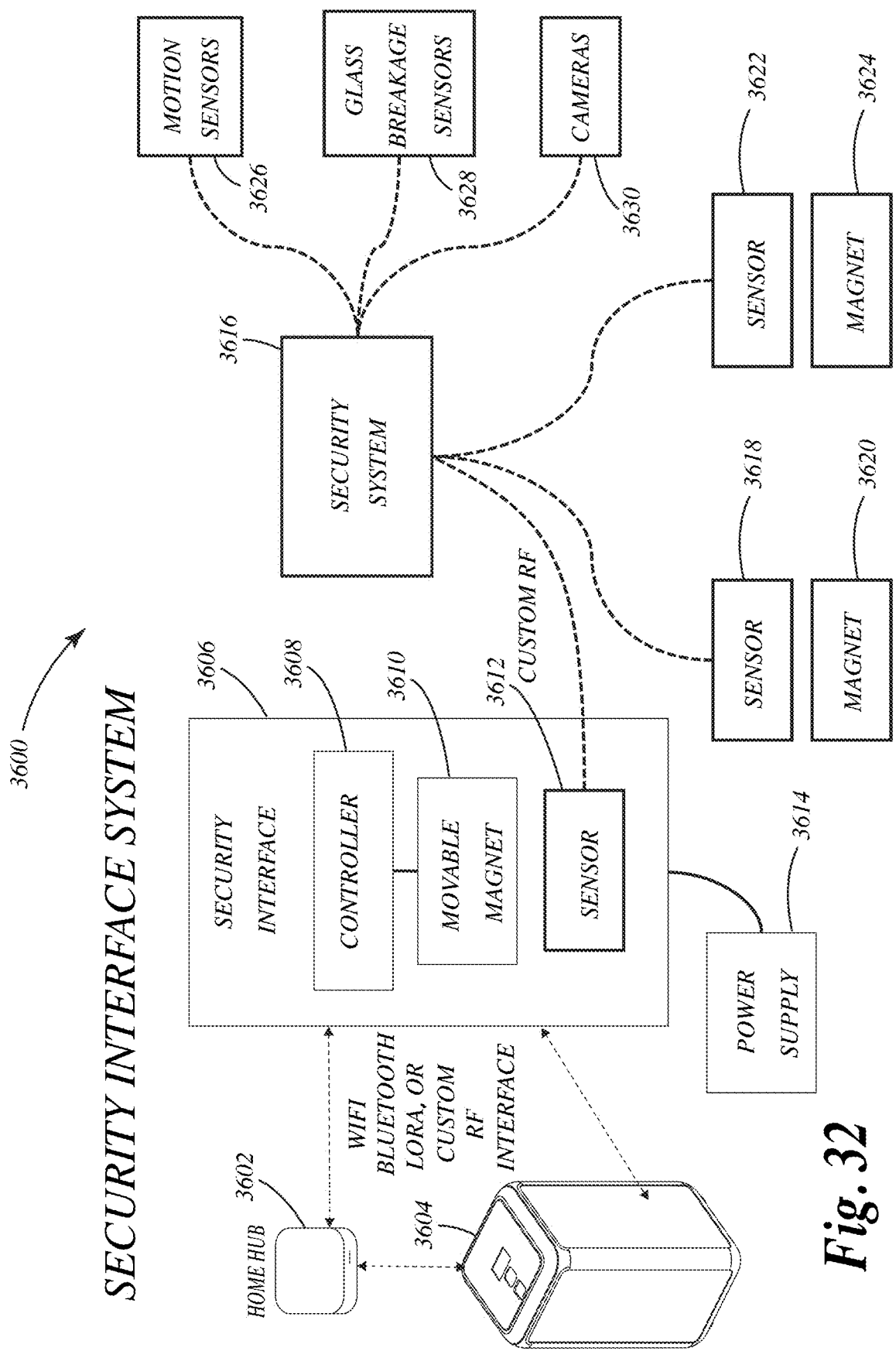
FIG. 32 illustrates a representative block diagram depicting package storage system interface with a third-party security system.

FIG. 32 illustrates one embodiment of a package storage system that includes a security interface 3606. The security interface 3606 can be integrated into the package storage compartment 3604, the home hub 3602, or can be implemented as a separate stand-alone security interface unit. The security interface can be powered by a power supply 3614, which can be a battery power supply of the package storage compartment 3604, sharing a power supply with the home hub 3602, or utilize a separate power supply, such as a wall outlet.

The third-party security system 3616 can include all of the typical components that are customary for a third-party security system such as alarm and sensor components. The sensor components can include various sensors, such as motion sensors 3626, glass break sensors 3628, cameras 3630, and sensor/magnet combinations 3618, 3620, 3622, 3624. Typically, third-party security systems come with multiple magnet sensors that are used at the various entry points into the house. For example, some third-party security systems can include a Ring magnetic camera trigger sensor, an ADT magnetic door sensor, and a Simply Safe magnetic door sensor.

For example, the main door and a rear sliding door. In the current embodiment, one of the magnetic sensors can be installed in the security interface unit and the corresponding magnet can be discarded in favor of the movable magnet 3610 installed within the security interface. In some embodiments, the movable magnet 3610 may take the form of a movable platform to which the third-party security magnet can be installed. During operation the controller 3608 can move the movable magnet in response to a suitable trigger in order to trigger the sensor 3612 transmitting a wireless trigger to the security system setting off the alarm along with any other features, such as third-party notifications. In this way, various third-party security systems can be easily integrated for use with the package storage system of the present disclosure. The controller 3608 can be a standalone controller. Alternatively, or in addition, the controller can be the controller integrated with the package storage and security management circuit of the package storage compartment 3604 or the controller associated with the hub 3602.

Messaging Layer

Figure 3:
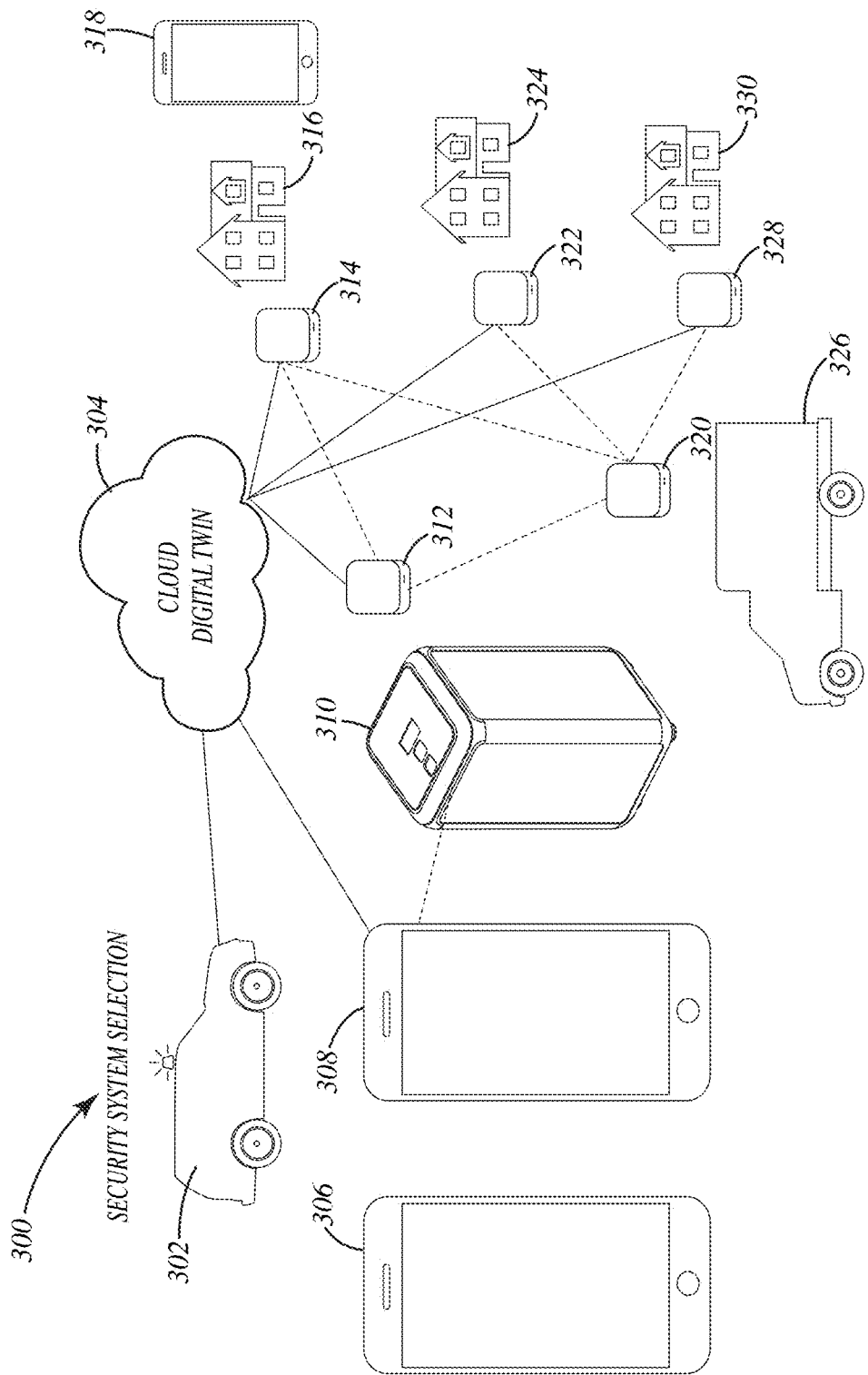
FIG. 3 illustrates an SMS communication layer of a package mesh security system in accordance with one embodiment of the present disclosure.

FIG. 3 illustrates an exemplary SMS messaging layer 300 including a package storage system 310, multiple mobile devices 306, 308, a law enforcement vehicle 302, a package delivery truck 326 and delivery truck hub 320, neighborhood security systems 316, 324, 330 and associated communication hubs 314, 322, 328. and status, theft and delivery information all delivered as local or mobile device messages, and neighborhood mobile devices 318. A neighborhood device list can be constructed and displayed on a mobile device 306, 308, and each neighbor can opt into the messages and alerts associated with devices on the neighborhood device list. A security interface can be displayed on a mobile device 306, 308. The security interface can include information such as whether the security system is armed, the type of security system, the name of the security system, any interval times, the alert level, intensity, whether the user should be notified, and whether neighbors should be notified. This messaging layer can be provided as a redundant messaging layer to any third-party security system notifications and alarm features or can act in tandem to provide redundancy for added security. The API of the third-party security system and the messaging layer can be configured to interact to avoid double notifications, while still allowing the redundant actioning in case one avenue of communication fails.

Figure 4:
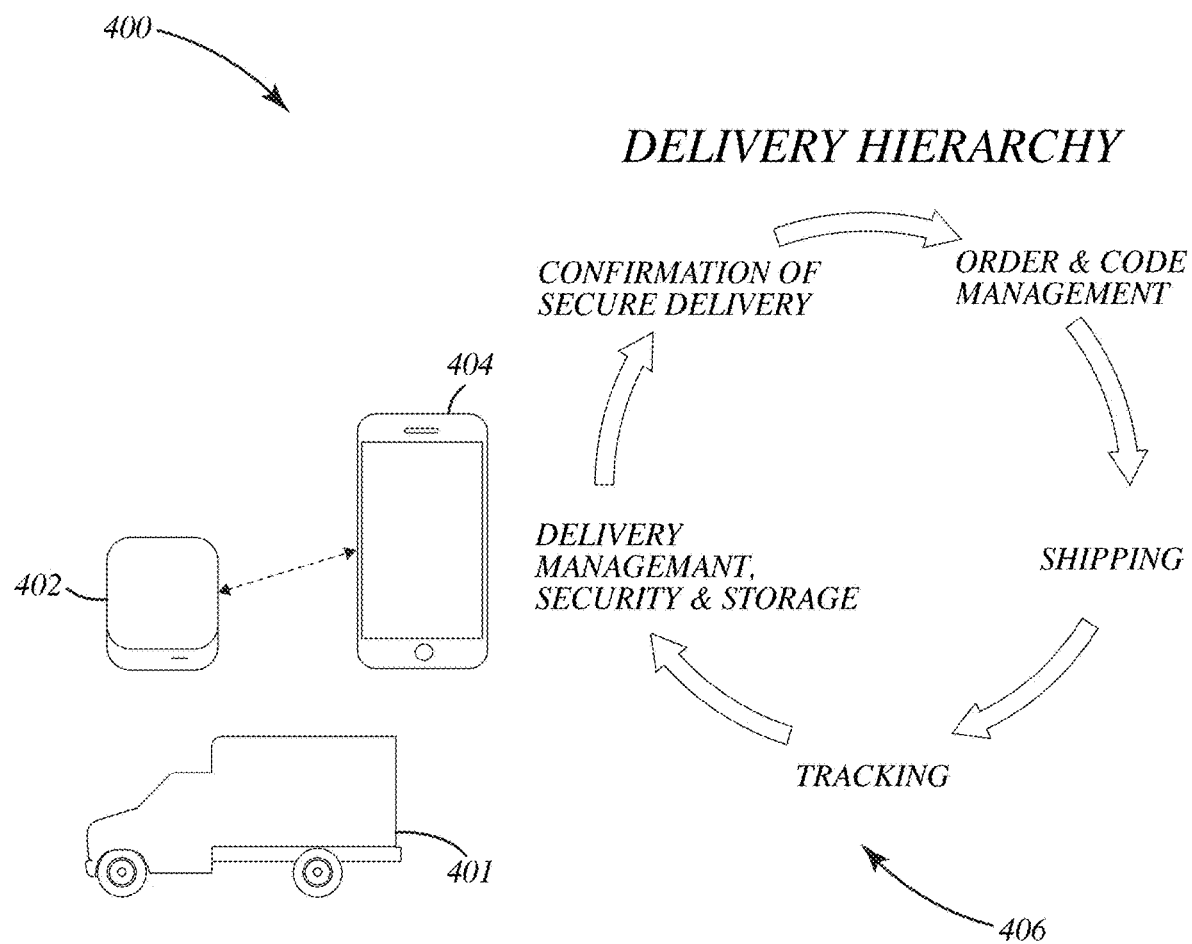
FIG. 4 illustrates a LoRa communication layer and delivery hierarchy in accordance with one embodiment of the present disclosure.

FIG. 4 illustrates a delivery hierarchy 406 for a delivery truck 401 that includes a LoRa hub 402 (e.g., that operates on 12 VDC) that can communicate with a delivery driver's mobile device 404 as well with package storage compartments along the driver's route. The delivery hierarchy 406 provides a framework for the LoRa layer of communications between homes delivery transportation and personnel. The truck ID and delivery person(s) ID are all part of the metadata shared for analysis and logging. The metadata can include various information related to the package storage system. In essence, when a customer orders a product, a code can be generated to allow delivery personnel access to the storage system at the appropriate time, the product can be prepared and shipped, during this process the parcel can be tracked so that both the customer and the delivery service can identify where the package is located and whether it has been delivered. Upon delivery, the package storage compartment can facilitate delivery management, security, and storage by unlocking and opening the compartment to provide a secure delivery area for the delivery service to deliver the package. The package storage compartment system can facilitate confirmation of secure delivery with verification services.

One type of metadata is interval delivery metadata. Interval delivery can include scheduled delivery window information. Scheduled delivery window information can refer to specific time windows during which deliveries are made. For example, a delivery service might have designated intervals such as 9 AM-12 PM, 12 PM-3 PM, etc., during which packages are delivered. This metadata can be set by the user as a preference for scheduled delivery window or set by the delivery service based on their expected scheduled delivery window.

Interval delivery metadata can include information about time between deliveries. The information about time between deliveries can describe the time interval between consecutive deliveries to the same package storage system. For instance, if deliveries are made to a particular package storage system every 24 hours, the interval delivery time is 24 hours. The interval delivery metadata can include historical information about the actual time interval between consecutive deliveries as well as aspirational or expected time interval information set by the user or delivery service provider.

Interval delivery metadata can include delivery time prediction information. That is, the interval delivery metadata can include the estimated time interval between the current time and the expected delivery time. For example, if a package is expected to be delivered in the next 30 minutes, the interval delivery time is 30 minutes. The information can be historical, expected, aspirational, or an aggregation thereof.

Interval delivery metadata can include batch delivery intervals. Some delivery service providers group packages for delivery in batches at regular intervals. Batch delivery interval refers to the fixed time between each batch delivery.

Package Delivery and Verification

FIGS. 5-8 illustrate some representational views showing operation during delivery and verification. Some embodiments can include a dual photograph system where the package storage system includes two cameras: an internal camera positioned to capture images of the delivered packages inside the compartment, and an external camera configured to capture images of interactions outside the compartment. This dual camera setup provides comprehensive documentation of the delivery process, aiding in security and verification. It can also be valuable to deter and document theft and vandalism. Time stamp and locked delivery data can be used for additional digital signature of a secure delivery.

Figure 5:
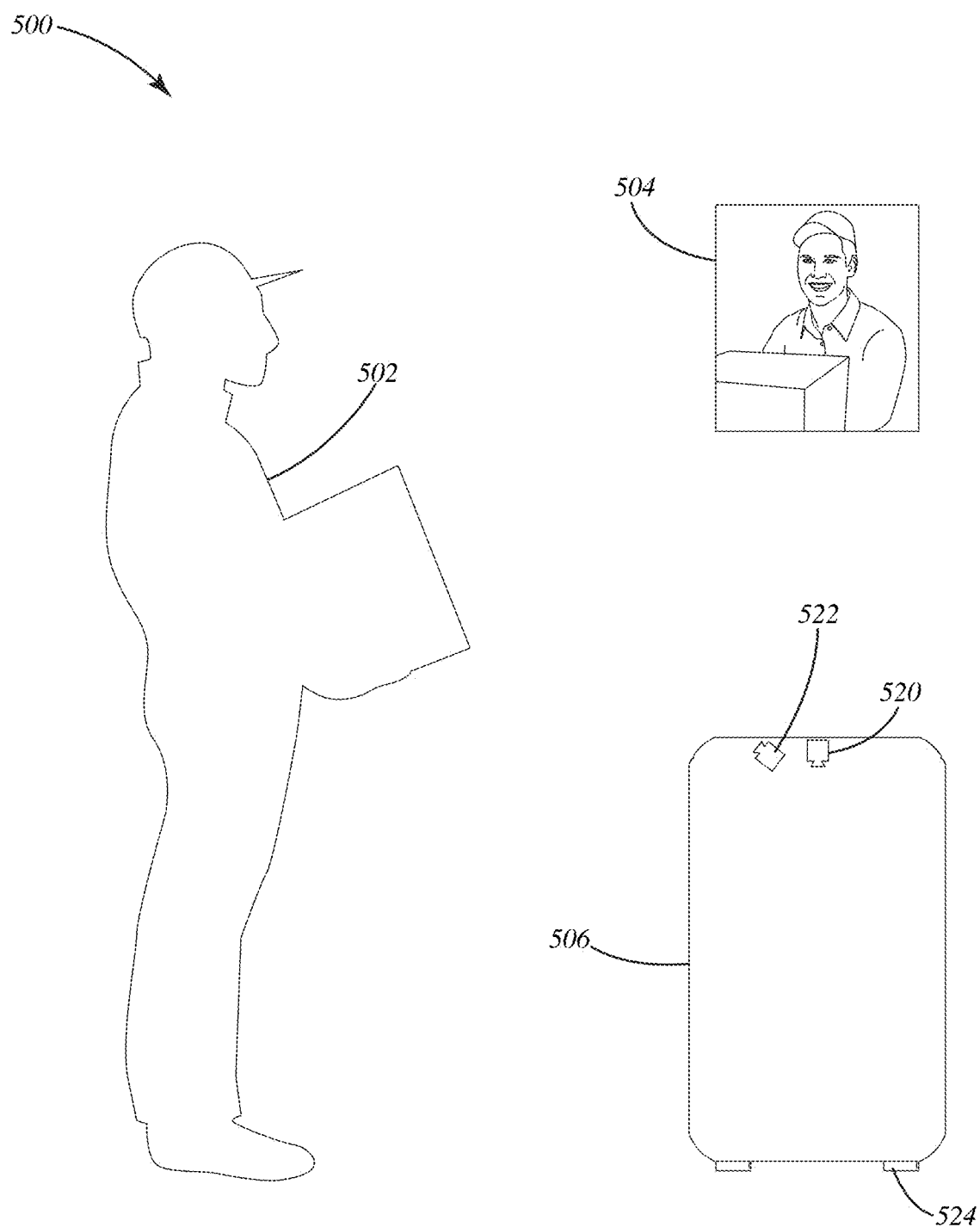
FIG. 5 illustrates a package storage system delivery use case with interaction photography.

FIG. 5 illustrates a visualization 500 of a motion detector trigger for capturing an interaction photograph 504 with a package storage system 506. For example, the package storage system 506 can capture a photograph of a delivery agent handling a delivery attempt or completion. As another example, the package storage system 506 can capture a photograph of a thief and vandal attempting theft or vandalism of the package storage compartment. In such embodiments, the package storage system 506 can include a motion detector (e.g., an outward facing camera 522 or accelerometer) that can detect motion in the area surrounding the package storage system, direct motion associated with the package storage system, or a combination thereof. In response to motion detection, the motion detector can be configured to transmit a signal to the package storage and security management circuit 50, 100. Alternatively, one or more motion detectors can provide sensor output to the package storage and security management circuit 50, 100, which can analyze and determine whether motion detection accordingly. In response to motion detection, the circuit 50, 100 can coordinate image or video capture from one or more cameras 520, 522 positioned to capture images or video of the area.

The cameras can include an inward-facing camera 520 to capture images of the package storage compartment's contents and an outward-facing camera 522 to capture interactions outside the compartment. When motion is detected, both cameras can be triggered to provide comprehensive documentation of the event.

The captured images or videos can be stored locally in the package storage system memory or transmitted to a remote server for storage and further analysis. Additionally, these images can be sent as real-time notifications to the user's mobile device, alerting them to the detected motion and allowing them to take appropriate action if necessary. One advantage of certain embodiments of the present disclosure is that the camera information can be efficiently transmitted in real-time or near real-time to remote devices either directly or indirectly via a nearby hub. This can provide additional security and protection because a would-be thief or vandal may be hesitant to attempt vandalism or theft against a device where photographic evidence is likely to be captured and stored remote from the package storage compartment itself.

In some embodiments, the system can differentiate between different types of motion to trigger specific responses. For example, the package storage system can be programmed to recognize typical movements of delivery personnel and differentiate them from potential theft or vandalism attempts. This can be achieved through advanced motion detection algorithms and machine learning techniques that analyze movement patterns and other contextual data. Some embodiments of the present disclosure involve a mesh network that includes multiple package storage compartments. Machine learning or artificial intelligence-based algorithms can be enhanced by collecting package storage compartment image data from multiple sources.

Furthermore, the package storage system can integrate with external security systems to enhance overall security. For example, upon detecting suspicious activity, the package storage system can trigger a package storage system alarm, a third-party security system alarm, notify law enforcement, notify user device(s), or notify neighborhood package storage systems. In some embodiments, the package storage system can activate additional security cameras in the vicinity, either local cameras installed on the package storage system, or third-party cameras installed near the entryway or other areas of the home. In some embodiments, the package storage system can communicate using third-party system application programming interface to coordinate a suitable response to different alert levels. For example, cameras in the vicinity may have a normal operation schedule, the API may be utilized to command these cameras to change operation, e.g., to retain certain timestamp ranges of data based on motion, planned delivery times, or other triggers from the package security system. The capability to configure a package storage system with additional redundancy (e.g., multiple notifications or alarms) can provide a robust and comprehensive security solution for package deliveries and storage that is not available with traditional parcel delivery and storage solutions. The image API may include features for detailing and linking to package scanning, identifying sequential deliveries, and determining the package level and capacity of the storage system and sharing that across the delivery ecosystem by secure API. The digital signature can be configured such that that the package image is taken after the lock is activated, inside the compartment and that the package was scanned and placed in the storage system.

Figure 6:
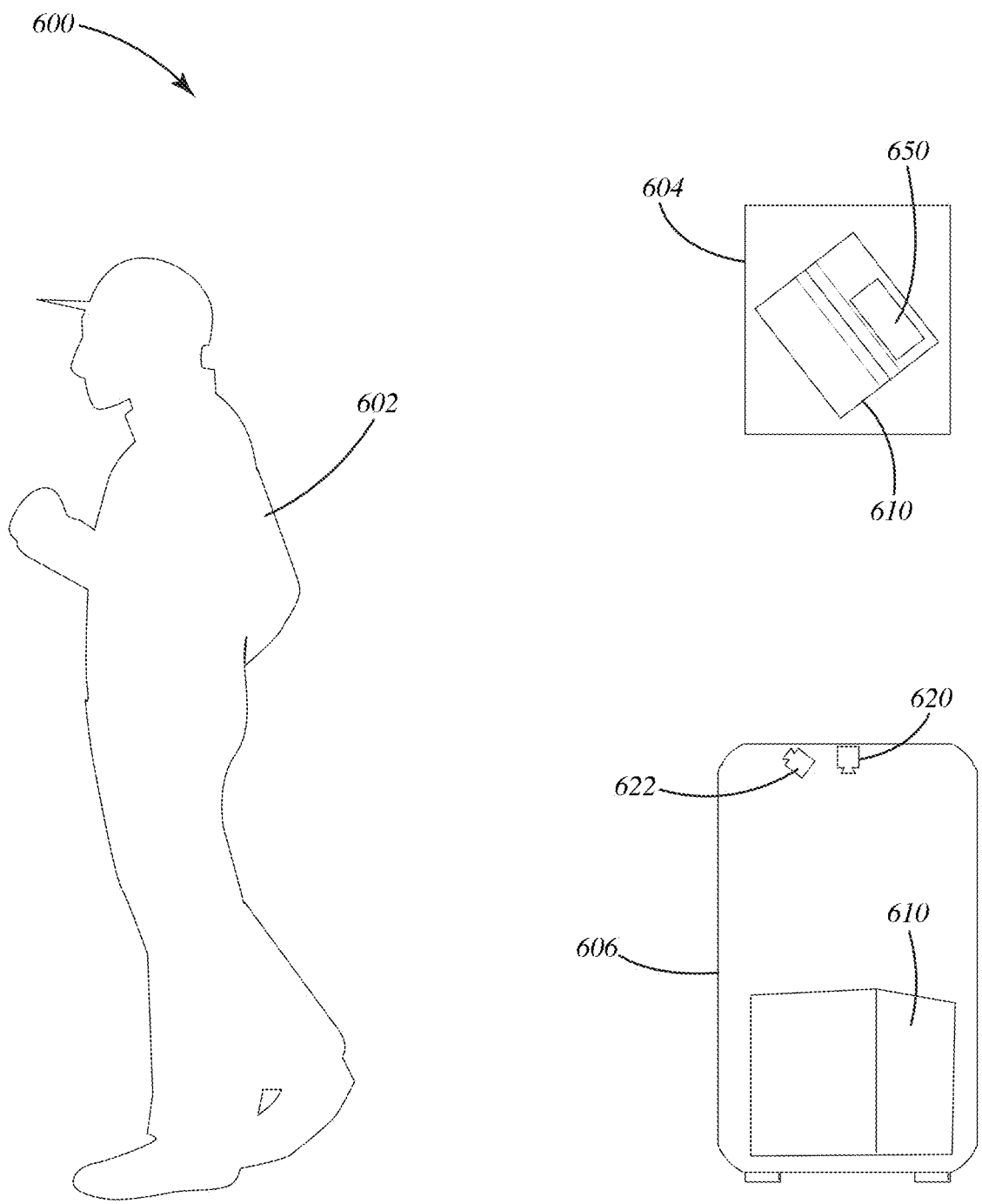
FIG. 6 illustrates a package storage system delivery use case with delivered package photography.

FIG. 6 illustrates a visualization 600 of one embodiment of secure package validation upon delivery of a package by capturing a photograph 604 of a package within the locked storage device 606. The unit captures the metadata of the truck ID, delivery person(s) ID, and the type and delivery of the package. The photograph 604 can be timestamped and correlated with timestamped data of the unlocking, opening, locking, and closing of the storage container such that the photograph verifies that the delivery was completed in a secure fashion.

In the depicted embodiment, the package storage system includes an internal camera 620 positioned to capture images of the interior of the package storage compartment. When a delivery is made, the system automatically activates the internal camera 620 to take a photograph of the delivered package 610. This image is then stored in the system's memory and can be transmitted to the user's mobile device or a remote server for verification and record-keeping.

Along with the image, the system can also capture, and record metadata related to the delivery. This metadata can include the truck ID, which can be obtained via a wireless communication link with the delivery vehicle's onboard system or via lookup based on RF information communicated from a delivery personnel badge or device. A delivery person 602 ID can be captured through RFID/NFC tags or communicated automatically by the delivery person handheld device. Alternatively, an interaction photograph can be staged such that the delivery badge or ID is captured within a delivery interaction photograph taken with a forward facing camera 622. Additionally, the package information 650, such as the type of package and other relevant details such as delivery time and date can be recorded by sensing the information directly on the label or detecting indicia embedding such data.

The system utilizes a combination of sensors and communication protocols to gather and verify this information. For example, an RFID/NFC reader can be used to read identification tags, while a WiFi or Bluetooth connection can facilitate communication with the delivery truck's system. The metadata and the captured image are then associated and stored together, providing a comprehensive record of the delivery.

To enhance security and prevent tampering, the package storage compartment can remain locked during the entire process, only allowing access to authorized personnel. The electronic lock can be controlled by the package storage and security management circuit, which ensures that the compartment is only opened by verified delivery personnel. This process can include multiple layers of verification, such as proximity detection via RSSI signals, NFC tags, or digital signatures from the delivery person's handheld device.

The captured image and metadata can serve as proof of delivery, allowing users to verify that the package was delivered securely and without tampering. In the event of a dispute or theft, this information can be used to track the delivery and identify the involved parties. The system can also send real-time notifications to the user's mobile device, providing instant updates on the delivery status.

The integration of these features can help to ensure that the package storage system not only secures delivered packages but also provides a reliable method for validating and documenting deliveries. This comprehensive approach to package security and verification enhances user confidence and reduces the risk of package theft or loss.

Package Photograph Portal

The package storage system can include a dedicated package photograph portal. This portal allows for the capture of images of delivered packages by a third-party camera (e.g., delivery personnel camera), which can be wirelessly communicated to other devices (e.g., a delivery truck hub, a package storage compartment, a user hub, or other devices) to facilitate package delivery verification. The portal can include a lens or other transparent material with a watermark, serial number, or other identifier to facilitate authenticating photographs taken through the portal.

Figure 7:
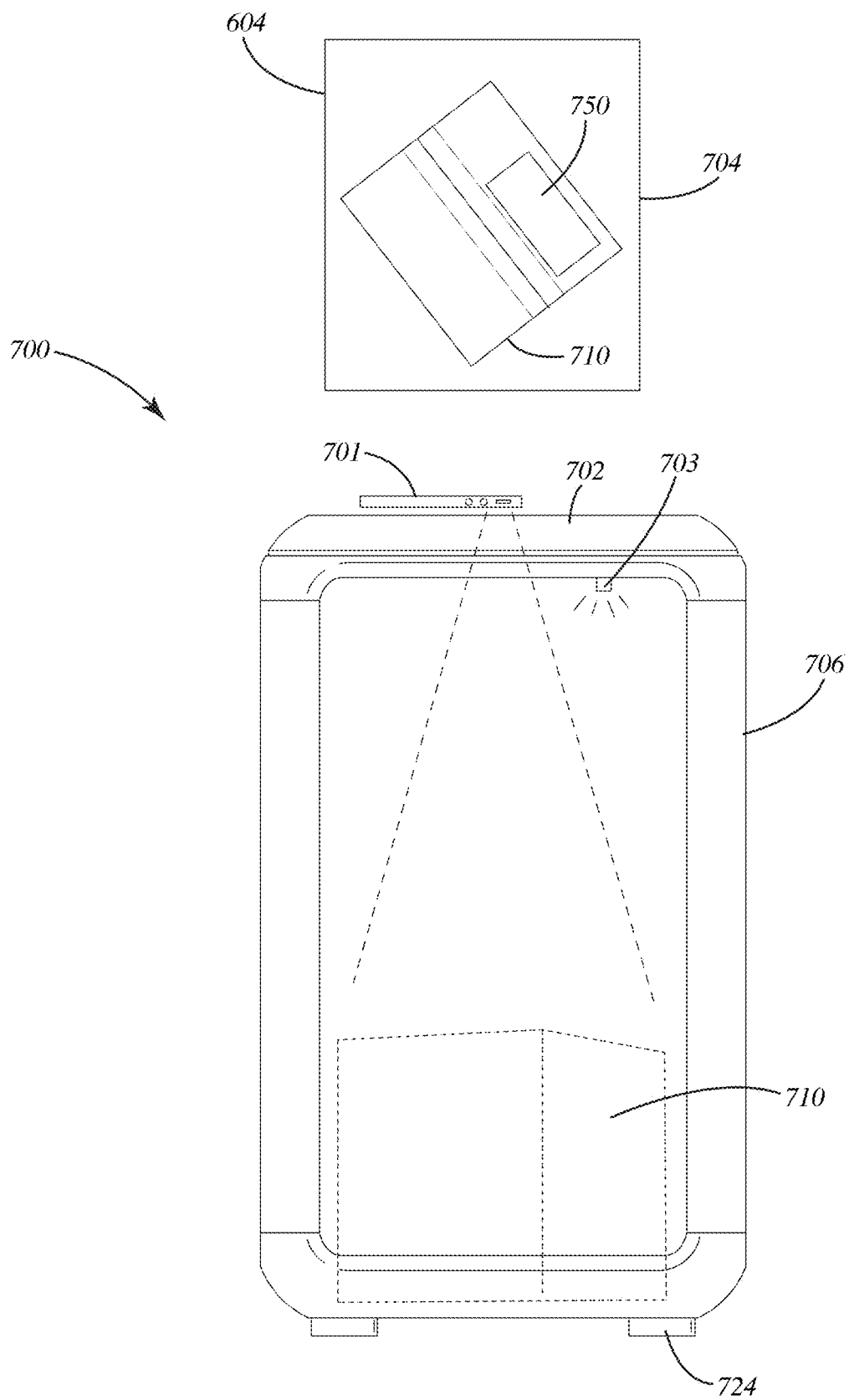
FIG. 7 illustrates a package storage system configured for photographic package delivery evidence collection via a package storage compartment photography portal.
Figure 8:
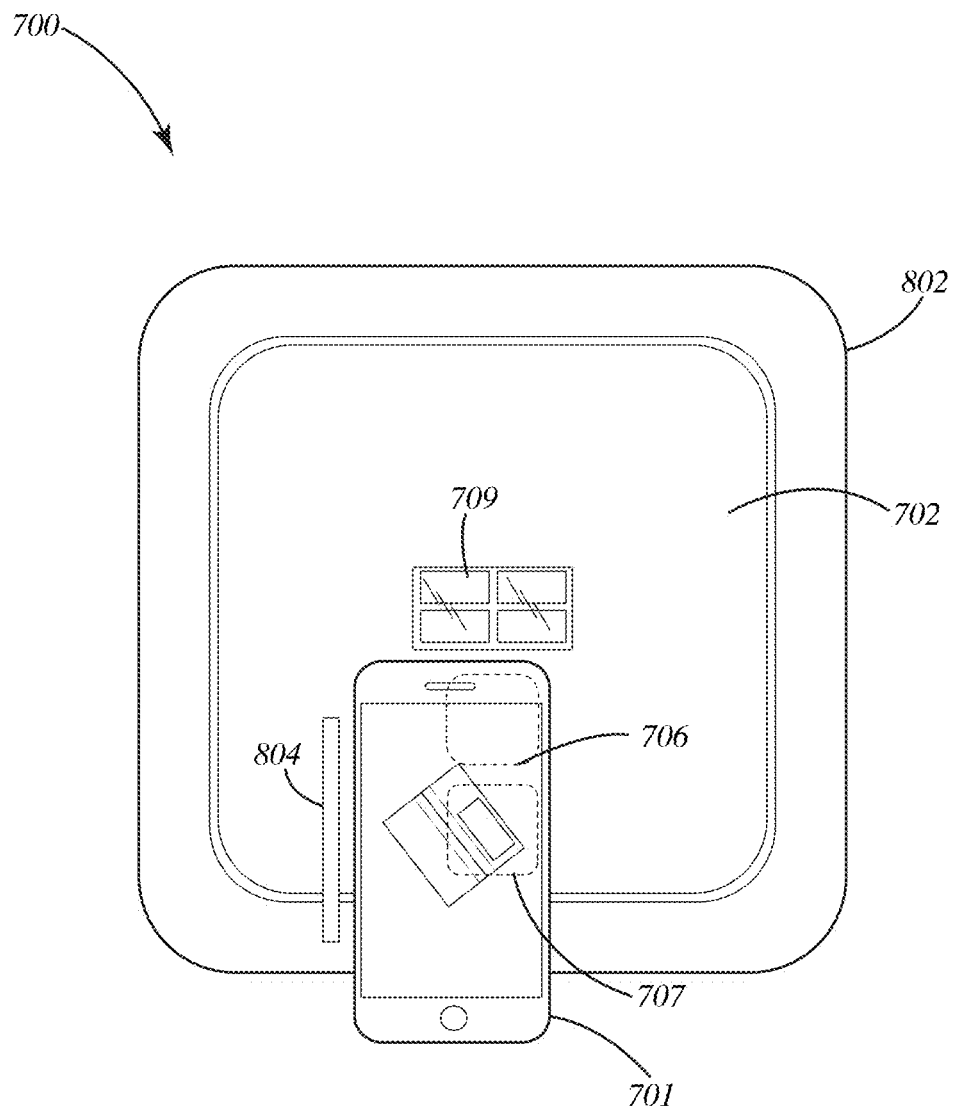
FIG. 8 illustrates another embodiment of a package storage system configured for photographic package delivery evidence collection via a package storage compartment photography portal.

FIGS. 7-8 illustrate operation of a package photograph portal 706 in the lid 702 of the package storage compartment 700. This embodiment provides a system utilizing a mobile device 701 to capture pictures of deliveries that can be used instead of or in addition to the internal camera as depicted in the FIG. 6 embodiment. A photograph portal 706 or window allows the package to be captured as delivered in the secure storage device. A light 706 (e.g., a light emitting diode) can illuminate the storage area. The light 706 can operate based on motion sensing (e.g. via an accelerometer or interaction camera), by manual switch/keypad, or via communication with the mobile device 701 to ensure the light is on while photographs are being captured. The ID of the package 710 may be physically indicated (e.g., via indicia 750) within the storage device or metadata shared via communications. The scanning of packages combined with the image of these packages locked in a secure delivery system can define a digital secure signature and opens many new doors to secure delivery and e-signature. This can be combined with the owners preauthorization of the secure e-signature and a new method of secure delivery, securing and confirmation validation can now be offered without needing to be present.

In some embodiments, the mobile device 701 can interact with the package storage compartment utilizing an NFC interface. The NFC interface can coordinate metadata exchange before, during, or after capturing a photograph. The NFC interface can lock and unlock the storage at suitable times during the process. For example, as delivery personnel approaches, the compartment 706 can be automatically unlocked and opened so that the package can be placed within the delivery area, then after sensing the package is present the compartment lid can be automatically closed and locked, with timestamps saved in metadata associated with each action. From there, the delivery person can be prompted to hold their mobile device camera lens up to the portal to obtain a picture 704 of the delivered package. Having set the package with the label side visible to the portal, the camera can capture the label data, which provides a convenient tie in for all of the metadata to be combined with metadata shared over NFC. This can allow a complete delivery verification record to be created with location, compartment ID, delivery ID, time, date, and locked verification information. Further, the camera flash can be controlled and timed to illuminate the delivery area or can be actively prevented from flashing in favor of an internal LED light providing the flash for the delivery photograph.

Various sensors can be provided in the compartment to aid with understanding the delivery status. For example, one or more load cells 524, 724 for sensing package weight can be utilized to understand when the package has been delivered into the delivery area. The weight can also facilitate the verification procedure by sensing the actual weight relative to the expected weight according to package information or an actual weight according to shipping information. Further, a simple delay can be provided after the delivery detection to allow sufficient time for the delivery personnel to clear from the delivery area of the compartment, or alternatively sensors can be provided near the compartment lid, e.g., beam break sensors to sense when the delivery personnel has cleared the compartment and the lid is clear for closure. In other embodiments, the delivery personnel can manually close the lid or activate a button on the device that can actuate the package storage lid.

FIG. 8 illustrates a top view of the package storage system 700 configured for photographic package delivery evidence collection via a package storage compartment photography portal 706 in the lid 702. The embodiment of FIG. 8 can aid in camera alignment. Marking(s) or physical guide(s) 804 can be provided to align a mobile phone 701 camera positioned on the lid 702 of the package storage compartment with the photography portal 706. As most mobile phones have a camera lens in the top right quadrant, this positioning can be useful for aligning the mobile device quickly to the portal. Additionally, the size, shape, and alignment can contribute to masking or excluding the flash from reaching the inside of the compartment, which allows the lighting within the storage device to be solely responsible for providing lighting for photography through the portal. The photography portal 706 can include a lens. It can also include a lens weather protector, which can facilitate excluding flash to eliminate nefarious photos. This has the added benefit that without the proper credentials or commands being issued by the package storage system, unwanted mobile photography by non-authorized personnel can essentially be prevented because without the internal lighting within the portal, any photographs taken through the portal will capture little visible detail. The positioning provided by the guidance rail(s) or marking(s) for the mobile device can also facilitate alignment of NFC coils or other communication circuitry that can enhance transfer speed and efficiency of information sharing, such as metadata about the transaction. Alternatively, in some embodiments, the app associated with handling the photography in connection with the portal can disable the mobile phone camera flash so as not to interfere with the photograph.

As mentioned above, physical guide(s) may be provided as alignment features in the lid to prevent misalignment. In some embodiments, the physical guide(s) can take the form of a pair of guidance rails are provided at a particular width that allows the rails to straddle the width of the mobile device and align typical mobile device cameras with the portal. In some embodiments, the physical guide is a guidance corner that allows the corner of the mobile device to fit within and aligns the mobile device camera to the portal. Because the shapes and sizes of mobile devices can vary to some degree, in some embodiments the guide(s) can be selectively movable to accommodate certain mobile device dimensions. For example, for guidance rails, they can be configured to slide apart to accommodate different size mobile devices. For a guidance corner, it can be configured to slide in a generally diagonal direction relative to the portal to allow different size mobile devices to align with the portal. Alternatively, or in addition, multiple sets of markings may be provided to accommodate different mobile device alignment configurations. The contour of the lid can be provided such that the mobile phone 701 rests comfortably on the lid. The keypad/interface 707 can be provided in a sunken fashion with respect to the lid 702 such that it does not interfere with the seating of the mobile phone 701 on the lid during photography capture. Further, the solar pad 709, if included, can be located in the lid 702 so as not to interfere with the photography portal or the mobile phone's arrangement while capturing photographs through the portal.

Figure 9:
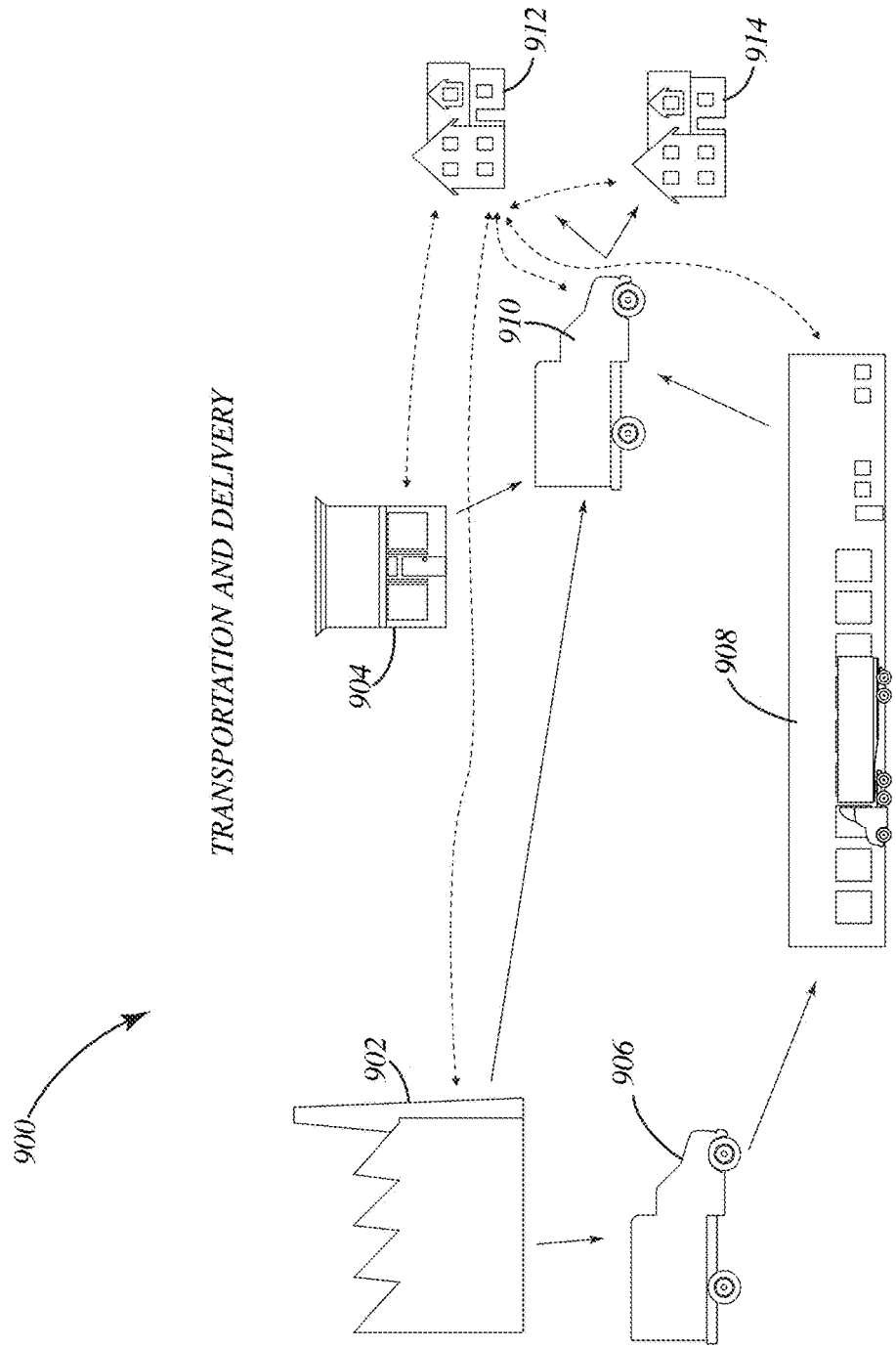
FIG. 9 illustrates the process of delivering and verifying that the package has been delivered to a locked storage system to close the delivery loop.

FIG. 9 provides a visual representation of the process of delivering and verifying that a package has been delivered to a locked storage system to close the delivery loop 900. In this embodiment, the delivery process 900 begins with one or more delivery vehicles 906, 910 equipped with an onboard communication system (e.g., a hub) originates at a location (e.g., a manufacturing and production line 902 or distribution center 908). The onboard system can receive communication about various packages being loaded into the delivery vehicle and metadata related to those packages can be updated in the cloud, e.g., in the digital twin of the package storage compartment associated with the deliveries. The delivery vehicles then travel to their destination (e.g., a retail store 904 or homes 912, 914). Throughout the travel, the vehicle hub can communicate with the cloud server (e.g., digital twin) to share updates about progress, whereabouts, and estimated delivery time. Upon reaching the destination, the vehicle hub can communicate with the package storage system at that destination to coordinate automatic unlocking and opening the package storage system for a hands-free delivery. That is, each package storage compartment can include an electronic lock and a compartment door actuator that can be operated remotely based on information provided by the delivery vehicle hub or other delivery personnel device.

More specifically, upon arrival, the delivery vehicle 906, 910 can send an arrival signal to the package storage system, which triggers the system to unlock and open the package storage compartment door. This signal can be transmitted via various communication protocols, such as LoRa, Bluetooth, or WiFi, ensuring reliable connectivity. In some embodiments, the signal can be transmitted redundantly via multiple protocols to ensure a smooth hands-free delivery. The proximity of the delivery vehicle or delivery personnel can be verified using RSSI levels or other proximity detection methods.

As the compartment door opens, the internal camera can be activated to capture a timestamped image of the current status of the compartment, ensuring that it is ready to receive the package. The delivery personnel or delivery drone can then place the package inside the compartment. Once the package is placed, the internal camera can capture another timestamped image of the package within the compartment for verification purposes.

Simultaneously, an external camera can capture images or video of the delivery interaction, documenting the delivery process and the personnel or drone involved. The system can also records metadata such as the truck ID, delivery ID, delivery time, and package details (e.g., package weight). This metadata can be securely stored in the system memory and can be transmitted to a remote server (e.g., a digital twin) for further verification and record-keeping.

After the package is placed inside, the package storage compartment door is automatically closed and locked by the door actuator and electronic lock. The system can verify the locked status using sensors, ensuring that the compartment is secure. The internal camera can capture a final image to confirm that the package is safely stored, and the compartment is locked. Or, alternatively, if the package storage compartment features a package photograph portal, a mobile device can be utilized to obtain a photograph of the delivery through the portal.

The system can generate a delivery verification record, which includes the images captured by the internal and external cameras, as well as the recorded metadata. The verification record can also include any images provided by wireless communication from devices involved in the delivery transaction. The verification record can be stored locally and transmitted to one or more locations (e.g., the user's mobile device, the delivery truck hub, the delivery driver mobile device, the delivery service cloud server, and the package storage compartment digital twin). The user can receive real-time or near real-time notifications about the delivery status, including images and metadata for verification.

In case of any discrepancies or issues, the system can trigger an alarm and notify the user, delivery service, and law enforcement. The system's integration with third-party security systems allows for immediate response to potential security threats.

This automated process ensures a secure and verifiable delivery, reduces the risk of package theft or loss. The combination of cameras, sensors, and robust communication protocols provides a comprehensive solution for managing and verifying package deliveries. The captured images and metadata can serve as proof of delivery, enhancing user confidence and providing a reliable record for resolving any delivery disputes. Furthermore, the digital twin verification records can provide a data bank that can be analyzed over time to facilitate predictive analytics for delivery patterns and enhancing overall security measures. This collection of verification records ensures continuous improvement and adaptation to evolving security challenges.

Figure 36:
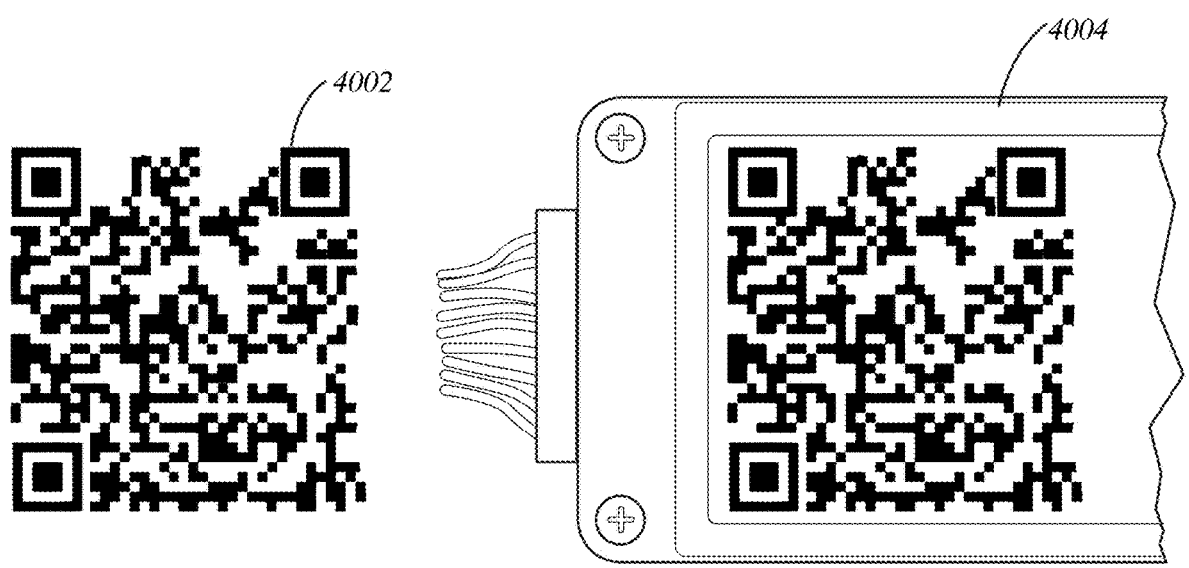
FIG. 36 illustrates an exemplary optical label for use with the package storage system.
Figure 37:
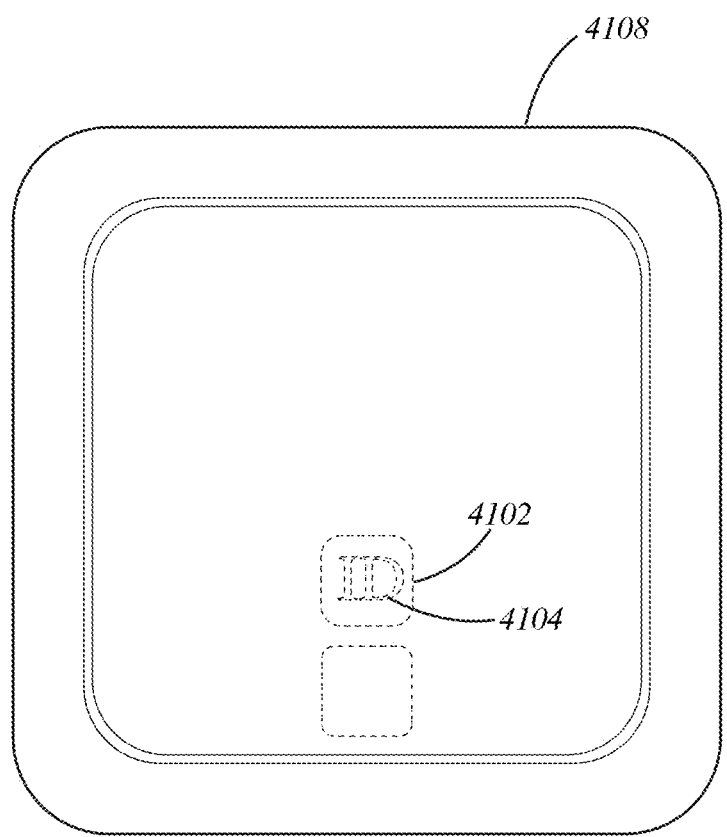
FIG. 37 illustrates an exemplary photograph portal watermark.

FIG. 36 illustrates an exemplary optical label 4002 for use with the package storage system. This optical label can be positioned within the view of the camera capturing delivery evidence or within view of a mobile device camera that is aligning to take photographic evidence through a package photograph portal in the package storage compartment. In some embodiments, the optical label can be a dynamic optical label 4004 that can be programmatically changed. For example, each delivery can have a different dynamic optical label that is captured by the photograph. This dynamic label can also be encoded with various metadata associated with the delivery, such as timestamp, package being delivered, or other delivery information. These optical labels, dynamic or otherwise can be utilized for scanning for entry, pairing security, returns, and setup. Further, in some embodiments, the package storage compartment 4100 can include a translucent portal watermark 4104 on the photograph portal 4102 as shown in FIG. 41 may be used as an optical label for scanning for entry, pairing security, returns, and initial setup. The watermark can be a brand or other indicating indicia. The watermark in some embodiments can be a unique or semi-unique identifier such that pictures taken through that portal can be identified by the watermark identifier.

Tethering

FIGS. 10-16 illustrate several embodiments of tethering systems and methods for securing a package storage system to an entryway. These systems enhance the security of the package storage compartment by physically securing it to a fixed structure, thereby deterring theft.

Figure 10A:
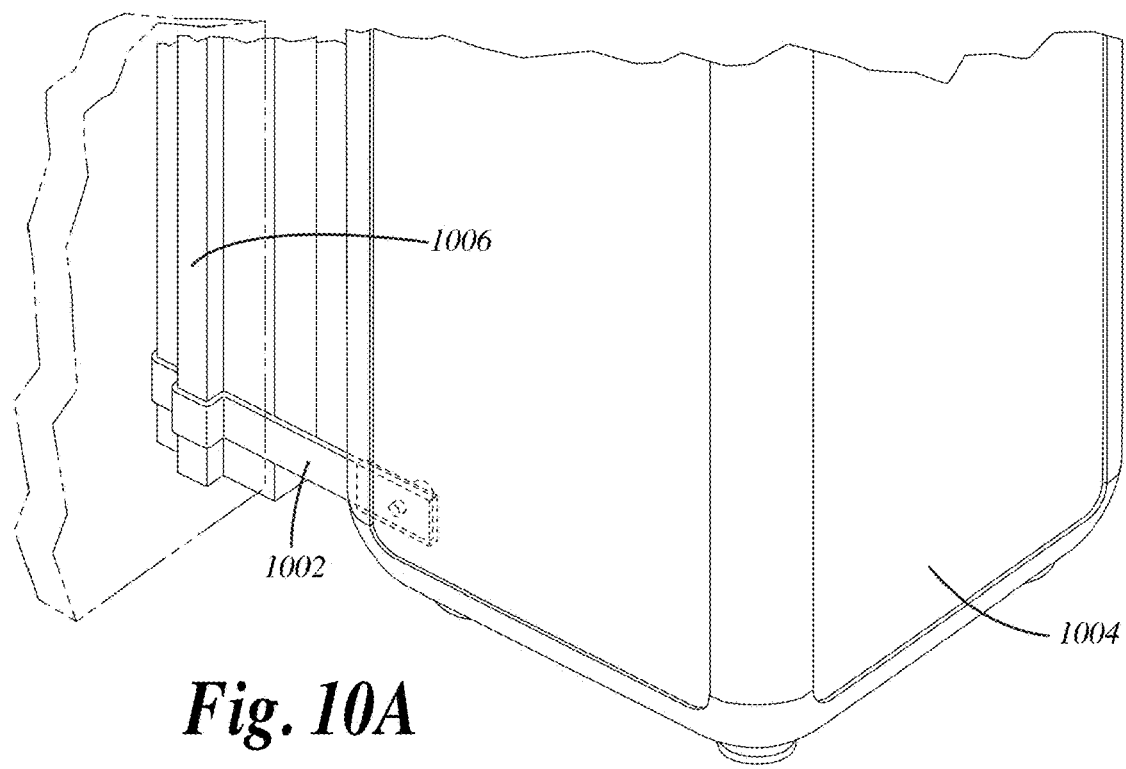
FIGS. 10A-B illustrate a door jamb bracket for directly securing the package storage compartment to an entryway.
Figure 10B:
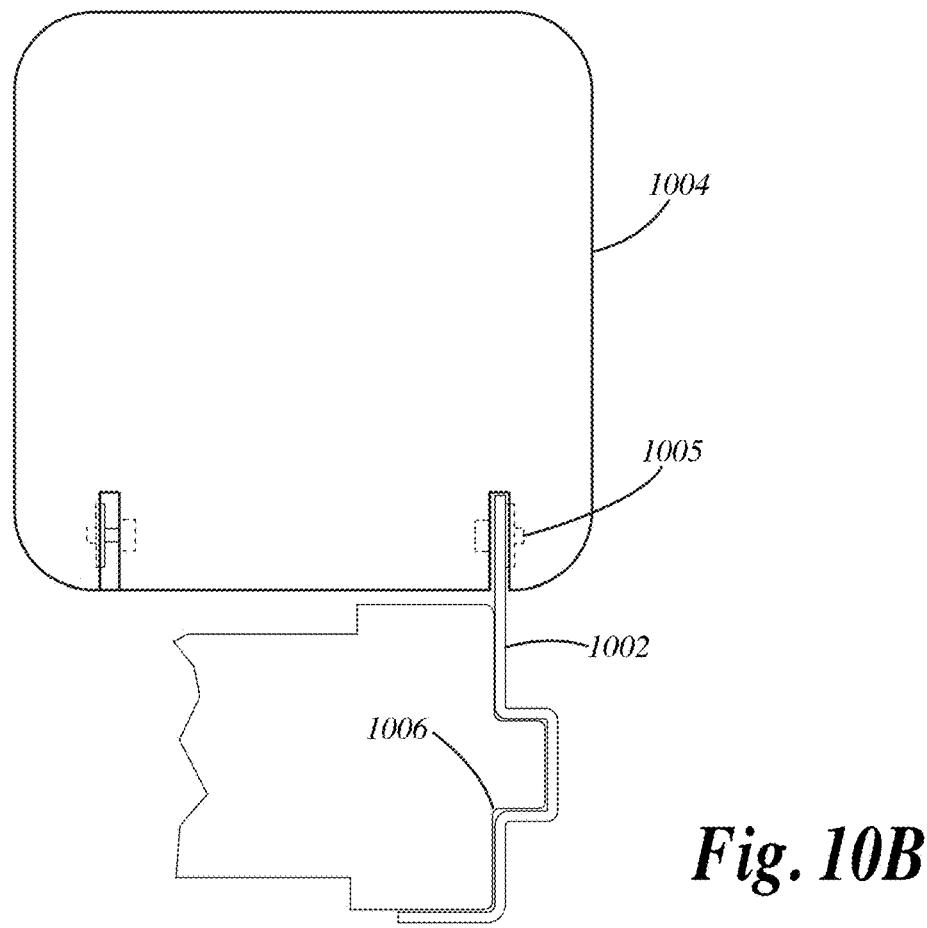

FIGS. 10A-10B illustrate a door jamb bracket 1002 for easily securing the package storage compartment to a door frame 1006. The bracket 1002 is designed to fit snugly over the door jamb 10002 at one end, providing a stable and secure attachment point for the package storage system 1004. At the other end, the jamb bracket can be securely attached to a locking pin or bolt 1005. The attachment point for the door jamb can be provide inside the package storage compartment so that it cannot be easily accessed while the compartment is closed and locked. Further, the package storage compartment can include two mounting locations (e.g., slots) on opposite sides of the package storage compartment so that the bracket can be mounted to either location, depending on the user's preference. The jamb bracket can be flipped to its opposite side for mounting on the opposite side of the door frame 1006. The door jamb bracket can be mounted at any suitable door height—in some situations the entryway may sit at a different horizontal level than the package storage device. This method allows for quick and easy installation, ensuring that the storage device remains firmly attached to the entryway.

Figure 11A:
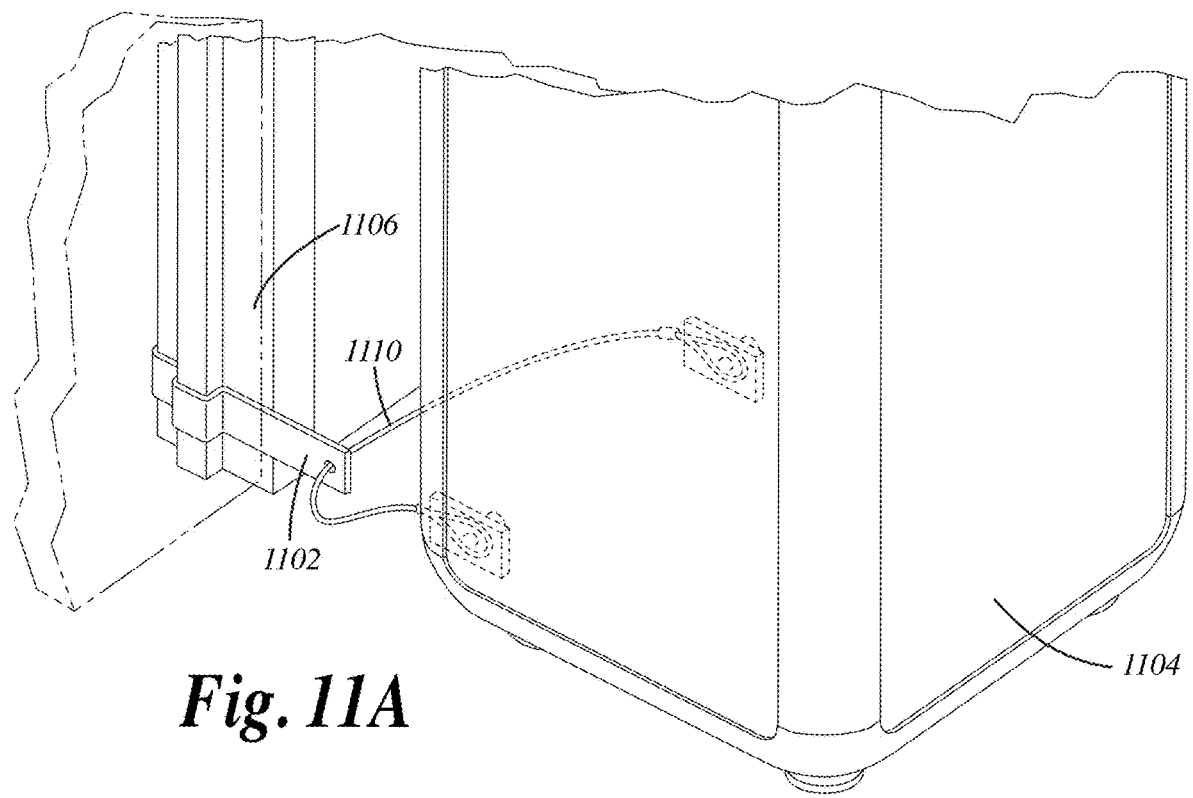
FIGS. 11A-B illustrate a door jamb bracket and cable for securely tethering the package storage compartment to an entryway.
Figure 11B:
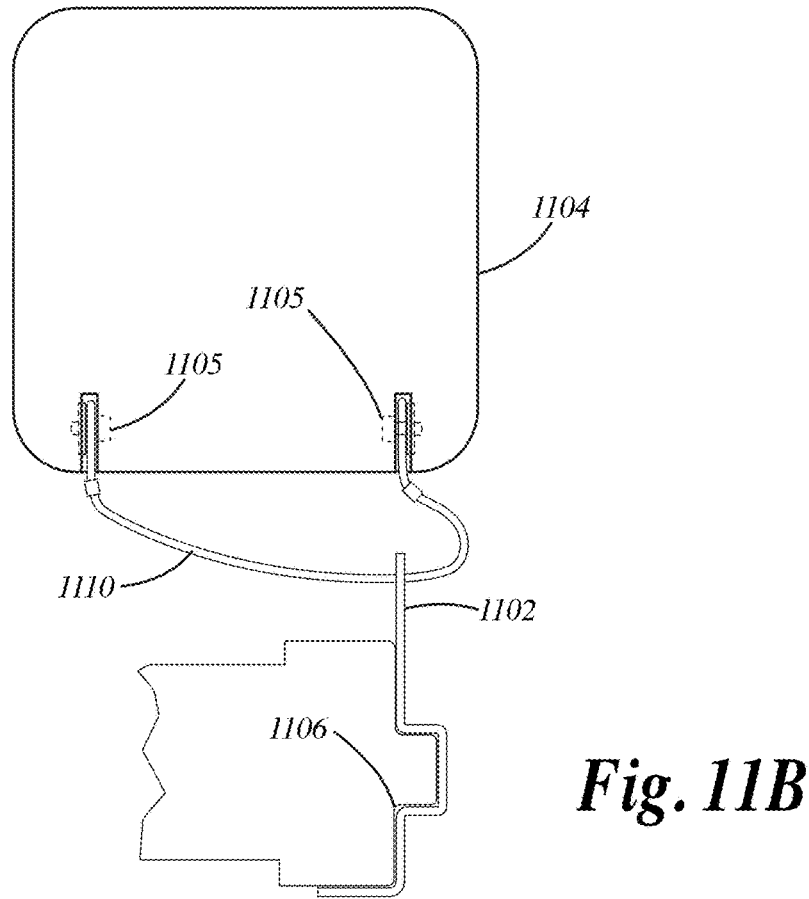

FIGS. 11A-B illustrate a door jamb bracket 1102 and cable 1110 for tethering the storage device 1104 to a door frame with more freedom than the direct bracket mounting configuration. As depicted in the provided side and top views, the cable 1110 can be thread through an aperture in the jamb bracket 1102, and both ends of the cable 1110 can be secured to different mounting locations within the package storage system, e.g., using a pin connection 1105. Different lengths of cable or an adjustable cable can be provided to allow the package storage system 1104 to be positioned at different locations relative to the door frame 1106. This flexibility enables users to choose the most convenient and secure placement for the storage device while maintaining a strong tethered attachment to the entryway.

Figure 12:
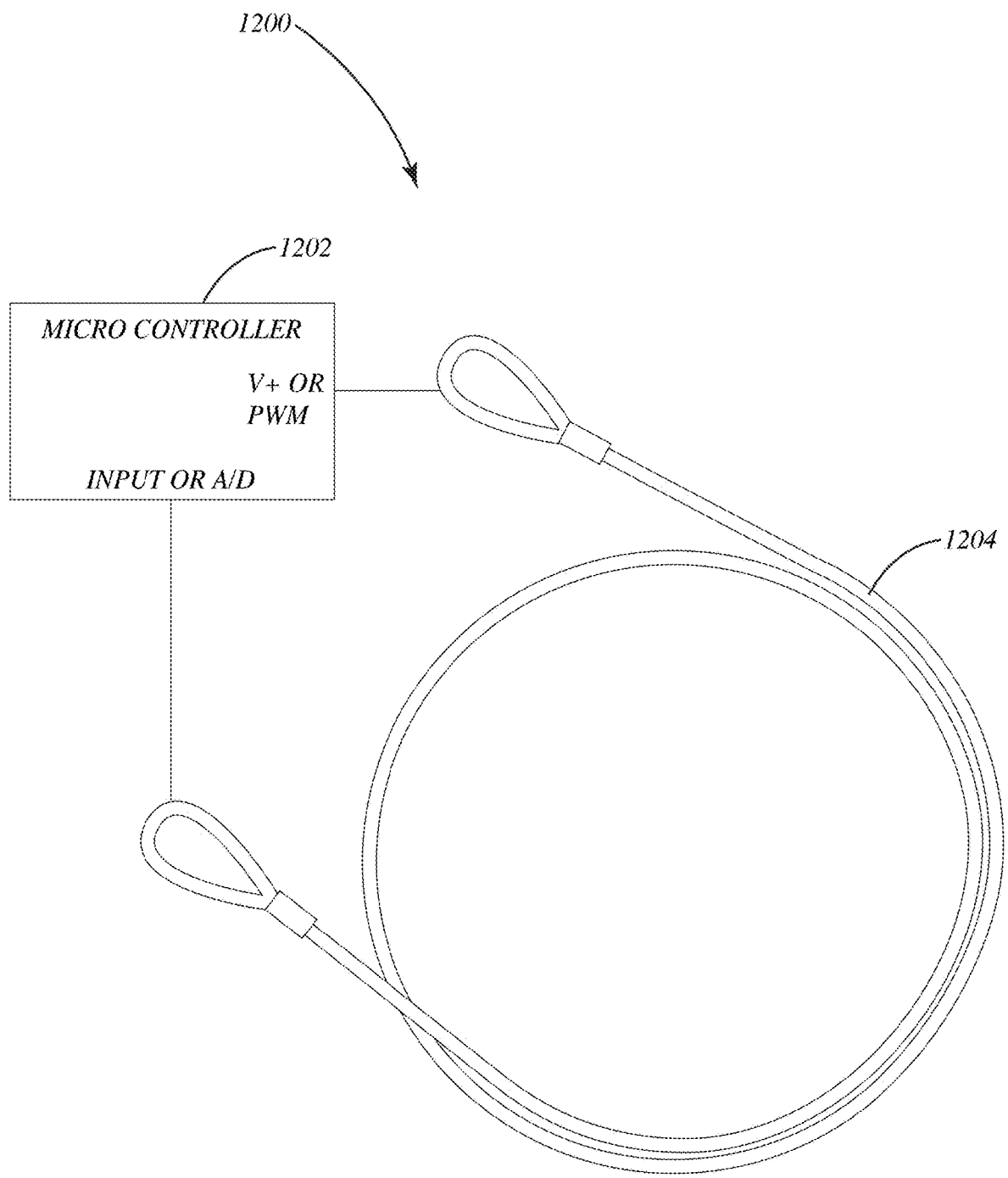
FIG. 12 illustrates an electrified tether system for tamper detection of a tethered package storage compartment.

FIG. 12 illustrates one embodiment of a tether tampering detection system 1200, which can enhance theft detection. A microcontroller 1202 within the package storage system, e.g., the controller of the package storage and security management circuit, can monitor the electrical connection between the two ends of the cable 1204. That is, the cable can include an electrical path that the controller 1202 can pass electricity. In response to a change in the electrical signal, the controller can detect tampering or a break in the cable. That is, the controller can include a sensor that that can detect a disruption in the electrical signal, which indicates the cable has been cut or tampered with. Upon sensing an issue with the cable, the system can be configured to trigger an alarm and sends suitable notifications (e.g., to a user's mobile device, law enforcement, neighboring security systems) alerting of the potential theft attempt. This feature adds an additional layer of security, ensuring that the package storage system is protected against unauthorized access and theft. The secure storage device can be secured to a door jamb bracket as described in connection with FIGS. 11A-B or to a post in an entryway that serves as a secure structure. The storage device can be tethered to the post using a reinforced cable or strap, ensuring that it remains securely attached to a fixed, immovable structure. This method is particularly useful for homes without suitable door jambs or for users who prefer to locate the storage device away from the door frame.

FIGS. 13A-C illustrates one embodiment of flexible secure strap 1400 reinforced with braided stainless steel 1406 and an outer webbing 1404. The strap can be captured in a door jam and has one end larger to prevent the strap from being pulled through the door. The stainless braid can be crimped with a larger cylinder 1402 to assure it is structurally sound. The outer webbing 1404 assures the strap will not damage the door and jam. The strap 1400 passes through the storage device and is connected inside. The length may be adjustable as shorter distances make it more difficult for theft. The strap may have one or more tools attached for assembly and disassembly to prevent loss of tools. The tools can be fastened or joined to the strap 1400 or stored within the storage compartment. It should be noted that various methods of forced entry require various countermeasures. For example, a cable cutter may not easily cut flat steel and a paddle cutter/grinder may cut most steel it may get gummed up with soft materials. It is the intention of this design to have a composition of multiple materials addressing cable cutters, grinders and power tools and various cutters and saws to make removal as difficult as possible. FIG. 13C illustrates the strap 1400 without the outer webbing 1404. It also illustrates how the other end of the strap 1409 can pass into and secure at a mounting location inside the package storage compartment.

FIG. 14 illustrates a method and strap that allows the control system to detect the cutting of the strap 1502. In some embodiments, the strap 1502 is embedded with conductive elements 1504, 1506 that complete a circuit. For example, the electrical contacts 1504, 1506 each are electrically connected to different ports of the controller so that changes in electrical current can be monitored. The electrical contacts have an electrical path that travels the entire length of the strap and connects to each other at the other end, providing an electrical path along the entire length of the strap. Hence, if the strap is cut such that that the electrical path is broken, the circuit is broken, which can trigger an alarm and notification to the user's mobile device. This method provides an effective way to monitor the integrity of the strap and ensure the security of the package storage system.

Figure 15:
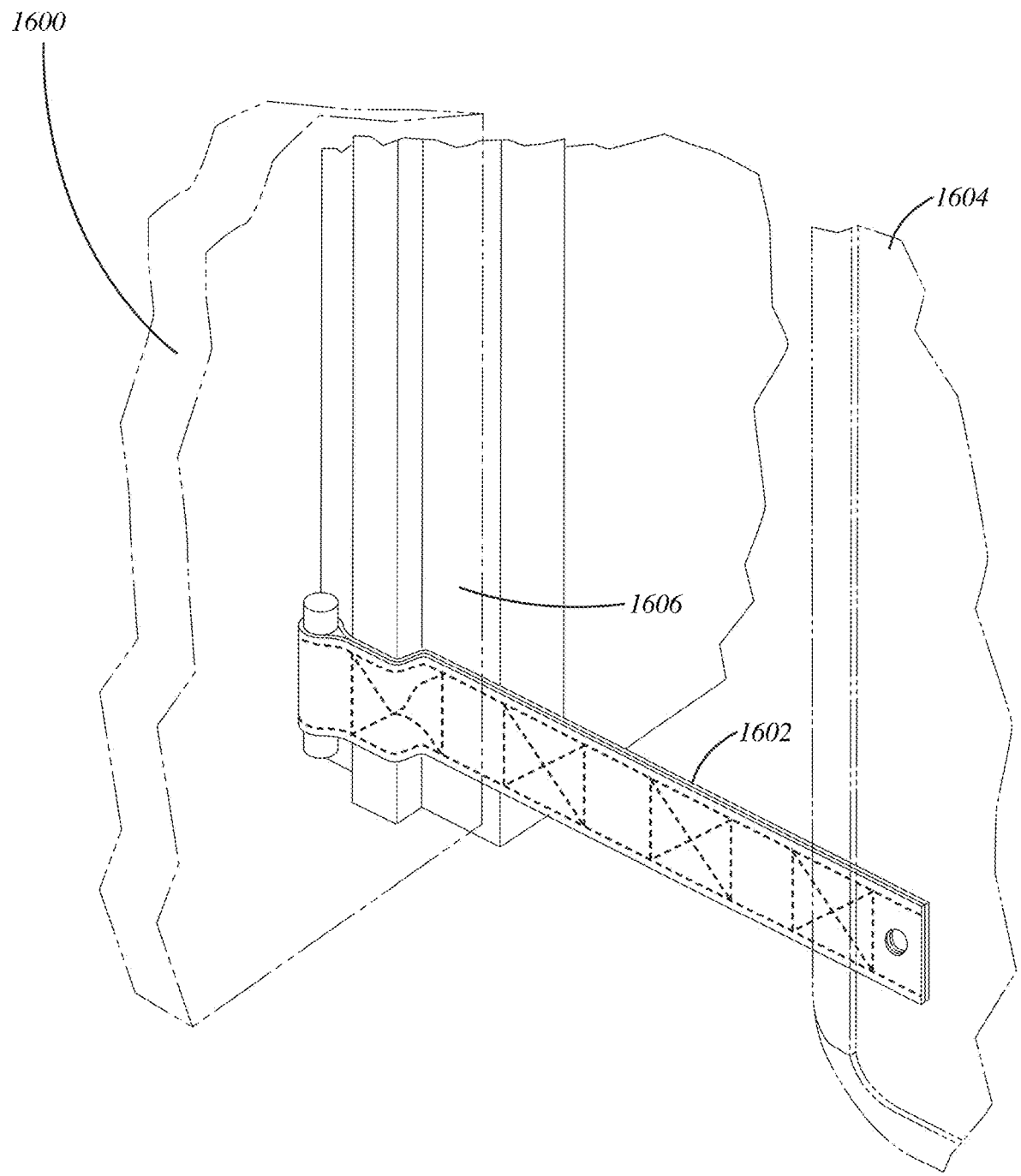
FIG. 15 illustrates a flexible security strap tethered to a package storage compartment installed across a door jamb.

FIG. 15 illustrates the strap 1602 installed within a door jamb 1606 as a secure fastening device for securing a package storage system 1604 to an entryway. The strap 1602 is positioned so that it cannot be easily accessed or tampered with from outside the door 1600 without access to the mounting location inside the package storage compartment 1604. This placement enhances the security of the strap, ensuring that the package storage system remains securely fastened to the entryway.

Figure 16:
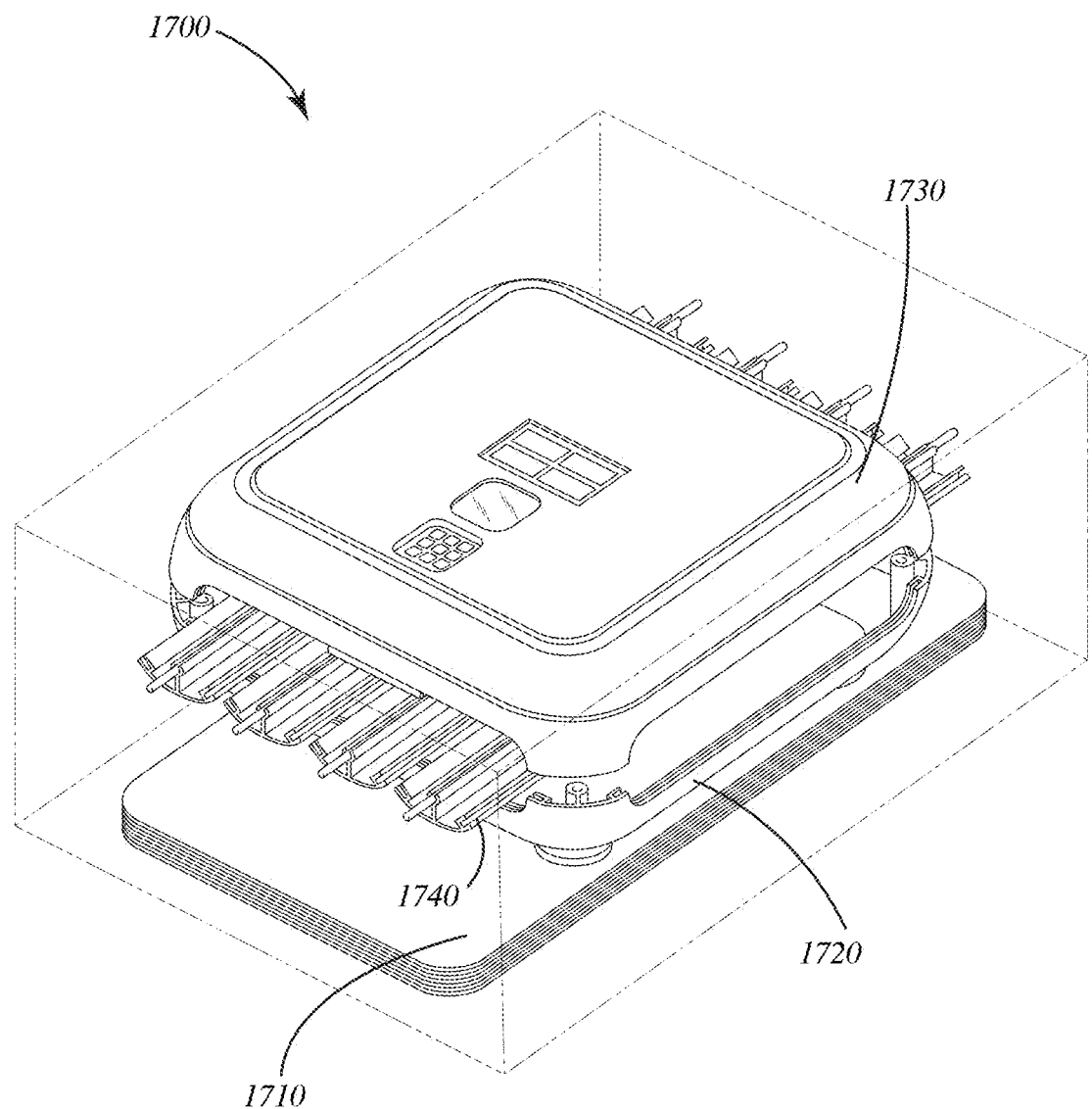
FIG. 16 illustrates a collapsible package storage compartment in a collapsed configuration.

FIGS. 16-18 illustrate one embodiment of a collapsible package storage compartment 1700. FIG. 17 shows the package storage compartment 1700 in a fully assembled configuration. FIG. 18 shows the package storage compartment 1700 in an exploded view (note the exploded view shows a slightly different embodiment without the optional solar pad). FIG. 16 shows the package storage compartment 1700 in a knocked down configuration for storage and shipment, making it easier to store and transport. In this embodiment, the package storage compartment 1700 is designed with modular components that can be disassembled and compactly arranged for convenient storage and shipment. The keypad 1790, photography portal lens 1792, and solar pad 1794 can be shipped in separate packaging to be installed during installation or can be shipped pre-installed.

The disassembled package storage compartment is illustrated in FIG. 16 showing its constituent components including side panels 1710, bottom panel 1720, top panel 1730, four corner panels 1740. Each component can be easily detachable and reattachable, allowing the entire unit to be knocked down into a flat, compact configuration as shown in FIG. 17. The side panels 1710 can be constructed from durable materials such as metal, plastic, or composite, providing robust protection when assembled. The dimensions of the panels can be selected to provide suitable delivery area for delivering packages. For example, in some embodiments, the package delivery area is about 33 inches by 20 inches by 20 inches, which provides a delivery area that can fit a vast majority of shipped packages. The panels can be designed with interlocking edges that securely fit together, ensuring stability and structural integrity when the unit is reassembled. The bottom panel 1720 and top panel 1730 can also be made from sturdy materials and can include alignment features that facilitate easy attachment to the side and corner panels. The bottom panel may have pre-installed feet or base supports to elevate the storage system slightly above the ground, providing additional protection against moisture. In the illustrated embodiment, the top/door panel 1730 is equipped with a user interface 1790, photography portal 1792, and solar pad 1794. The top panel also can include an electronic lock and a door actuator, which can be easily connected to the rest of the system during assembly. The top panel 1730 can include an actuation system (e.g., hinges and/or spring assist) that provide a secure and functional access door for the assembled package storage compartment.

In some embodiments, connecting hardware includes screws, bolts, hinges can be provided for quick assembly and disassembly without the need for specialized tools. In some embodiments, the connecting hardware may be integrated with quick-release mechanisms that allow for tool-free assembly and disassembly, further enhancing the convenience of the knock-down design. In other embodiments, the panels can be designed to inter-fit and interlock without the need for connecting hardware.

To facilitate storage and shipment, the disassembled components can be stacked together in a compact, flat arrangement as shown in FIG. 16. This arrangement reduces the overall volume of the unit, making it easier to store in confined spaces and more cost-effective to ship. The compact configuration can be secured with straps or placed in a shipping container to protect the components during transit. The knock-down design not only enhances the ease of storage and shipment but also allows for flexibility in deployment. Users can easily transport the package storage system to different locations and reassemble it as needed, making it ideal for temporary installations or situations where portability is required. Additionally, the knock-down design can reduce manufacturing and shipping costs by optimizing the use of materials and space. This cost-effectiveness can make the package storage system more accessible to a wider range of users, further extending its benefits and applications.

The package storage system can be manufactured in a variety of different color configurations and with a scalable design for combinational assembly. For example, the package storage compartment can have side and corner panels in one color, while the top can be provided in an alternate color or motif with an embedded user interface to access the compartment manually, if desired. The package storage compartment can be provided with suitable branding, e.g., third party delivery service branding.

Package Storage Compartment Assembly

Figure 19:
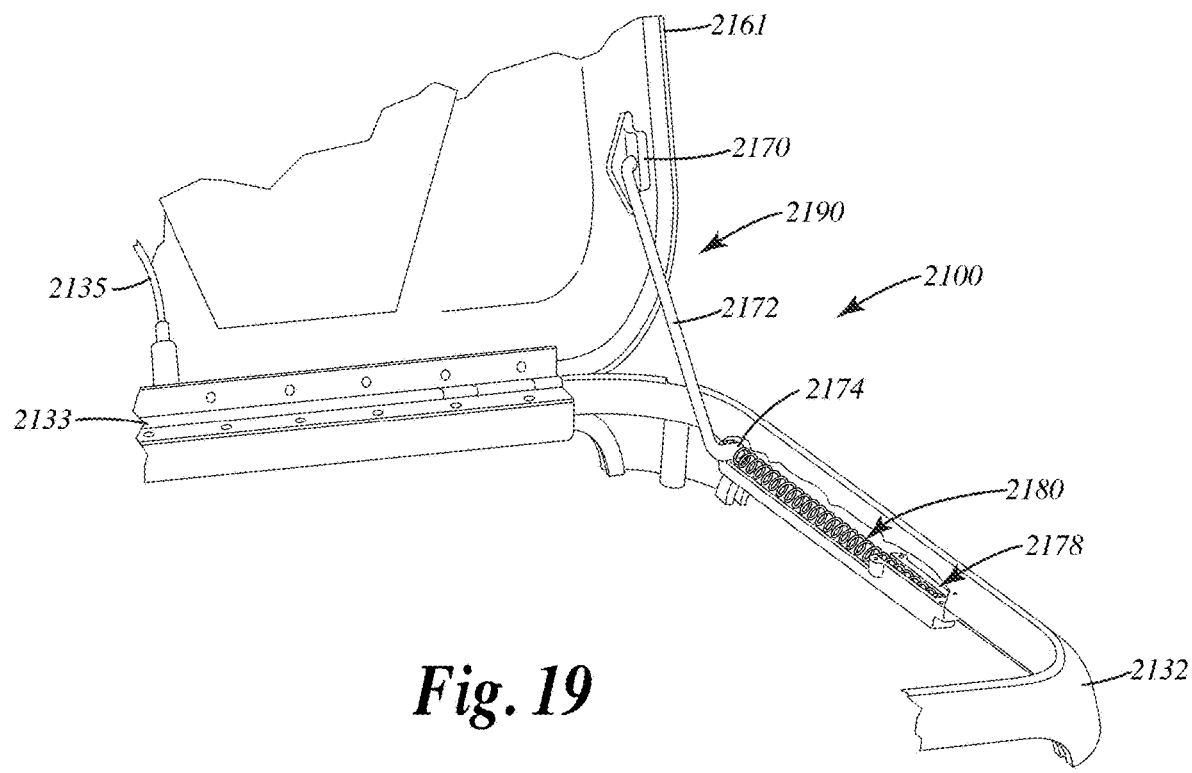
FIG. 19 illustrates a close-up view of the lid of a package storage compartment of the present disclosure.

FIGS. 16-19 illustrate the modular design and assembly of embodiments of the present disclosure. FIG. 17 illustrates an exemplary fully assembled view of a package storage compartment 1700, while FIG. 18 illustrates an exploded view of a slightly modified package storage compartment 2100, detailing the individual components and their assembly. The only material difference between the package storage compartment 1700 of FIGS. 16-17 and the package storage compartment of FIGS. 18-19 is that the package storage compartment 2100 of FIGS. 18-19 does not include the optional solar pad. FIG. 19 illustrates a close-up view of the lid 2130 and spring assisted actuator for automatically opening and closing the lid 2130 of the compartment 2100.

Referring to FIGS. 18-19, the package storage system 2100 can be designed with modular components to facilitate easy assembly, disassembly, and customization. The package storage compartment can include side panels 2110, a bottom panel 2120 and feet 2122 for supporting the other structure, a top panel 2130, and corner panels 2140. The system 2100 can also include corner rails or connectors 2142 for fastening the corner panels to the bottom supporting panel structure as well as a top frame 2132. A hinge 2133 can allow the lid 2161 to open away from the top frame 2132 and close into a seated position in the top frame 2132. An access door latch 2168 can be mounted to the top frame 2132 and cooperate with the latch bolt of the package storage and security management circuit 2166 to form an electronic lock for the lid 2161. A keypad 2160 can be provided at the lid 2130. The lid 2161 can also include a package photograph portal 2162 covered by a transparent lens 2164. A lens weather protector may protect the lens from the elements and also facilitate exclusion of phone flash to make obtaining photographs of the contents of the system more difficult without assistance from an internal light source (which may be installed downward facing on circuitry 2166 to illuminate the storage area). Each component can interlock with the others, ensuring a secure and stable structure when assembled.

In FIG. 17, the fully assembled package storage compartment is shown with all panels securely connected, forming a robust enclosure or compartment for receiving and securely storing packages for later pickup. The various panels and structural elements can be constructed from durable materials, such as metal, plastic, or composite. The various panels and frames can feature interlocking edges that fit seamlessly together. The bottom panel and top panel can be aligned with the side panels, providing a stable base and top cover, respectively.

FIG. 18 provides an exploded view of the package storage system, illustrating how each component generally fits together during assembly. The side panels 2110 have interlocking edges. The bottom panel 2120 includes alignment features that correspond to similar features on the side panels, facilitating assembly. The bottom panel 2120 may also have raised feet 2122 to protect against moisture. The top panel 2130 includes a lid 2161 and top frame 2132. The lid 2161 can securely fit with the top frame 2132 to form a sealed container with the side panels 2110 and bottom panel 2120, completing the enclosure.

The top panel 2130 can include an electronic lock formed by a combination of the latch bolt of the package storage and security management circuit 2166, which is mounted to the lid 2161, and the access door latch 2168, which is mounted to the top frame 2132. The electronic lock can be unlocked in response to an appropriate keypad entry or remotely by wireless communication from a remote device providing a suitable entry code. The electronic lock can be locked in response to a suitable remote command sequence (e.g., close and lock the compartment) or in response to manual closure of the lid.

The modular components can be connected using various types of hardware, such as screws, bolts, and the like. In some embodiments, quick-release mechanisms can be used to facilitate tool-free assembly and disassembly. These mechanisms can allow users to quickly and easily set up or take down the package storage system without the need for specialized tools or significant effort.

The modular design of the package storage system offers several advantages, including ease of assembly, customization, and transportability. Users can quickly set up the system in various locations and configurations, adapting it to different environments and security needs. The modular components also make it easy to replace or upgrade parts as needed, extending the lifespan of the system, and reducing maintenance costs.

The modular design enhances the versatility and accessibility of the package storage system, making it suitable for a wide range of applications, from residential use to commercial and industrial settings. The ability to customize and adapt the system ensures that it can meet the specific needs and preferences of different users, providing a secure and reliable solution for package storage and management.

FIG. 19 illustrates the lid 2161 in an extended, open position. As shown, the hinge 2133 is fastened along one edge to the lid 2161 and along another edge the frame 2132. This configuration allows the lid to open between a closed, seated position, and an extended, open position where the lid is at about a 90-degree angle to the frame allowing access to the package delivery area inside the package storage compartment 2100. The frame 2132 can include a gasket around its perimeter to create a weather-resistant seal when closed.

The current embodiment includes a spring assist system that utilizes two spring-assisted access door actuators 2190 located on opposite sides of the frame 2133. These actuators 2190 are integrated into the package storage compartment 2100 during assembly and allow the lid 2161 to be automatically opened once the electronic lock is unlocked. Each actuator 2190 includes a rod 2172 that is affixed at one end to a lid bracket 2170 fastened to the lid 2130 and the other end 2174 is captured within a channel 2176. A USB connector 2135 can be connected from the circuit 2166 and routed to just above the hinge where backup USB power can be plugged into the connector 2135.

As the lid opens and closes, the horizontal movement of the rod 2172 along the track 2176 is converted into an opening arcuate force that lifts the lid to its extended, open position. When the lid 2161 is returned to its closed position, the end of the rod 2174 interacts with and pushes against and tensions spring 2180 captured within a spring channel 2178. Upon reaching the closed position, the electronic lock prevents the lid from reopening until unlocked ensuring the lid remains securely closed with the springs under tension.

In this configuration the springs 2180 remain under tension until the electronic lock is unlocked. In response to the lock unlocking, the spring tension forces the actuator rods 2172 to travel along the channel, causing the lid to automatically pop open. The extent to which the lid 2130 opens can be controlled by the amount of tension in the springs 2180 and other characteristics of the actuators 2190. Some embodiments can be configured with a single actuators, while others can include multiple actuators. It should be noted that it is desirable to show this physical action of the lid physically moving to enable a more hands free delivery.

The various components and panels can be made from a variety of different materials. For example, wood textured panels and specific side panel branding can be provided. In essence, various embodiments can have different textures, patterns, and materials to match location materials.

Package Storage Compartment Bag

An optional bag can be held within the package storage compartment (e.g., with clips or hook-and-loop fasteners). The bag can help easily collect packages. This bag may also be insulated with a top flap and have pockets for frozen cooling pouches to keep the contents of the bag cool for the day. For example, this may be particularly useful for prescriptions or food deliveries.

Figure 20:
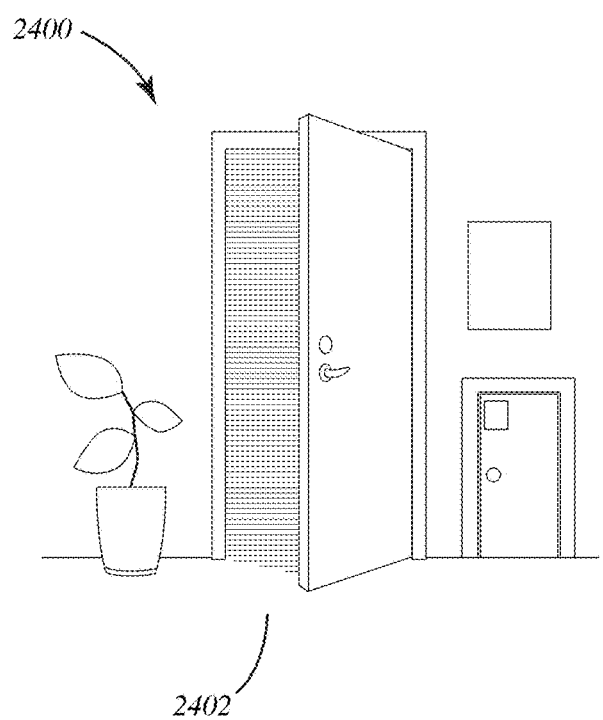
FIG. 20 illustrates options for do-it-yourself configurations.

FIG. 20 shows options for do-it-yourself and the controller with electronic latch and security communications module can be sold stand alone or with multiple doors and drawers for home package storage applications. The module can be sold as a separate package security system and attached to DIY doors, drawers and other storage designs enabling users to have a DIY solution for a new build or renovation project.

Package Storage System Application User Interface

FIGS. 21-26 illustrate various user interface screens for a mobile device application associated with a package storage compartment.

Figure 21:
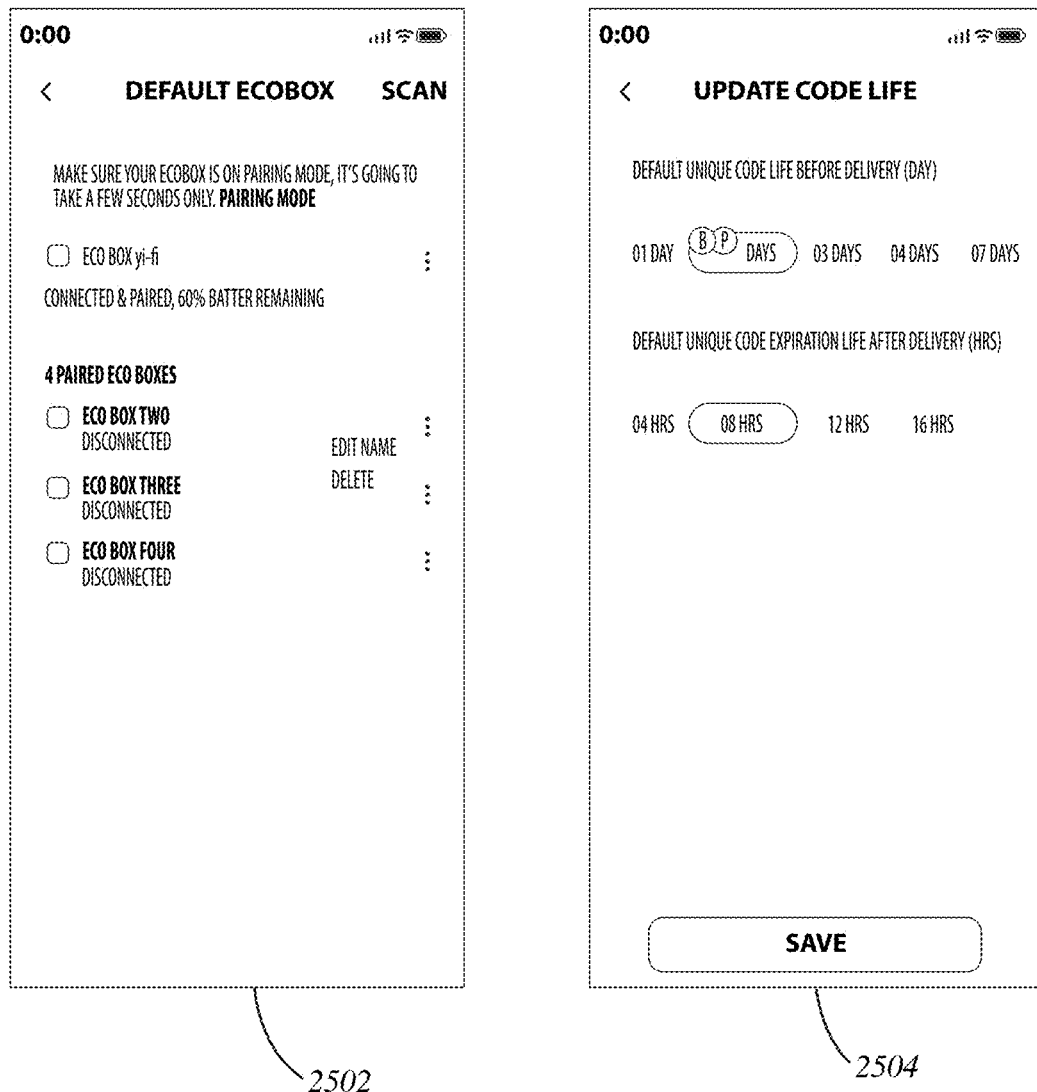
FIG. 21 illustrates interface screens for provisioning package storage compartments.

FIG. 21 illustrates the provisioning interface including an exemplary provisioning screen 2502 for initial setup of package storage compartments. Each compartment or ecobox can be connected via Bluetooth pairing by using a scan button that sends out a Bluetooth interrogation signal. Users can individually name each compartment, and the interface can display which compartment is currently paired along with the remaining battery life.

During provisioning, the system can ask the user if they would like to enable Digital Signature Preauthorization for their deliveries. Enabling this feature will allow use of a preauthorized digital signature to validate deliveries that require adult verification or secure authentication. Once the package is securely placed in the compartment and all authentication checks are met, a digital signature will be generated automatically, ensuring seamless and compliant deliveries.

Another exemplary screen interface provides the ability to update the code life 2504. Specifically, users can set a default unique code life before delivery and a default unique code expiration life after delivery. This feature ensures that access codes are valid for a specified period, enhancing security by limiting the window during which the code can be used.

Figure 22:
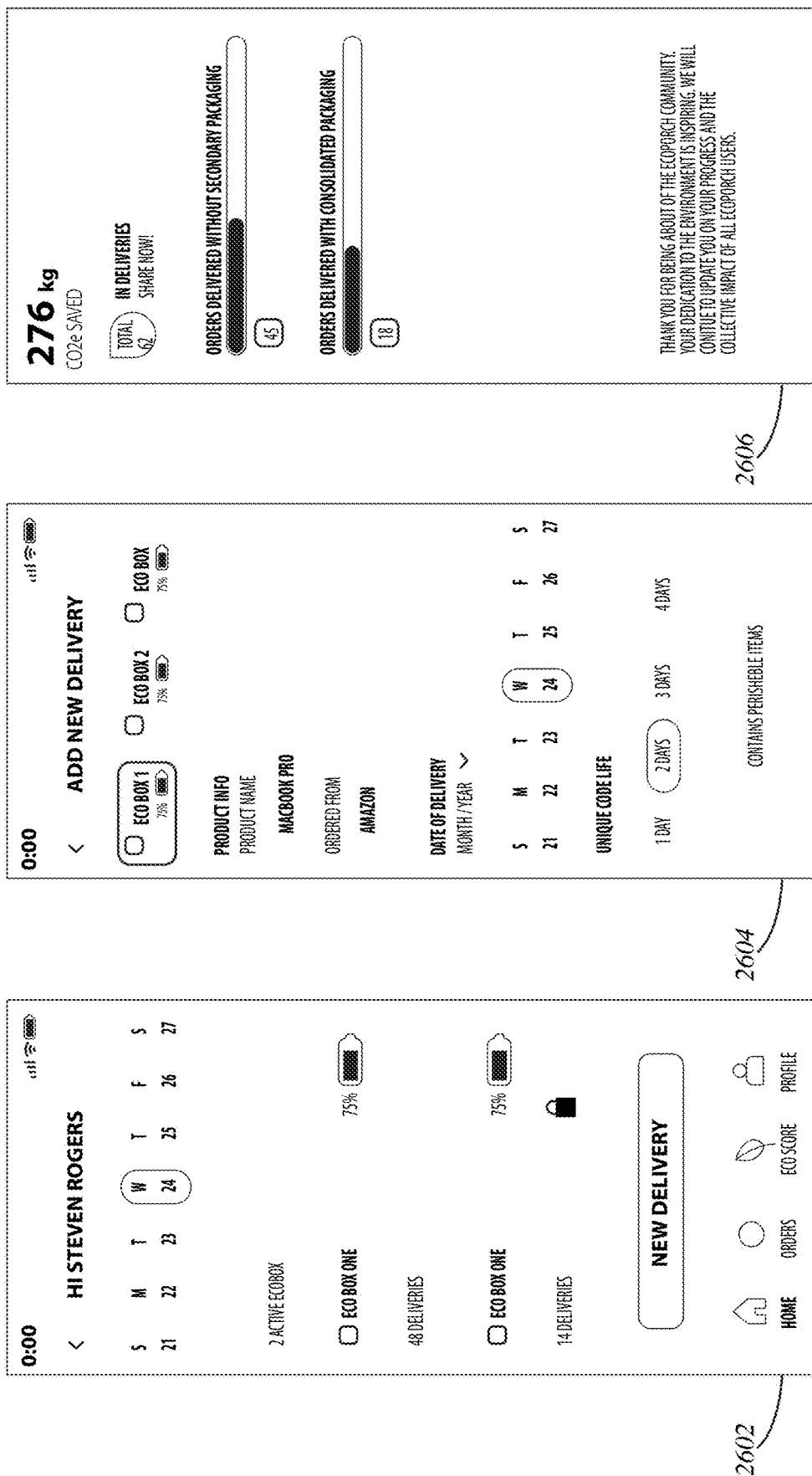
FIG. 22 illustrates interface screens for monitoring deliveries, generating unique one-time passcodes, and tracking carbon mitigation.
Figures 23, 24:
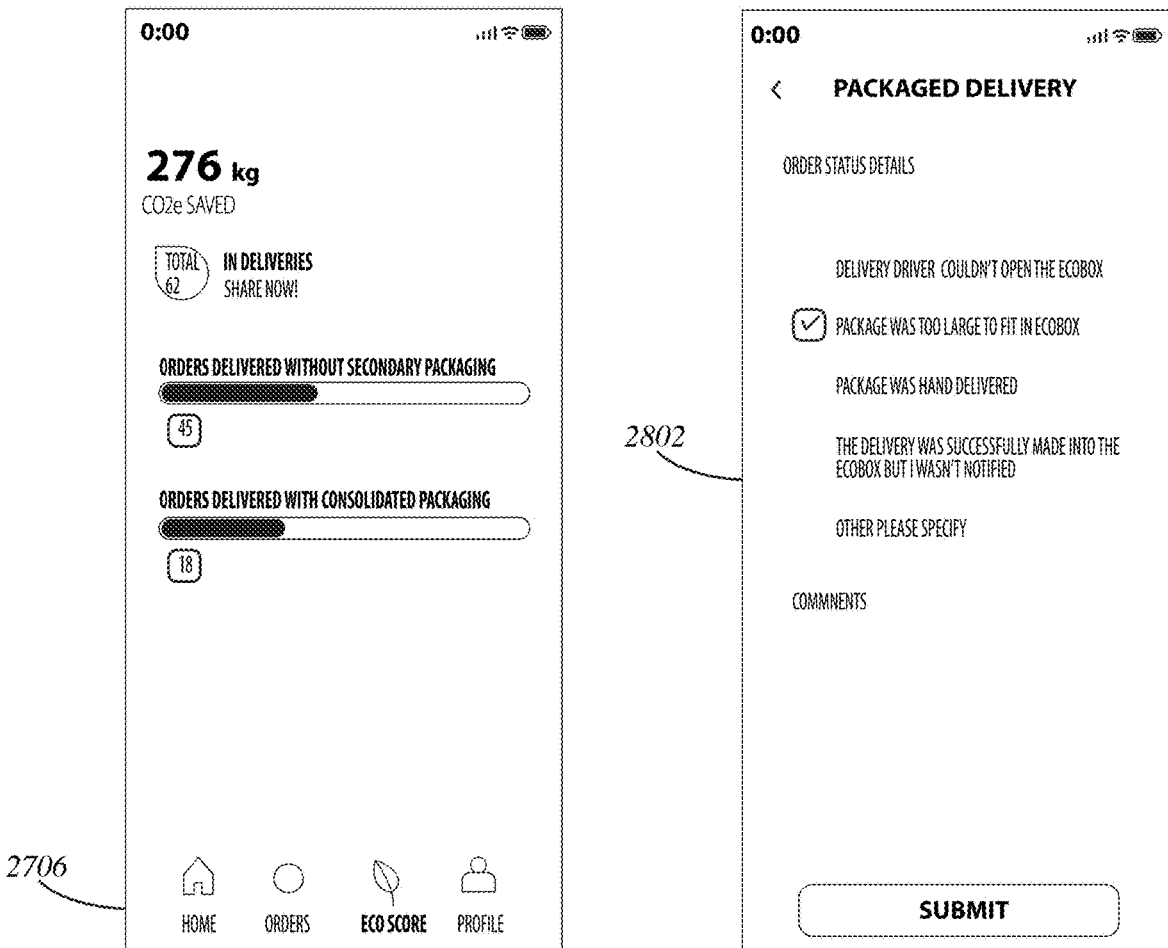
FIG. 23 illustrates an exemplary interface screen depicting carbon mitigation details.
FIG. 24 illustrates an exemplary delivery interface screen for submitting order status details.

FIG. 22 shows several screens illustrating general user experience for the mobile application. A dashboard interface 2602 can act as a home screen that provides overview information of active ecoboxes, battery life, and access to information about historic and upcoming deliveries, among other information. The Add New Delivery screen 2604 allows a user to quickly generate a unique one-time passcode for accessing a package storage compartment. The interface allows the user to select a specific compartment, provide a description of what is being delivered, who or what service provider is delivering, when the delivery is expected, and the ability to set the unique code life. The interface also allow the user to set or change various settings about the delivery, like identifying whether the delivery includes perishable items, which can in turn change system operation according to preset settings (e.g., notification settings may be set to bypass silence settings for perishable deliveries). The carbon mitigation interface 2606 provides information about the amount of CO2 saved by selecting orders be delivered without secondary packaging or be delivered with consolidated packaging. FIG. 23 shows an alternative interface 2702 that also illustrates tracking of reduction of secondary packaging and impact on environmental savings.

In some embodiments, a field can be provided to facilitate a Preauthorized Digital Signature for Secure Delivery. This option can be selected if the delivery requires proof of age or identity verification, such as alcohol or pharmaceutical products. Enabling this option will allow the system to automatically apply a preauthorized digital signature once the delivery has been authenticated and securely stored. This signature can serve as proof of delivery in compliance with the requirements for restricted items.

FIG. 24 illustrates a package delivered interface 2802 that details the order status. In this example, a package was too large to fit in the package storage compartment. The delivery service provider can interface with the package storage compartment to indicate this status and the package storage compartment can be used to provide a triggered response. For example, in this case, the package storage system can be programmed to inform the delivery service that the package should be delivered to the garage and system can automatically trigger the opening of the garage door so that the delivery driver or a delivery drone can complete the delivery to the garage door.

Figure 25:
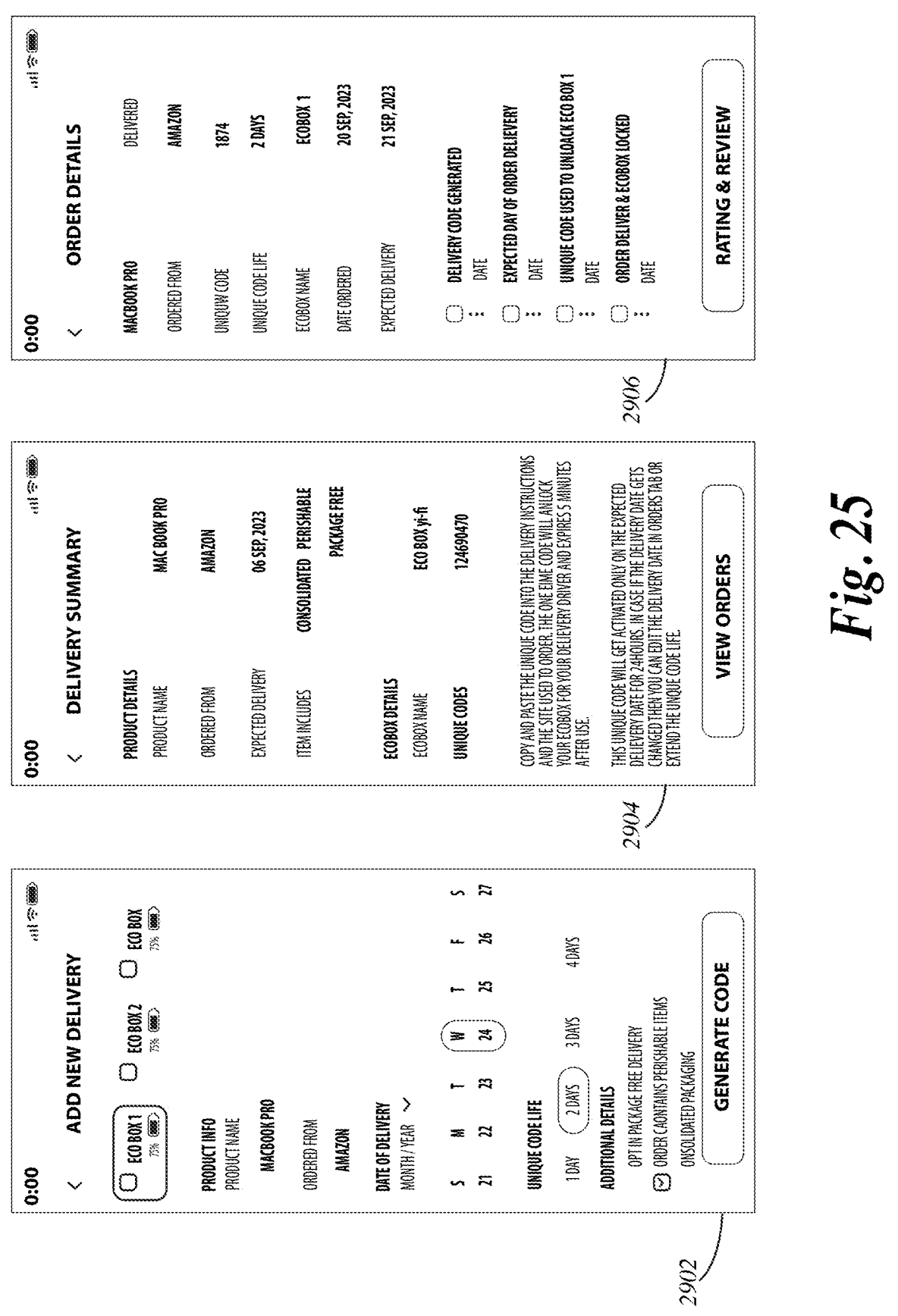

FIG. 25 illustrates a few more interface screens for the package storage system application. The Add New Delivery interface screen 2902 shows the delivery experience from the mobile application and interface to orders and shipment tracking.

The Delivery Summary interface screen 2904 shows product details, where the package was ordered from, expected delivery date, and categorizations associated with the package, such as perishable package free, and whether the item should be consolidated with other orders. This screen can also show the ecobox the package should be delivered to along with the unique code. In this embodiment, the user can copy and paste the unique code into the delivery instructions on the site used to order. This one-time code will unlock the package storage device for the delivery driver and expire five minutes after use. This unique code will get activated only on the expected delivery date for 24 hours. In case the delivery date gets changed then the user can edit the delivery date in the orders tab or extend the unique code life. In alternative embodiments, the unique code can be managed automatically according to delivery service details provided or available to the user.

The Order Details interface screen 2906 shows various order details, such as the item being delivered, status, where it was ordered, the unique code to open the package storage compartment, the unique code life, the user's compartment name, the order date, the expected delivery, and any tags associated with the delivery (e.g., package free and consolidate). The interface can also include a timeline of events associated with the package storage system, such as delivery code generation, expected day of order delivery, unique code use, and order delivery and compartment locking. Each event can also be displayed along with a timestamp and iconography associated with the event.

In embodiments that have a digital signature preauthorization, the order details can indicate that the delivery has been preauthorized for a digital signature to confirm receipt. Once the package is locked in the secure compartment, the signature can be applied automatically. The details can be viewed and the signature confirmation certificate can be downloaded from a link made available to the user. The timeline of events can incorporate this digital signature preauthorization. For example, it can detail that the package was securely stored at a specific time stamp and was digitally signed for at a specific time stamp using a preauthorized digital signature, ensuring compliance with adult verification requirements.

Figure 26:
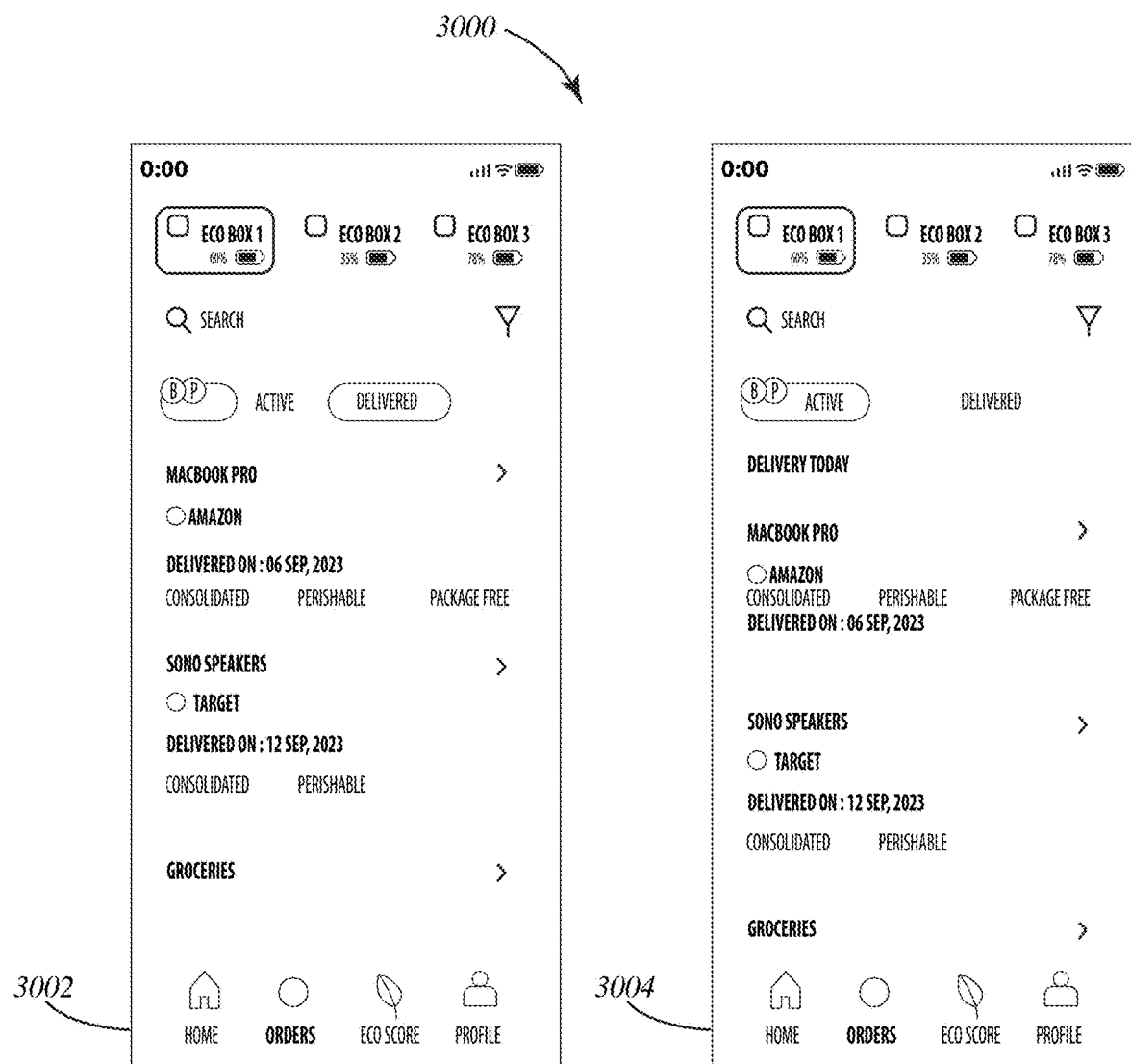
FIG. 26 illustrates exemplary interface screens depicting upcoming deliveries and order history.

FIG. 26 shows security preference interface examples for specialty deliveries. The order interface screen 3002 depicts the last three deliveries while order interface screen 3004 depicts upcoming deliveries.

FIG. 27 shows a user configured delivery selection interface. This interface can be provided through a compartment associated application. This interface enables code generation for automated delivery where the code is not shared directly with the driver or delivery service until they are at the delivery point. That is, the code can be encrypted and shared over, LoRa, Bluetooth or NFC when the driver is at the delivery location and ready to deliver a package into the package storage compartment. The interface can provide various configuration opens, such as where the package should be delivered. The interface can also provide a place for the user to enter the security code for the compartment. The interface can allow the user to select whether deliveries can be completed on weekends, or other instructions for the address. The selection boxes on the application enable the user to prevent sharing of the code with the driver but allows the code to be shared electronically opening the door in a crypto validated environment. Additional options like setting a return packages flag, allowing a garage delivery if the package is to large and selecting hands free delivery by selecting the hyve drop box can make the delivery appear to be code free.

Hands-Free Delivery Methodologies

Figure 28:
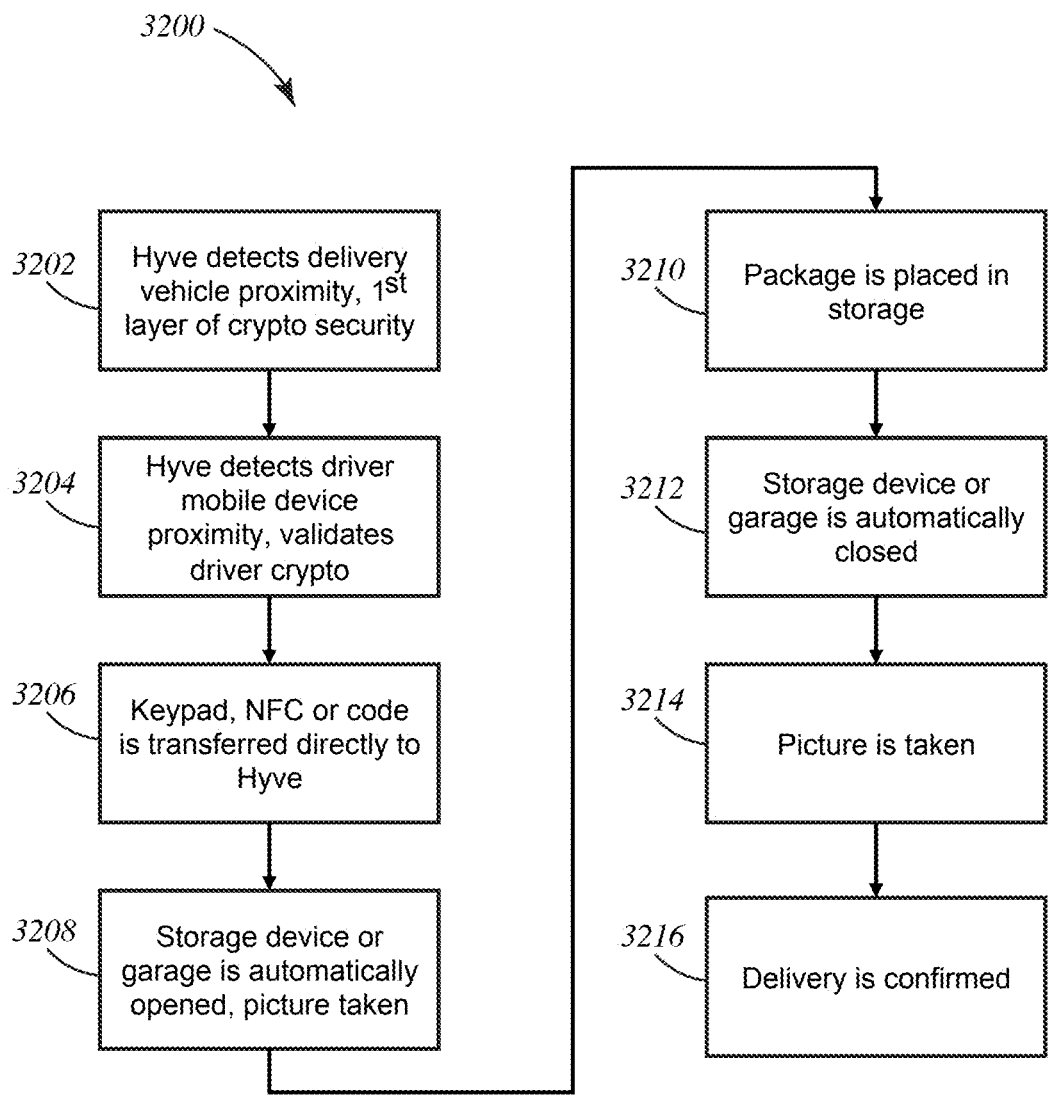
FIG. 28 illustrates a flowchart depicting steps associated with hands-free delivery and validation according to one embodiment of the present disclosure.

FIG. 28 illustrates a flowchart of one exemplary embodiment of a hands-free delivery and validation method. The method begins with the compartment detecting delivery vehicle is within proximity 3202 and the system prompting a first layer of crypto security, next the compartment detects the driver mobile device is within proximity and validates a driver cryptography certificate provided automatically by the driver mobile device 3204. Next, an access code is transferred directly to the package storage compartment (e.g., via NFC) 3206. Alternatively, or as a backup, the access code can be manually entered into the keypad on the package storage compartment. In response the package storage device is automatically unlocked and opened 3208. If the package being delivered is too large to fit in the package storage compartment (or the compartment is too full), the garage door can be automatically opened instead of the compartment. The delivery service (e.g., delivery driver or delivery drone) can automatically place the package in the package storage compartment 3210. Then, the package storage compartment can be automatically closed and locked 3212. A photograph of the package storage compartment delivery area with the package present can be captured 3214. This photograph can be taken through a package photograph portal in the housing of the package storage compartment. Finally, a delivery record of the delivery can be recorded to confirm the delivery 3216. The delivery record can be distributed as desired.

Figure 29:
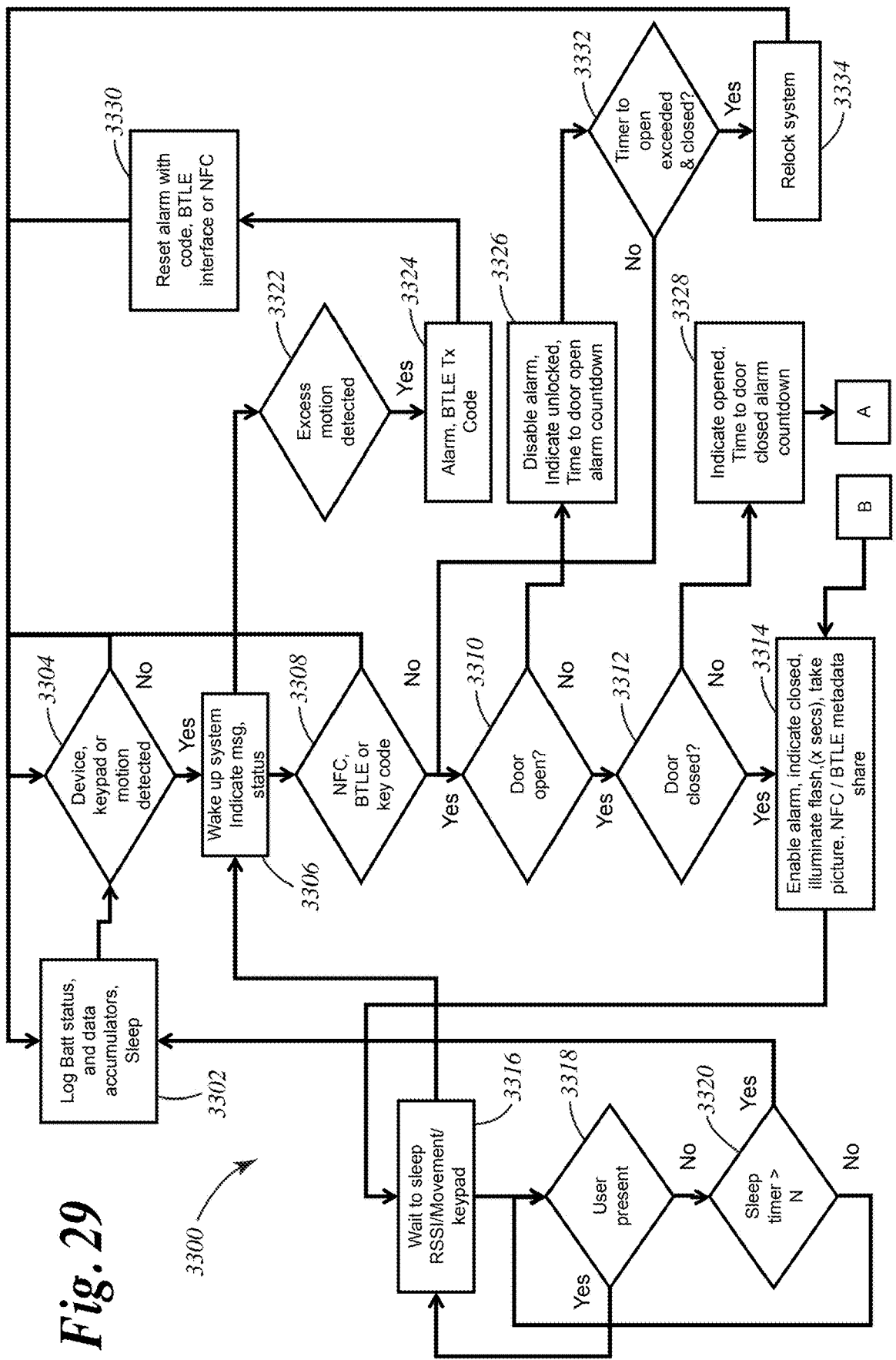
FIGS. 29-30 illustrate a flow chart for operation of a package storage system according to one embodiment of the present disclosure.
Figure 30:
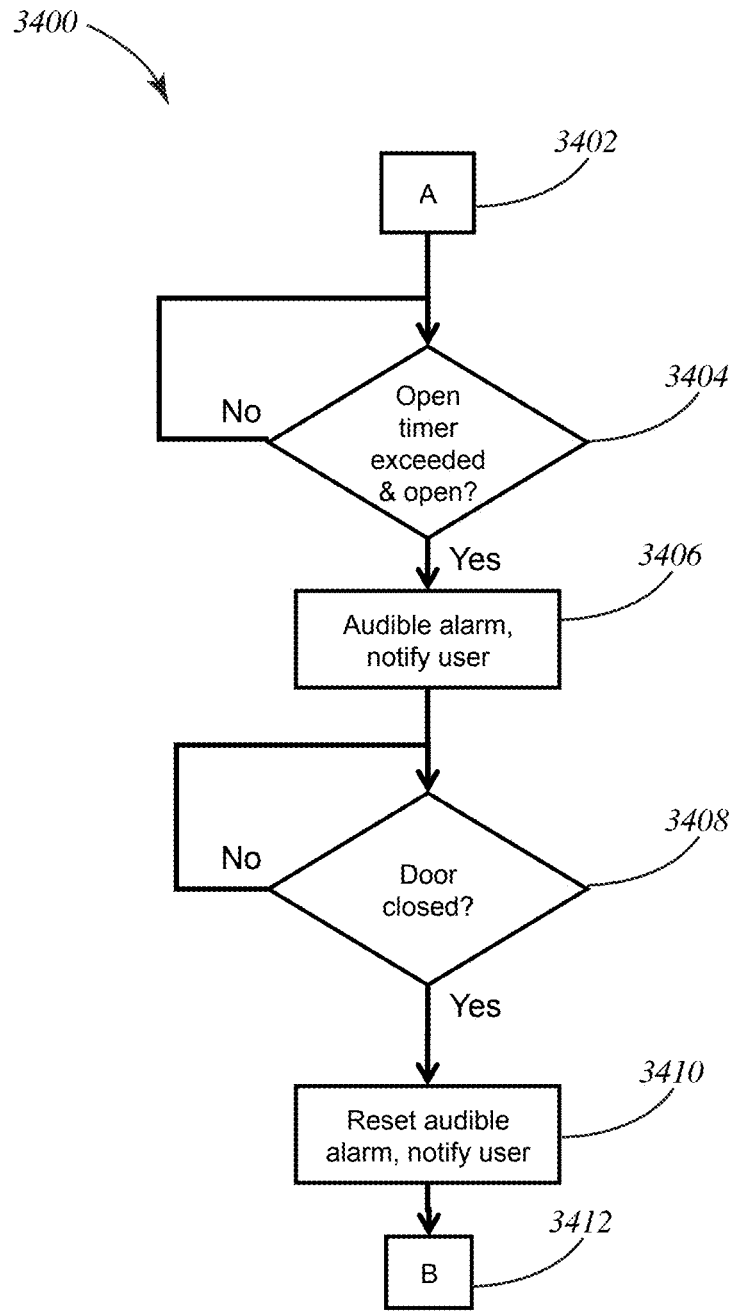

FIGS. 29 and 30 illustrate an exemplary flowchart for motion detection and keylock process using Keypad, Bluetooth, and NFC. The process can begin with a battery status log and data accumulator step where the device is essentially asleep 3302 until a relevant device is detected in proximity, keypad entry is detected, or motion is detected 3304. The device continues to sleep and wait for action until this occurs. Once the system senses a relevant detection it wakes up and can record a wakeup message and status. If excess motion is detected 3322, then an alarm and/or BLTE transmission code can be executed to alert the user of the potential issue. After the issue is resolved or checked, the alarm can be reset with code, BLTE interface, or NFC 3330 and the device can return to rest. If the wake-up was due to an appropriate NFC, BLTE or key code 3308, then the access door can be opened 3310. Then, if the door is closed again 3312 within a specified time period, the alarm can be enabled, the status can be updated. In addition, a delivery verification photograph can be coordinated by illuminating the flash after a predetermined time for a predetermined length of time sufficient to obtain a picture of the delivered package. This data regarding status and the evidence of the delivery can be shared and recorded, e.g., using NFC/BLTE. With the delivery being complete, the compartment can wait to return to sleep until a determination is made that the user is not present (or alternatively after a preset period of time). In the current embodiment, the user presence can be determined based upon RSSI/movement sensors/lack of keyboard activity. The presence detection can also be contingent on a specific sleep timer such that the device will wait at least a minimum specified period before going back to rest to avoid an unpleasant user experience. Returning to the situation where the door did not open 3310. The alarm can be disabled, and the unlock status can be indicated and a time to door open alarm countdown can begin 3326. If the timer to open is exceeded and the compartment door is still closed, then the door can be relocked 3334 and return to rest. If the door is opened but is not closed within a specified period of time 3404, then an audible alarm can be triggered as well as a notification sent to the user 3406 so that they know the compartment door has been left open. Upon closure 3408 the alarm can be reset, and appropriate notifications can be sent 3410. This can then allow the system to proceed with normal post-delivery procedures 3314.

Integrated Security Features and Hands-Free Delivery System

The package storage system of the present disclosure can incorporate multiple security measures to deter and delay potential theft. Understanding that while no system can be completely secure, increasing the inconvenience and time required to breach a system acts as a significant deterrent. By allowing limited and time sensitive access within a specific time frame, thieves will have a limited time window with which to easily steal packages.

Some embodiments of the package storage system include an accelerometer that can be used as a trigger to notify the user and trigger an alarm system in case of tampering. It can also alert the police and capture photographs for evidence. Additionally, the system can feature a digital twin that allows various information and states of the system to be maintained in the cloud such that should access to the local information be unavailable the information is not lost. In addition, the digital twin provides an excellent aggregation tool for collecting data across systems to help improve system security protocols.

The lock mechanism can be housed within the secure package storage compartment, which is battery-operated. Because the electricity required by the package storage compartment is low, battery power is a viable option, allowing electronics on the package storage compartment without requiring connection to a power source, which can detract from security. The system can use RF transmission to communicate with a hub, which then relays messages to other services via Bluetooth, WiFi, cellular networks, or LoRa. This configuration allows the hub to be placed inside the home but within short-range reliable communication distance. This allows the hub to have a dedicated power source and provide more power intensive tasks, such as routing communication among various different communication protocols. While some embodiments of the package storage compartment can be implemented with these features, in some embodiments, these features can be delegated to the hub where they do not cause battery drain. This can allow a more robust feature set with more recordation of metadata and a full digital twin to be kept maintaining logs of every interaction with the system, including security status, lock status, and tamper events, without requiring the unit to be constantly accessed or awakened.

The use of a movable magnet and LoRa triangulation can facilitate hands-free deliveries by providing multiple layers of security, with signals triggering the package storage compartment to open as the delivery vehicle, personnel, or drone approaches. Multiple layers of security tools can be coordinated to automate and enhance a hands-free delivery process, with notifications sent to the user. These measures essentially provide a significant delay to unauthorized access, ensuring that the system alerts the user and law enforcement promptly while maintaining a high level of security.

To illustrate the advanced communication capabilities of the package storage system, an example of a LoRa command is provided below. This example demonstrates how a specific command can be structured and transmitted within the LoRa network to facilitate various system operations, such as access control, status updates, and security alerts. The exemplary LoRa command showcases the protocol's robustness in ensuring reliable data exchange and operational integrity across the package storage system's network.

```
{
    "gatewayId": "0016c001f153a14c",
    "execId": 23451,
    "command": "reboot",
    "token": "[BASE64 ENCODED TOKEN]",
    "stdin": "[OPTIONAL BASE64 ENCODED SECURITY CODE]",
    "environment": {
    "ENV_VAR_1": "value1",
    "ENV_VAR_2": "value2"
    }
}
```

To further illustrate the comprehensive communication framework of the package storage system, an example of a Zigbee command structure is provided below. Zigbee communication technology is compatible with some embodiments of the system, offering low-power, reliable wireless communication for short-range device interaction. This technology enables seamless integration and coordination between the package storage compartment, hubs, and other connected smart home devices. The following example demonstrates the specific structure and functionality of commands within the Zigbee network, showcasing how these commands facilitate efficient access control, device status monitoring, and security management. The exemplary Zigbee command structure highlights the protocol's effectiveness in ensuring robust and secure communication across the system's various components within the context of a package storage system of the present disclosure.

```
void sendZBcmd(Map inputs=[
    destinationNetworkId: null,//specified as a two-octet pair length 4 string.
    destinationEndpoint: null,//specified as an Integer.
    sourceEndpoint: 1,//specified as an Integer
    clusterId: null,//specified as an Integer
        profileId: 0x0000,//specified as an Integer
        commandId: null,//The command ID as an integer
    commandPayload: null//String representing the payload
        for the command ID.
])
```

Supplemental Garage Door Delivery

Figure 31:
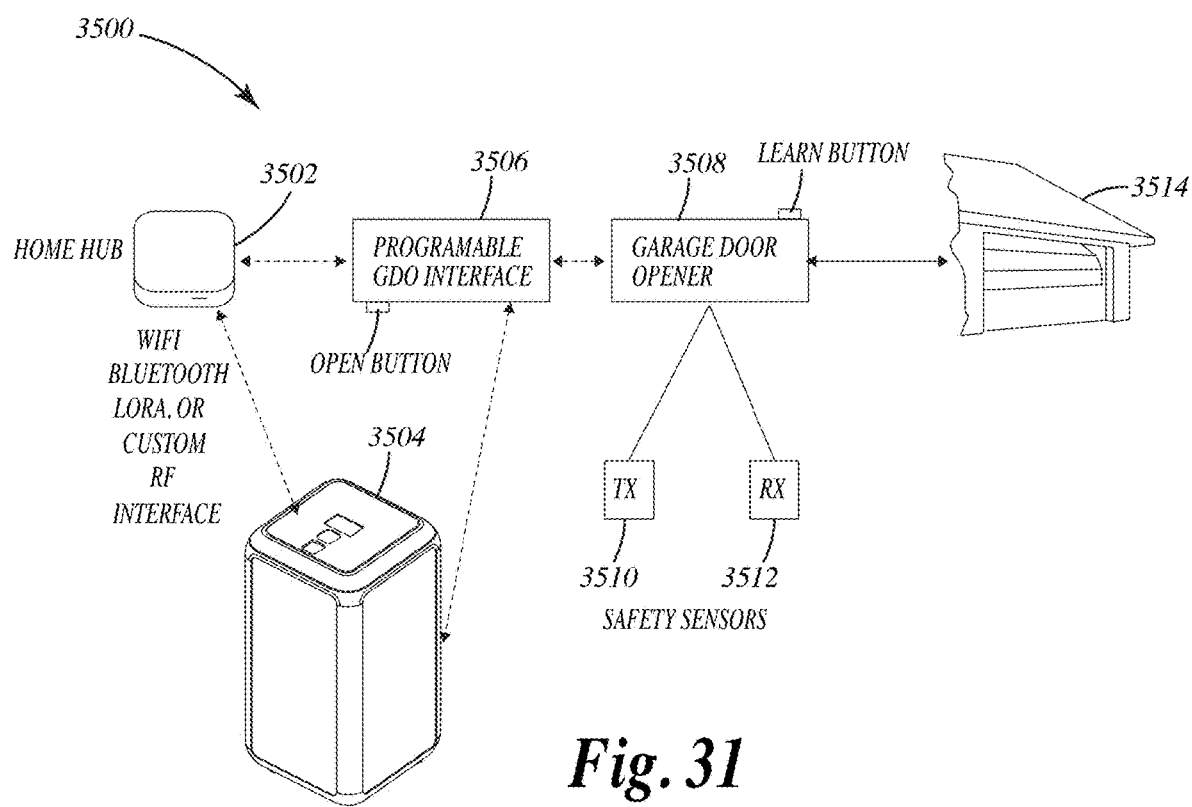
FIG. 31 illustrates a representative block diagram depicting package storage system interface with a garage door opener.

FIG. 31 shows a universal garage door opening system triggerable by the secure package storage system. The package storage compartment 3504 or hub 3502 can include a programmable garage door interface 3506 that can interact with a garage door opener 3508 to selectively open the garage door 3514.

The garage door opener 3508 can be integrated with various safety features to ensure secure and safe operation. For instance, the system can include safety sensors, such as a transmitter 3510 and a receiver 3512, which provide a beam break sensor. This safety feature ensures that the garage door 3514 will not close if the beam between the transmitter 3510 and receiver 3512 is interrupted, preventing potential accidents or damage.

The programmable garage door interface 3506 can be configured to interact with a wide range of garage door openers 3508, making the system universally compatible. This interface can be programmed to recognize and communicate with different garage door opener models and brands, providing flexibility and ease of integration.

The hub 3502 or the package storage compartment 3504 can utilize various communication protocols to interact with and activate the garage door opener 3508. These communication methods can include WiFi, Bluetooth, or a custom RF interface, ensuring reliable and secure communication. That is, the programmable GDO interface 3506 can be stand-alone or integrated into one or both of the home hub 3502 and package storage compartment 3504.

The garage door interface 3506 can be programmed to respond to specific triggers from the package storage system. For example, when a package is delivered, the package storage compartment 3504 can send a signal to the garage door interface 3506 via the hub 3502, prompting the garage door 3514 to open automatically. This automated process facilitates secure and hands-free delivery of packages directly into the garage.

Additionally, the garage door interface 3506 can be integrated with user authentication and authorization schemes. This ensures that only authorized deliveries or pickups can trigger the garage door to open. The system can verify the identity of the delivery person or the delivery vehicle through unique access codes, RFID tags, or other secure identification methods.

In some embodiments, the package storage system can be configured to communicate with a mobile application on the user's smartphone. The mobile app can provide real-time notifications and control over the garage door interface 3506. For instance, users can receive alerts when a package is delivered and use the app to remotely open or close the garage door as needed.

This universal garage door opening system enhances the security and convenience of package deliveries, ensuring that packages are securely stored inside the garage. By integrating the package storage system with the garage door opener, users can enjoy a seamless and efficient delivery process that minimizes the risk of theft or damage. Further it can allow for an easy solution for delivery of packages that do not fit into the package storage compartment.

Package Storage Compartment Drone Delivery

Figure 33:
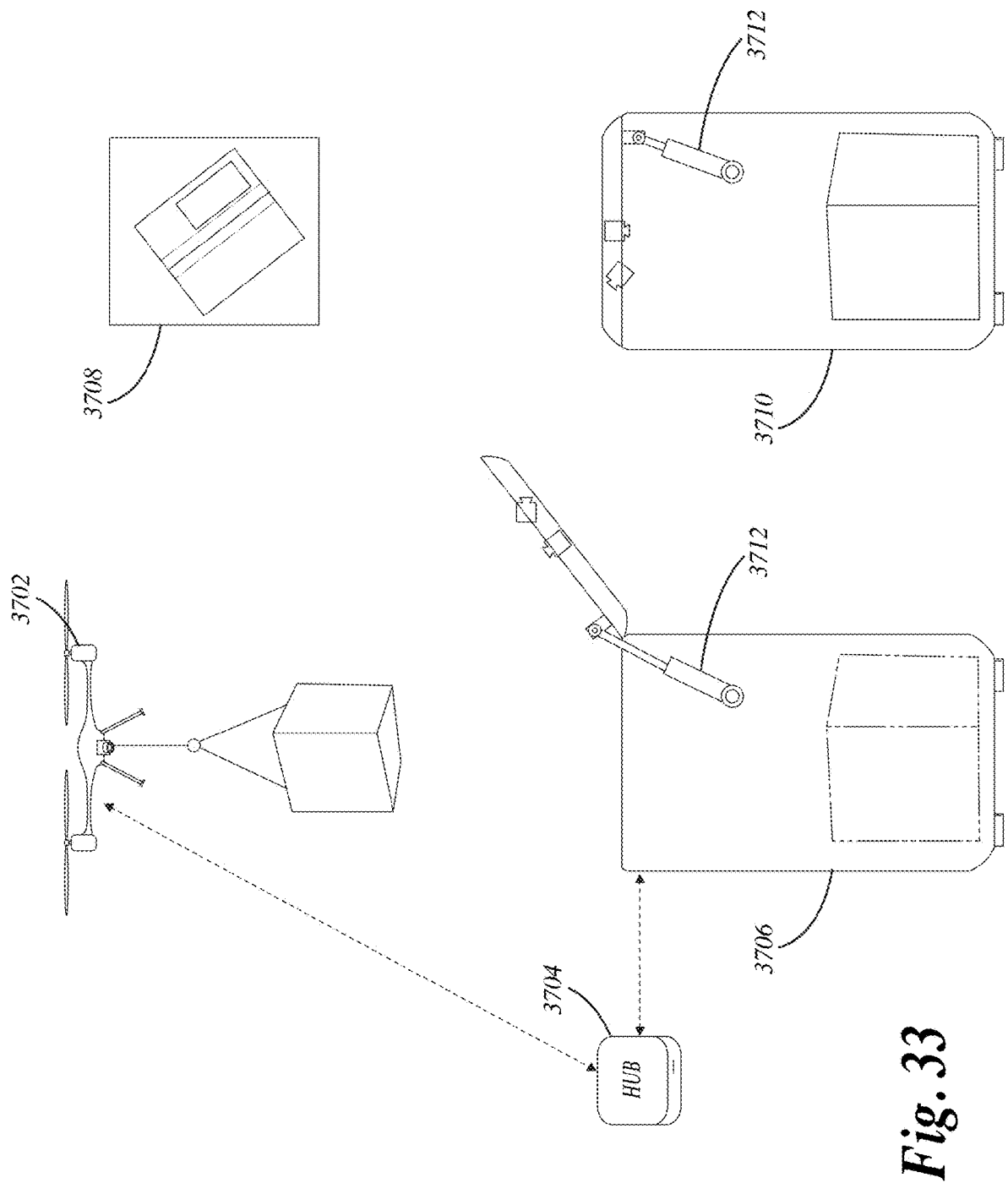
FIG. 33 illustrates exemplary drone delivery to a package storage compartment in accordance with an embodiment of the present disclosure.

Some embodiments of the present disclosure facilitate drone package delivery. FIG. 33 shows exemplary automated drone delivery system with LoRa coded entry and automatic door actuation. A package delivery drone 3702 can use crypto encrypted LoRa transmission of a security code that was shared and authenticated to gain access to a package storage compartment 3706. That is, the LoRa communication or other communication signal can be transmitted from the delivery drone to the Hub 3704, which can relay the signal to a closed package storage compartment 3710 controlling its operation to unlock and automatically open to an open package storage compartment 3706 to facilitate the delivery process. In some embodiments with or without a hub, the drone can communicate directly with the package storage compartment without communicating through the hub. The downward facing camera (which faces upward when the lid is open) can be used for real time drone delivery alignment. That is the compartment camera can provide alignment information to the drone that can allow the drone to align for delivery. IN some embodiments, the drone comes equipped with a camera, which can supplement the compartment camera for alignment. In embodiments where the drone comes equipped with a camera, a delivery photo 3708 can be captured by hovering above the compartment after the delivery. Alternatively, or in addition, a delivery photo can be obtained by the downward facing camera when the lid is closed. The package storage compartment can include an actuator for automatically opening and closing the storage door/lid. It can also act as a lock. The actuator can act as a lock when closed and may be motorized and/or spring assisted.

Reflective markers on the access door and opening can facilitate drone alignment for package delivery into the compartment. These markers can help the drone's navigation system accurately position the package for secure delivery. The package storage compartment 3706 can be equipped with one or more actuators for automatically opening and closing the access door without manual intervention. The actuator can also act as an electronic lock, ensuring that the compartment remains secure when the door is closed. Additionally, a camera mounted to the bottom of the access door and directed toward the delivery area is automatically positioned toward the surrounding area while the access door is in the open position and can be used to aid the drone in delivery alignment. The camera can provide real-time visual feedback, ensuring the drone accurately places the package inside the storage compartment. This setup enhances the efficiency and security of the drone delivery process, increasing reliability for modern package delivery.

Package Storage Compartment LoRa Communication

LoRa (Long Range) communication technology can be employed in the package storage system to enable secure, long-distance wireless communication. LoRa technology facilitates robust connectivity between the package storage compartments, hubs, and other LoRa enabled devices (e.g., delivery truck, delivery drones, and neighborhood devices), ensuring reliable transmission of status updates, security alerts, and access control commands. The table below provides an exemplary list of secure LoRa statuses along with their corresponding LoRa ID.

| Secure LoRa Status & ID | |
|---|---|
| Delivery Status | Return |
| Waiting | W |
| Truck in area | D, Truck ID |
| Deliveries being made | D |
| Post delivery mode | A |
| Alarm triggered | T, Unit ID |
| Heightened security mode | S |

The package storage system can also incorporate a secure LoRa mesh network, which maintains a comprehensive list of nodes, including their names, reply types, and signal strengths. This mesh network can ensure efficient and secure communication across all connected devices, enhancing the overall reliability and responsiveness of the system. By way of example, a table is provided below of node names, reply type, and signal strengths. These could represent different package storage compartments within a neighborhood.

| Secure LoRa Mesh List | | |
|---|---|---|
| List format | Reply | Signal Strength |
| Node A2334343 | ID | 82 |
| Node A2334344 | ID | 76 |
| Node A2334345 | ID | 44 |
| Node A2334346 | ID | 34 |
| Node A2334347 | ID | 23 |
| Node A2334348 | ID | 18 |

To further enhance the functionality and security of the package storage system, an exemplary set of system commands are provided in tabular format below. These commands can facilitate the various operations such as device pairing, status updates, security checks, and access controls, to name a few.

| System Commands | | | | | |
|---|---|---|---|---|---|
| Variable | Command | Response | Description | Size | Unit |
| ID | ID | TRUE | Unique Hyve ID | 10 | bytes |
| Battery Status | LBS | TRUE | Log battery status to cloud | | |
| | | | Analog to digital 0-256 | 2 | byes |
| System Status | LSS | TRUE | Log system status to cloud | | |
| | | | Analog to digital 0-257 | 3 | bytes |
| | | | System open/closed | 1 | bit |
| | | | System locked/unlocked | 1 | bit |
| | | | GDO open/closed | 1 | bit |
| | | | Bluetooth open/closed | 1 | bit |
| | | | Security alarm triggered/reset | 1 | bit |
| | | | NFC/keypad entry | 1 | bit |
| | | | System paired to mobile device | 1 | bit |
| | | | System paired to security system | 1 | bit |
| | | | System paired to GDO system | 1 | bit |
| | | | Message #1 programmed | 1 | bit |
| | | | Message #1 programmed | 1 | bit |

System Commands (continued)

| Variable | Command | Response | Description | Size | Unit |
|---|---|---|---|---|---|
| | | | Message #1 programmed | 1 | bit |
| | | | Message #1 programmed | 1 | bit |
| | | | Delivery mode | 1 | bit |
| | | | Heightened security mode | 1 | bit |
| Accumulators | LAS | TRUE | Log accumulator status in cloud | | |
| | | | Battery replacements | 4 | bytes |
| | | | Open/closed cycles | 4 | bytes |
| | | | NFC cycles | 4 | bytes |
| | | | Bluetooth cycles | 4 | bytes |
| | | | Alarm cycles | 4 | bytes |
| | | | GDO cycles | 4 | bytes |
| LoRa Status | GLS | | Get LoRa local unit status | | |
| | | ID | Get local Hyve LoRa IDs | 10 | bytes |
| | | RSSI | Signal strength | 2 | bytes |
| | | SS | System status | 2 | bytes |
| | BDID | TRUE | Broadcast delivery ID to Hyve ID | 10 | bytes |

Authentication Token Request and Response

To ensure secure communication and access control within the package storage system, an authentication token system can be implemented. This system can verify the identity of devices and users attempting to interact with the system, prevent unauthorized access and help to ensure data integrity. The following example illustrates the process of an authentication token request and response. By integrating this secure token-based authentication, the package storage system can enhance its security measures, providing robust protection against unauthorized access attempts.

Example Authentication Token Request
{
  "grant_type": "client_credentials",
  "scope": "jobs offline.access",
  "client_id": "7B4CD3C2-F57E-4D52-A90A-23EED001CE81",
  "client_secret": "89fbf537fe689fca26f67abae7a557106f4348d5"
}

Example Response
{
  "access_token": "your_bearer_token",
  "token_type": "Bearer",
  "expires_in": 1800,
  "scope": "jobs offline.access",
  "refresh_token": "your_refresh_token"
}

API Communication Pathways

Figure 34:
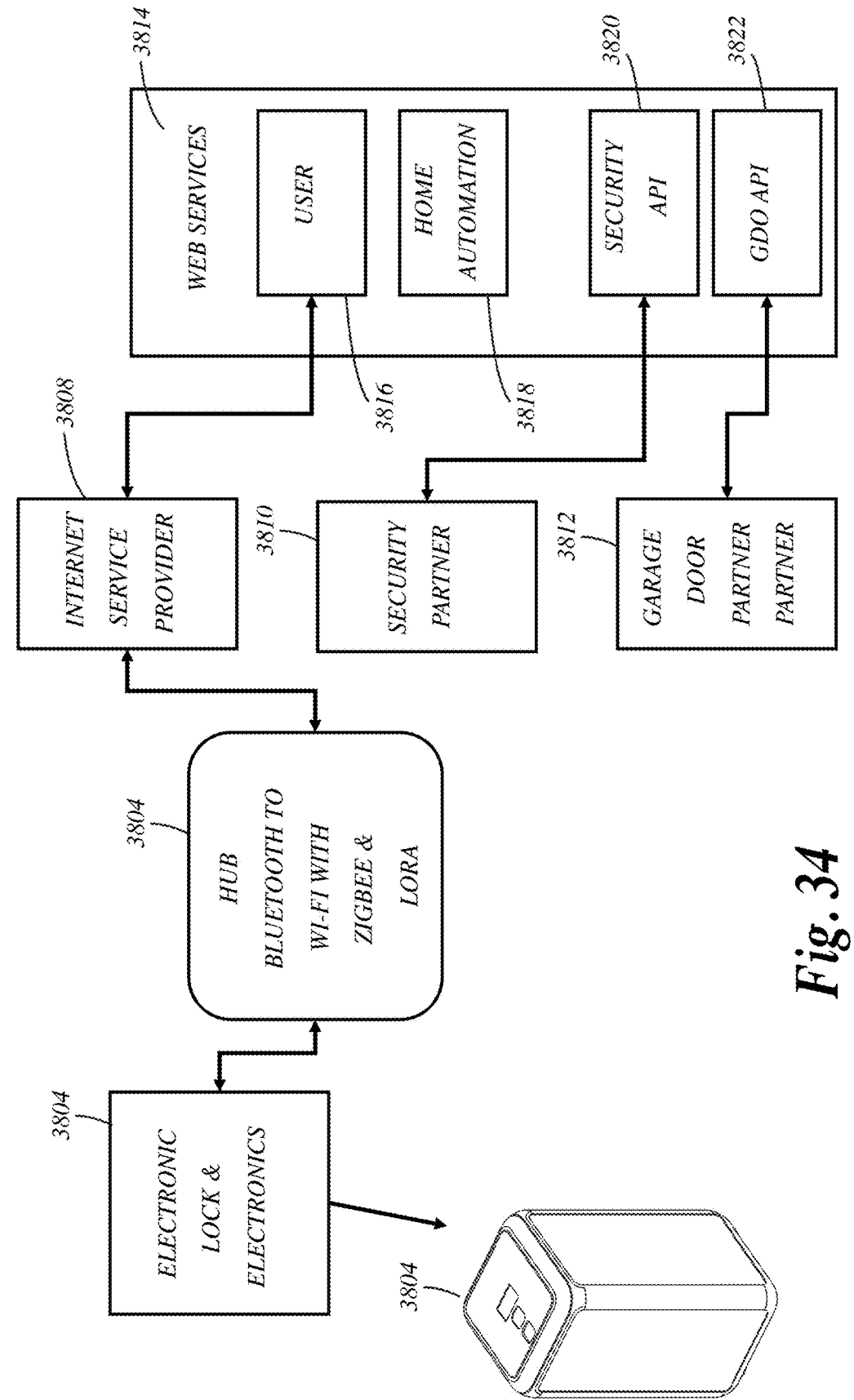
FIG. 34 illustrates a representative block diagram illustrating exemplary command and API pathways for a package storage system in accordance with an embodiment of the present disclosure.

FIG. 34 illustrates a representative block diagram illustrating exemplary command and API pathways for a package storage system in accordance with an embodiment of the present disclosure. The package storage compartment 3804 includes an electronic lock as well as other circuitry 3804. This circuitry 3802 can communicate to a hub 3806 using a short-range communication protocol, such as Bluetooth. This allows the package storage compartment to have a lower battery footprint and fewer electronics. The hub 3806 can react to communication from the package storage compartment and communicate to various other devices using Wi-Fi, Zigbee, LoRa or other communication protocols. This communication, for example, can be routed through an internet service provider 3808 to various web services 3814. For example, web service associated with the package storage compartment can have a user profile that provides access to the user's various package storage compartments. This site can accessible via the web or via an application and allow the user to interact, through the hub 3806, with the package storage compartment for various functionality (e.g., opening, closing, turning the alarm on, voice communication, voice messaging, to name a few examples). The hub can also communicate with the user's home automation system 3818. In this way, the package storage compartment can leverage an existing home automation system to increase security or to provide alarm services where none are included in the package storage compartment itself. The hub can also communication through a security API 3820 to a security partner 3810, for example a law enforcement service or another type of security partner that can react if and when an appropriate level of alarm is triggered. The hub can also interact with a garage door opener API 3822 that can communicate to a garage door partner 3812, which can control a garage door. Although this represena5tive block diagram shows exemplary command and API pathways that are largely routed through the hub and an Internet Service Provider, it should be understood that in alternative embodiments, other network routing structures and topologies can facilitate different command and API pathways, for example some security partners and garage door partner APIs can communicate through cellular or peer to peer connections.

To the extent these communications occur through API, the functionality can be significantly enhanced in a neighborhood setting. For example, a security partner or garage door partner may be able to act for proximal package storage compartments or garage doors in response to an alarm or specific alert in a neighborhood device.

Figure 35:
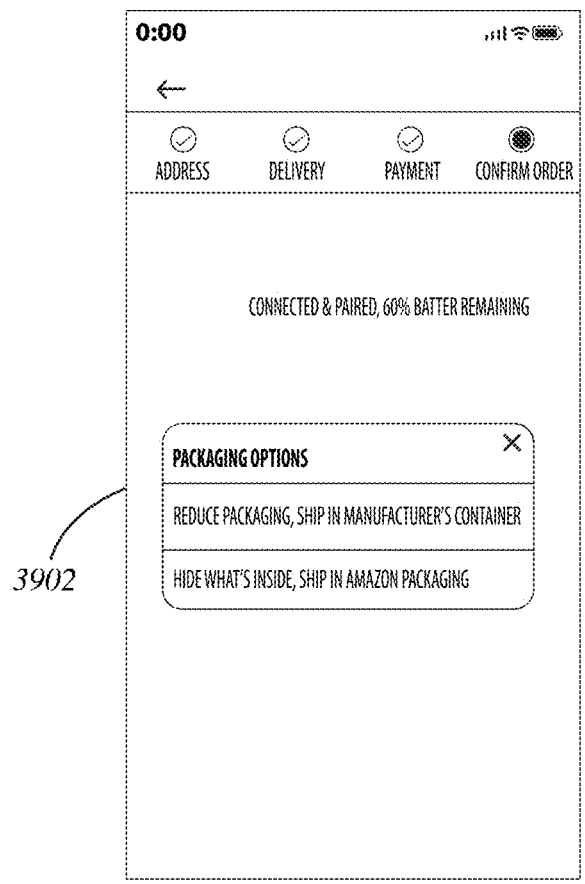
FIG. 35 illustrates an exemplary screen interface depicting packaging options.

FIG. 35 illustrates an exemplary screen interface 3902 depicting packaging options. One available selection allows the user to elect a reduction in packaging where because the delivery is secure, the delivery service provider is willing to deliver the package without repackaging the manufacturer's packaging. Alternative the user can select the traditional packaging option where the delivery service provider utilizes their packaging to hide the content of the package. This can be selected both for packages being ordered by a user and also by user's returning packages. For returning packages, the user can place the package in the package storage compartment and set a flag in the application so that notifications are sent to a driver in the area to pickup the package for a return. This can be part of the digital twin but also a LoRa RF signal that communicates to the delivery truck directly when in the area.

This disclosure incorporates a broad array of innovative features and methods to ensure comprehensive security, reliability, and ease of use for package storage systems. These features include, but are not limited to, a universal security interface device with movable magnetics and a package security system equipped with both internal and external cameras. The storage device can include a camera portal, internal lighting, and an alignment device to facilitate package photography. Additionally, the package storage system can include internal lighting and an internal removal bag for easy package retrieval.

The package security system can be integrated with a neighborhood watch list and messaging capabilities, enhancing community security. Methods are provided for tracking a package to the end of the delivery process, including delivery validation metadata, picture, label, and weight validation. The system can include methods for securing the package storage system, using tethers with multiple layers for added strength and sewn-in restraints, as well as integral assembly tools to prevent loss. An eco score and tracking system can be provided to incentivize reductions in secondary packaging and promotion of sustainability.

The storage device can include crypto security for certified communications and over-the-air (OTA) updates. Actuators can be used to open and close the storage door for hands-free delivery. In some embodiments, secure package storage door actuators can double as a lock. The system can support multiple mounting configurations and can be collapsible into a knock-down storage configuration for easy shipping and storage. A LoRa network can be employed for tracking neighborhood and delivery interactions. The package security system can control multiple storage devices and include a universal garage door opener (GDO) interface.

Additional methods can include securing the storage device to a door jamb or post and triggering a security device when the storage device is being abused, e.g., as sensed by an accelerometer. The system can also support doors and drawers with latches and cameras for DIY applications. Automated door openers can guide drone deliveries into a secured storage device using encrypted LoRa certificates for secure access. Secure crypto and certificate technologies can ensure a secure communication link between the storage compartment and authorized users. A hub interface can be provided for enhanced battery life and communications of the overall system.

Delivered package photograph evidence can be stored locally, remotely in a cloud server, or in a digital twin to provide accessibility even while power or Internet are unavailable to the home. The evidence can also be communicated to a delivery personnel device, an owner's device, or a combination thereof. This exemplary suite of features and methods underscores the robust, versatile, and secure nature of the advanced package storage systems described in this disclosure.

To further illustrate the robustness and versatility of the API and command pathways integrated into the package storage system, the following tables provide detailed examples of an exemplary API command structure and API communication protocol. These examples demonstrate the various commands used to interact with and control the package storage system, ensuring secure and efficient communication between the system components, user devices, and third-party services. The exemplary API command structure outlines the specific commands and their functions, while the accompanying API communication protocol table provides a comprehensive overview of the API communication protocol, detailing exemplary interactions and data exchanges that facilitate seamless operation and integration of the package storage system.

| API COMMAND STRUCTURE | | |
| --- | --- | --- |
| No. | Item | Description |
| 1 | STX (1 byte) | Data head/frame header, fixed value: 0xF6 |
| 2 | CMD (1 byte) | Command, please refer to the protocol command table |
| 3 | ASK (1 byte) | Response value, please refer to the response table |
| 4 | DATALEN (1 byte) | Data length |
| 5 | ETX (1 byte) | Data footer/frame footer, fixed value: 0x5F |
| 6 | SUM (1 byte) | Check byte and low byte of whole command packet, e.g., if sum of all data is 0x125D, then sum = 0x5D |
| 6 + DATALEN | DATA (DATALEN bytes) | DATA < if the value of DATALEN is zero, the data is null. The format is different for different commands. Please refer to the Introduction of Commands. |

| API COMMUNICATION PROTOCOL | | | |
| --- | --- | --- | --- |
| No. | Command | Protocol | Description |
| Bluetooth communication command (Mobile APP, Hub→Bluetooth lock) Pairing password verification | | | |
| 1 | Pairing password verification | 0x0F | If the verification succeeds, then can communicate with Bluetooth lock |
| Encryption authority authentication | | | |
| 1 | Get random code | 0x20 | Get random code for data encryption of authority authentication command |
| 2 | Authority authentication | 0x21 | Verify authority of current user |
| If authority authentication is not successful, then cannot operate following commands | | | |
| 1 | Status checking | 0x60 | Lock status, lock hook status, power voltage, lock ID |
| 2 | Unlock & lock | 0x61 | Unlocking & locking command |
| 3 | Time setting | 0x62 | Set lock time |
| 4 | Time reading | 0x63 | Get lock time |
| 5 | Locking mode setting & checking | 0x64 | Set & check locking mode (factory is automatic, manual) |
| 6 | System initialization | 0x65 | Clear system data, return to factory setting (if successful, Bluetooth connection will be disconnected automatically) |
| 7 | Set & check lock ID | 0x66 | Set & check lock ID (if successful, Bluetooth connection will be disconnected automatically) |
| 8 | Get Bluetooth module MAC address | 0x67 | Get Bluetooth module MAC address |

| No. | Command | Protocol | Description |
| --- | --- | --- | --- |
| | API COMMUNICATION PROTOCOL | | |
| 9 | User code application | 0x68 | Apply periodical user code or one time password |
| 10 | Manager code checking & changing | 0x69 | Check & change manager code |
| 11 | User code checking & changing | 0x6A | Check & change use code |
| 12 | Delete user information | 0x6B | Delete user code information |
| 13 | Upload user information | 0x6C | Upload all user information in the current system |
| 14 | Unlocking mode setting & checking | 0x6D | Set & check unlocking mode (factory is automatic, manual) |
| 15 | Get current version no. | 0x6E | Software version, hardware version |
| 16 | System exit | 0x6F | Disconnect with Bluetooth, enter hibernation |
| 17 | Check user code amount | 0x70 | Check user code amount in current system (include partially invalid password) |
| 18 | Get log information | 0x71 | Get amount of current logs and the latest log index |
| 19 | Load log | 0x72 | Load all logs in current system |
| 20 | Clear log | 0x73 | Clear all logs in current system |
| 21 | Alarm setting & checking | 0x74 | Set & check alarm status |
| 22 | Set & check buzzer | 0x75 | Set & check buzzer status |
| 23 | Set accelerometer values | 0x76 | Sets the accelerometer configuration data for all axis, force, and velocities |
| 24 | Set accelerometer scale | 0x77 | Sets the sensitivity of the accelerometer for all axis, force, and velocities |
| 25 | Read accelerometer values | 0x78 | Reads the present configuration data |
| 26 | Read accelerometer scale | 0x79 | Reads the present configuration data |
| 27 | Set temperature offset | 0x81 | Sets the temperature offset for calibration |
| 28 | Read temperature offset | 0x82 | Reads the present temperature offset |
| 29 | Read temperature | 0x83 | Reads the present temperature with offset calculated |
| 30 | Set temperature alarm | 0x84 | Sets the temperature alarm |
| 31 | Read temperature alarm | 0x85 | Reads the present temperature alarm |
| 32 | Set return flag | 0x86 | Sets the flag for return package |
| 33 | Read return flag | 0x87 | Reads the flag return package |
| | Bluetooth communication protocol (Bluetooth lock→mobile APP, hub | | |
| 1 | Uploading status | 0x80 | Upload lock status automatically after locked & unlocked |
| 2 | Alarm status | 0x88 | Accelerometer, temperature, battery |

To further demonstrate the capabilities and integration of the package storage system with smart home environments, the following section presents an example of Smart Home Skills. These skills can enhance the system's functionality by providing real-time status updates, notifications, and alarm triggers, ensuring comprehensive monitoring and security. The exemplary skills include system status notifications, such as alerts for the door being open too long, successful and denied code entries, completed deliveries, and battery life status. Future enhancements will include internal and external delivery and access pictures. Additionally, the system's alarm status can provide notifications for excessive handling triggers, unauthorized door openings, low battery alerts, and home alarm activations. These smart home skills exemplify the system's ability to seamlessly integrate with and enhance the overall smart home ecosystem.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A package storage system for pickups and deliveries comprising:
 a package storage compartment for receiving packages;
 a package storage compartment door for selectively accessing the package storage compartment;
 a package storage compartment door actuator configured to actuate the package storage compartment door;
 a digital lock configured to selectively lock the package storage compartment door to prevent unauthorized access to the package storage compartment;
 a local user interface in communication with the digital lock configured to operate the digital lock and the package storage compartment door actuator;
 package storage compartment communication circuitry configured to receive wireless communication from a remote device;
 a package storage compartment controller having memory, the package storage compartment controller configured for automatic operation of the digital lock and the package storage compartment door actuator based on received wireless communication from the remote device;
 wherein the package storage compartment includes a package photograph portal for capturing photographs of delivered packages; and
 a delivery remote device configured to take a photograph of a delivered package through the package photograph portal and automatically communicate delivery verification information wirelessly to the package storage compartment communication circuitry, wherein the package photograph portal is embedded in the top surface of the package storage compartment and includes guidance structure to facilitate positioning the delivery remote device such that a camera lens of the delivery remote device faces the package photograph portal, wherein the delivered package photograph taken through the package photograph portal is associated with a package storage identifier.

2. The package storage system of claim 1, wherein the package storage compartment door actuator is a spring that spring loads the package storage compartment door such that in response to unlock of the digital lock, the package storage compartment door opens automatically due to spring tension.

3. The package storage system of claim 1, wherein the package storage compartment door actuator is motor driven and in response to unlock of the digital lock, the motor driven actuator automatically opens the package storage compartment door.

4. The package storage system of claim 1, further including a package storage compartment camera configured to capture photographs of the package storage compartment, wherein the controller is configured to automatically operate the package storage compartment camera based on received wireless communication from the remote device.

5. The package storage system of claim 1, further including a proximity camera configured to capture photographs of interactions with the package storage system, wherein the photographs of interactions with the package storage system include one or more of deliveries, delivery attempts, theft, and theft attempts.

6. The package storage system of claim 1, further including an accelerometer and an alarm system, wherein the controller is configured to trigger the alarm system in response to accelerometer tampering trigger conditions stored in memory being met.

7. The package storage system of claim 1, wherein the controller is configured for automatic operation of the digital lock and the package storage compartment door actuator based on received wireless communication from a remote device sufficiently proximate to the package storage system, wherein the controller is configured to determine sufficient remote device proximity based on one or more characteristics of the wireless communication.

8. The package storage system of claim 1, wherein the controller is configured to store package storage system metadata, wherein the package storage system metadata includes interval delivery information, wherein the interval delivery information includes at least one of scheduled delivery window information, time between delivery information, delivery time prediction information, and batch delivery intervals.

9. The package storage system of claim 1, wherein the controller is configured to store package storage system metadata, wherein the package storage system metadata includes alert level information, wherein an accelerometer threshold level for triggering an alarm is lower at a higher alert level.

10. The package storage system of claim 1, wherein the controller is configured to generate a delivery verification record based, at least in part, on received wireless communication from the remote device, wherein the delivery verification record includes two or more of a delivery vehicle ID, delivery person ID, delivery type, delivered package photograph, and delivery person photograph.

11. The package storage system of claim 1, further including one or more load cells configured to measure package weight, wherein the controller is configured to generate a delivery verification record, wherein the delivery verification record includes a comparison between actual measured package weight and an expected package weight.

12. The package storage system of claim 1, wherein the package storage compartment communication circuitry includes a radio-frequency identification (RFID) reader configured for package storage system metadata communication with the remote delivery device.

13. The package storage system of claim 1, wherein the delivery verification information includes a photograph of the delivered package, wherein the delivery remote device is configured to retrieve label information from a photograph of the delivered package and wherein the delivery verification information includes the label information.

14. The package storage system of claim 1, wherein the delivery remote device is configured to take:
 a delivery interaction photograph external to the package storage compartment; and
 wherein the delivery remote device is configured to communicate both the delivery package photograph and the delivery interaction photograph automatically wirelessly to the package storage compartment communication circuitry.

15. The package storage system of claim 1, wherein the package storage compartment identifier is at least one of a watermark, a digital watermark, and a serial number.

16. The package storage system of claim 1, wherein the package storage compartment includes a package alignment system, wherein the package alignment system operates to align delivered packages for verification photography, wherein the package alignment system communicates with a delivery remote device regarding package alignment to facilitate photography timing of verification photography via the package photograph portal.

17. The package storage system of claim 1, further including an interior light or flash LED configured for automatic control by the package storage compartment controller.

18. The package storage system of claim 1, further including a package storage compartment crypto bootloader, wherein the package storage compartment crypto bootloader is configured to verify integrity and authenticity of the package storage compartment controller software by verifying a digital signature of package storage compartment controller firmware.

19. The package storage system of claim 1, further including: a package storage compartment temperature control system configured to control temperature within the package storage compartment; and a package storage compartment temperature sensor configured to measure internal package storage compartment temperature, the package storage system further including an ambient temperature sensor configured to measure ambient temperature external to the package storage compartment, wherein the package storage compartment controller is in communication with the package storage compartment temperature control system and the package storage compartment temperature sensor, and wherein the package storage compartment controller is configured to communicate a temperature alert in response to receiving a temperature sensitive package.

20. The package storage system of claim 1, including one or more solar panels to power the package storage system including charging one or more battery systems.

21. The package storage system of claim 1, further including a movable magnet movable between a closed position proximal to a third-party security system sensor transmitter mounting location and an open position sufficiently distal from the third-party security system sensor transmitter mounting location, by the package storage compartment controller, wherein the package storage compartment controller is configured to move the movable magnet selectively in response to operation of the electronic lock.

22. The package storage system of claim 1, further including a jamb bracket for mounting the package storage compartment to the door jamb and a tether for mounting the package storage compartment, wherein the storage compartment controller is configured to monitor an electrical tether signal indicative of tether status.

23. The package storage system of claim 1, further including an automated garage door opener for guided drone delivery into a garage for packages that cannot be delivered to the package storage compartment.

24. The package storage system of claim 1, wherein the package storage compartment is configured to utilize a preauthorized digital signature to facilitate both the storage and retrieval of a package, wherein:
the preauthorized digital signature is generated by the system after verifying the recipient's identity using digital identification,
the preauthorized digital signature is provided to the remote device of delivery personnel as proof of authorization to deliver the package to the compartment,
the package storage compartment remains locked until the verified recipient successfully accesses the compartment using their individualized digital credentials, thereby maintaining a secure chain of custody for the delivered package and serving as an equivalent to an in-person delivery signature.

25. The package storage system of claim 1, wherein the system is configured to link restricted item deliveries to a specific authorized recipient, such that only that recipient, identified during a preauthorization process, can access the package storage compartment containing the delivered restricted item using credentials uniquely associated with that recipient, thereby maintaining a secure chain of custody from delivery to retrieval.

26. A package storage system for pickups and deliveries comprising:
a package storage compartment for receiving packages;
a package storage compartment door for selectively accessing the package storage compartment;
a package storage compartment door actuator configured to actuate the package storage compartment door;
a digital lock configured to selectively lock the package storage compartment door to prevent unauthorized access to the package storage compartment;
a local user interface in communication with the digital lock configured to operate the digital lock and the package storage compartment door actuator;
package storage compartment communication circuitry configured to receive wireless communication from a remote device;
a package storage compartment controller having memory, the package storage compartment controller configured for automatic operation of the digital lock and the package storage compartment door actuator based on received wireless communication from the remote device;
wherein the package storage compartment includes a package photograph portal for capturing photographs of delivered packages, the package storage system further including a delivery remote device configured to take a photograph of a delivered package through the package photograph portal and automatically communicate delivery verification information wirelessly to the package storage compartment communication circuitry;
wherein the package photograph portal is embedded in a side surface of the package storage compartment and includes guidance structure to facilitate positioning the delivery remote device such that:
one camera lens of the delivery remote device faces toward the package photograph portal to obtain a photograph of a delivered package; and
another camera lens of the delivery remote device faces away from the package photograph portal to obtain a delivery interaction photograph.

27. A package storage system for pickups and deliveries comprising:
a package storage compartment for receiving packages;
a package storage compartment door for selectively accessing the package storage compartment;
a package storage compartment door actuator configured to actuate the package storage compartment door;
a digital lock configured to selectively lock the package storage compartment door to prevent unauthorized access to the package storage compartment;
a local user interface in communication with the digital lock configured to operate the digital lock and the package storage compartment door actuator;
package storage compartment communication circuitry configured to receive wireless communication from a remote device;
a package storage compartment controller having memory, the package storage compartment controller configured for automatic operation of the digital lock and the package storage compartment door actuator based on received wireless communication from the remote device;

wherein the package storage compartment includes a package photograph portal for capturing photographs of delivered packages, the package storage system further including a delivery remote device configured to take a photograph of a delivered package through the package photograph portal and automatically communicate delivery verification information wirelessly to the package storage compartment communication circuitry;

wherein the package photograph portal includes a lens and a lens weather protector configured to block external light, wherein the package storage compartment includes an LED configured to provide lighting for package photography, and wherein the package storage controller coordinates with the delivery remote device to deactivate or prevent flash photography.

28. A package storage system for pickups and deliveries comprising:

a package storage compartment for receiving packages;

a package storage compartment door for selectively accessing the package storage compartment;

a package storage compartment door actuator configured to actuate the package storage compartment door;

a digital lock configured to selectively lock the package storage compartment door to prevent unauthorized access to the package storage compartment;

a local user interface in communication with the digital lock configured to operate the digital lock and the package storage compartment door actuator;

package storage compartment communication circuitry configured to receive wireless communication from a remote device;

a package storage compartment controller having memory, the package storage compartment controller configured for automatic operation of the digital lock and the package storage compartment door actuator based on received wireless communication from the remote device;

wherein the package storage compartment includes a package photograph portal for capturing photographs of delivered packages, the package storage system further including a delivery remote device configured to take a photograph of a delivered package through the package photograph portal and automatically communicate delivery verification information wirelessly to the package storage compartment communication circuitry;

wherein the package storage compartment includes an LED to enhance photography of delivered packages, wherein the controller is in communication with the delivery remote device and configured to activate the LED in response to an indication from the delivery remote device that a package delivery verification photo is about to be taken.

* * * * *